US012564530B2

(12) United States Patent
Shackelford et al.

(10) Patent No.: US 12,564,530 B2
(45) Date of Patent: Mar. 3, 2026

(54) INFLATABLE PATIENT POSITIONER WITH SELECTIVELY ENGAGING SURFACE GRIPPING ZONES

(71) Applicant: Medline Industries, LP, Northfield, IL (US)

(72) Inventors: William Shackelford, Glenview, IL (US); Cole Fuerste, Vernon Hills, IL (US); Alyssa Kurt, Kenosha, WI (US); Drew Phalen, Buffalo Grove, IL (US); Diana Roldan, Chicago, IL (US); David M Szum, Wauconda, IL (US)

(73) Assignee: Medline Industries LP, Northfield, IL (US)

( * ) Notice: Subject to any disclaimer, the term of this patent is extended or adjusted under 35 U.S.C. 154(b) by 245 days.

(21) Appl. No.: 18/242,818

(22) Filed: Sep. 6, 2023

(65) Prior Publication Data

US 2025/0073108 A1 Mar. 6, 2025

(51) Int. Cl.
*A61G 13/12* (2006.01)

(52) U.S. Cl.
CPC ................................ *A61G 13/1265* (2013.01)

(58) Field of Classification Search
CPC .... A61G 13/12; A61G 7/1026; A61G 7/1028; A61G 7/05769; A61G 7/1021; A61G 7/005; A61G 7/10; A61G 7/05; A61G 13/101
USPC ...... 5/630, 81.1 R, 81.1 HS, 655.3, 628, 706
See application file for complete search history.

(56) References Cited

U.S. PATENT DOCUMENTS

| | | | |
|---|---|---|---|
| 4,528,704 | A | 7/1985 | Wegener |
| 5,561,873 | A | 10/1996 | Weedling |
| 6,073,291 | A | 6/2000 | Davis |
| 6,467,106 | B1 | 10/2002 | Heimbrock |
| 6,622,324 | B2 | 9/2003 | VanSteenburg et al. |
| 6,898,809 | B2 | 5/2005 | Davis |
| 7,028,350 | B1 | 4/2006 | Davis |
| 7,107,641 | B2 | 9/2006 | Davis |
| 7,131,154 | B2 | 11/2006 | Davis |
| 7,168,115 | B2 | 1/2007 | Davis |
| 7,266,852 | B2 | 9/2007 | Davis |
| 7,346,935 | B1 * | 3/2008 | Patterson ............. A41B 11/008 2/239 |
| 7,373,680 | B2 | 5/2008 | Davis |
| 7,376,995 | B2 | 5/2008 | Davis |
| 7,406,723 | B2 | 8/2008 | Davis |
| 7,565,709 | B2 | 7/2009 | Davis |
| 7,574,761 | B2 | 8/2009 | Davis |

(Continued)

*Primary Examiner* — Justin C Mikowski
*Assistant Examiner* — George Samuel Gines
(74) *Attorney, Agent, or Firm* — Philip H. Burrus, IV

(57) ABSTRACT

A patient positioner includes an upper patient positioner surface coupled to a lower patient positioner surface along a perimeter. One or more baffles couple the upper patient positioner surface to the lower patient positioner surface interior to the perimeter so as to define a plurality of air chambers within the patient positioner. One or more selectively engaging surface gripping zones are attached to the lower patient positioner surface and are positioned centrally along the one or more baffles on a one-to-one basis such that the grippy feet extend distally beyond surfaces of the plurality of air chambers when in a deflated state and retract within concave lacuna situated beneath apices of the plurality of air chambers when in a deflated state.

20 Claims, 33 Drawing Sheets

(56) References Cited

U.S. PATENT DOCUMENTS

| | | | | |
|---|---|---|---|---|
| D602,759 | S | 10/2009 | Davis | |
| D602,760 | S | 10/2009 | Davis | |
| 7,627,910 | B2 | 12/2009 | Davis | |
| 7,653,953 | B2 | 2/2010 | Lopez-Sansalvador | |
| 7,712,170 | B2 | 5/2010 | Davis | |
| 7,739,758 | B2 | 6/2010 | Weedling et al. | |
| D644,913 | S | 9/2011 | Davis | |
| 8,283,602 | B2 | 10/2012 | Augustine | |
| 8,387,177 | B2 | 3/2013 | Davis | |
| 8,413,277 | B2 | 4/2013 | Davis | |
| 8,464,720 | B1 | 6/2013 | Pigazzi | |
| 8,511,314 | B2 | 8/2013 | Pigazzi | |
| 8,539,621 | B2 | 9/2013 | West | |
| 8,539,622 | B2 | 9/2013 | West | |
| 8,539,623 | B2 | 9/2013 | West | |
| 8,566,977 | B2 | 10/2013 | Davis | |
| 8,772,676 | B2 | 7/2014 | Augustine | |
| 8,789,533 | B2 | 7/2014 | Steffens | |
| 9,161,876 | B2 | 10/2015 | Pigazzi | |
| 9,283,133 | B2 | 3/2016 | Sarma | |
| 9,750,656 | B1 | 9/2017 | Pigazzi | |
| 9,782,287 | B2 | 10/2017 | Pigazzi | |
| D803,894 | S | 11/2017 | Kennedy | |
| 9,849,053 | B2 | 12/2017 | Rigoni | |
| 9,861,544 | B2 | 1/2018 | Rigoni | |
| 9,931,262 | B2 | 4/2018 | Pigazzi | |
| 9,949,882 | B2 | 4/2018 | Holladay | |
| 9,949,883 | B1 | 4/2018 | Pigazzi | |
| D817,362 | S | 5/2018 | Kennedy | |
| 9,962,122 | B2 | 5/2018 | Augustine | |
| D826,991 | S | 8/2018 | Kennedy | |
| 10,045,902 | B1 | 8/2018 | Pigazzi | |
| 10,064,773 | B2 | 9/2018 | Rigoni | |
| D830,415 | S | 10/2018 | Kennedy | |
| D831,074 | S | 10/2018 | Eklund | |
| 10,098,800 | B2 | 10/2018 | Pigazzi | |
| D837,264 | S | 1/2019 | Kennedy | |
| 10,166,160 | B2 * | 1/2019 | Coppens | A61B 5/055 |
| 10,201,935 | B2 | 2/2019 | Augustine | |
| 10,206,248 | B2 | 2/2019 | Augustine | |
| 10,244,994 | B2 | 4/2019 | Davis | |
| 10,285,890 | B1 | 5/2019 | Pigazzi | |
| 10,322,050 | B1 | 6/2019 | Pigazza | |
| 10,413,469 | B2 | 9/2019 | Chua | |
| 10,433,792 | B2 | 10/2019 | Augustine | |
| 10,441,486 | B2 | 10/2019 | Fakhrizadeh | |
| 10,506,668 | B2 | 12/2019 | Augustine | |
| 10,561,556 | B2 | 2/2020 | Rigoni | |
| 10,575,784 | B2 | 3/2020 | Augustine | |
| 10,632,575 | B2 | 4/2020 | Kennedy | |
| 10,709,626 | B1 | 7/2020 | Gomez | |
| 10,716,336 | B2 * | 7/2020 | McCuaig | A41B 11/007 |
| 10,765,576 | B2 | 9/2020 | Rigoni | |
| 10,772,778 | B2 | 9/2020 | Hahn | |
| 10,828,216 | B2 | 11/2020 | Phalen et al. | |
| 10,836,002 | B2 | 11/2020 | Kennedy | |
| 10,849,193 | B2 | 11/2020 | Augustine | |
| 10,912,699 | B2 | 2/2021 | Pigazza | |
| 10,959,675 | B2 | 3/2021 | Augustine | |
| 10,993,866 | B2 * | 5/2021 | Augustine | B32B 5/022 |
| 11,026,856 | B1 | 6/2021 | Bergad | |
| 11,103,188 | B2 | 8/2021 | Augustine | |
| 11,224,550 | B1 | 1/2022 | Gomez | |
| 11,266,525 | B2 | 3/2022 | Kaforey | |
| 11,278,463 | B2 | 3/2022 | Augustine | |
| 11,382,817 | B2 | 7/2022 | Augustine | |
| 11,388,782 | B2 | 7/2022 | Augustine | |
| 11,452,382 | B2 | 9/2022 | Augustine | |
| 11,465,364 | B2 | 10/2022 | Augustine | |
| 11,484,456 | B2 | 11/2022 | Pigazzi | |
| 11,559,259 | B2 | 1/2023 | Augustine | |
| 11,642,267 | B2 * | 5/2023 | Kea | A61G 7/1026<br>5/655.3 |
| 2012/0186012 | A1 | 7/2012 | Ponsi | |
| 2013/0145549 | A1 * | 6/2013 | Piegdon | A61G 7/1028<br>5/81.1 R |
| 2013/0333116 | A1 | 12/2013 | West | |
| 2016/0271467 | A1 * | 9/2016 | Wallin | A63B 53/14 |
| 2017/0326011 | A1 * | 11/2017 | Alvarez | A61G 7/1028 |
| 2018/0250180 | A1 * | 9/2018 | Phalen | A61G 7/1028 |
| 2018/0369050 | A1 | 12/2018 | Davis | |
| 2019/0046380 | A1 | 2/2019 | Meah | |
| 2020/0022859 | A1 | 1/2020 | Davis | |
| 2020/0060912 | A1 | 2/2020 | Hollabaugh | |
| 2020/0138656 | A1 | 5/2020 | Davis | |
| 2020/0146913 | A1 | 5/2020 | Davis | |
| 2020/0179203 | A1 | 6/2020 | Rigoni | |
| 2020/0315886 | A1 | 10/2020 | Dudonis | |
| 2020/0397634 | A1 | 12/2020 | Rigoni | |
| 2021/0077325 | A1 | 3/2021 | Davis | |
| 2021/0093493 | A1 | 4/2021 | Davis | |
| 2021/0121347 | A1 | 4/2021 | Davis | |
| 2021/0154069 | A1 | 5/2021 | Davis | |
| 2021/0186780 | A1 | 6/2021 | Davis | |
| 2021/0204882 | A1 | 7/2021 | Augustine | |
| 2021/0244592 | A1 | 8/2021 | Davis | |
| 2021/0275375 | A1 | 9/2021 | Konkle | |
| 2022/0339045 | A1 | 10/2022 | Cook | |
| 2023/0034977 | A1 | 2/2023 | Augustine | |
| 2023/0061295 | A1 * | 3/2023 | Cowan | A61G 7/1021 |
| 2023/0240924 | A1 | 8/2023 | Kea | |

* cited by examiner

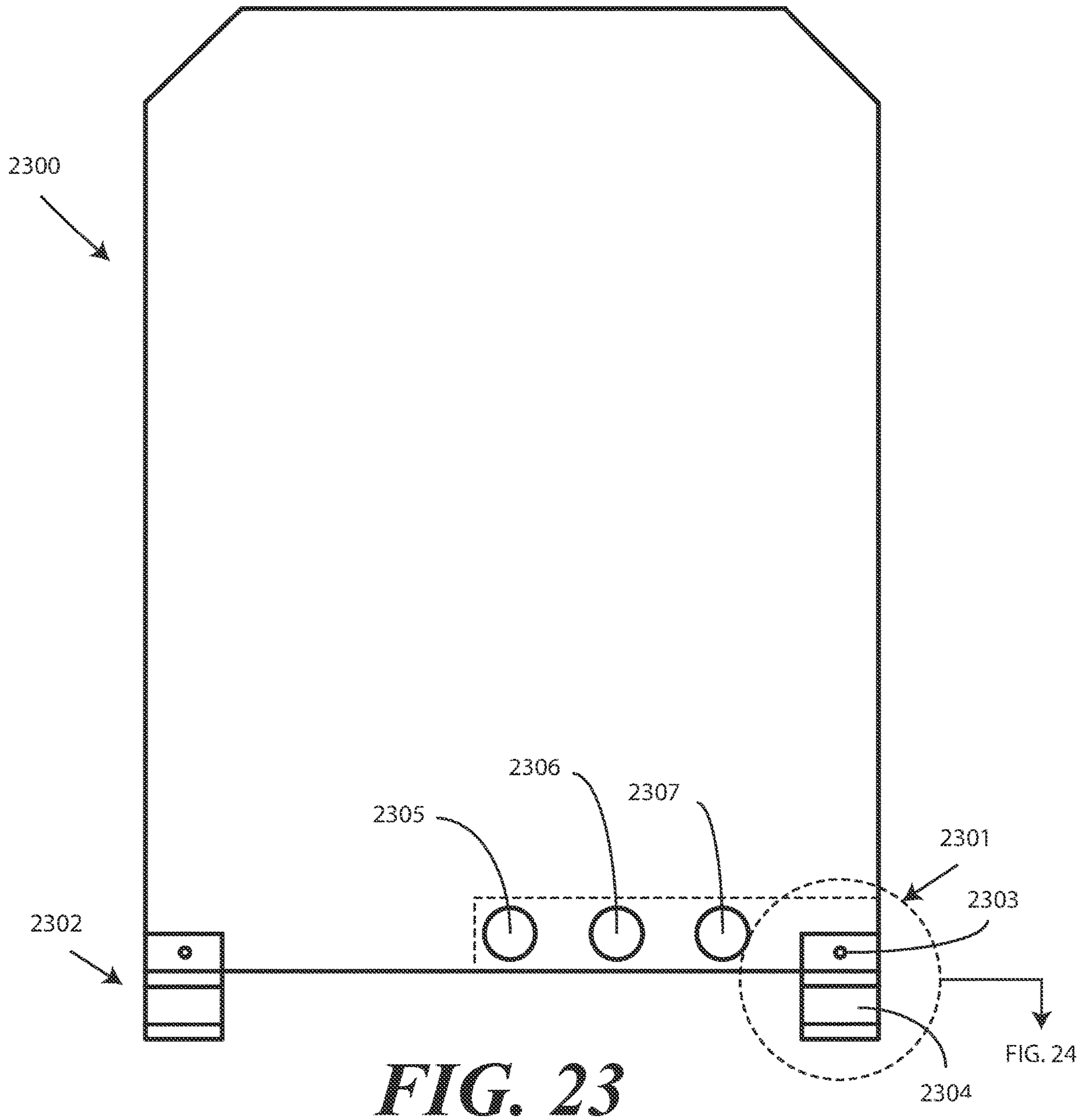
FIG. 23
FIG. 24
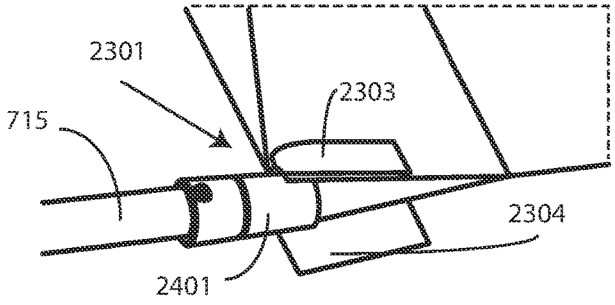

2701 2702 2703

| | | |
|---|---|---|
| Rate of Recovery - 50-80% of original shape | seconds | 2 - 10 |
| Rate of recovery - 80-90% of original shape | seconds | 6 - 15 |
| Rate of recovery - 100% of original shape | seconds | 10 - 35 |
| Ball Rebound | percent | 0.1 - 5 |
| Compression @ 25% comp. @ 22hrs @ 70 C | percent | 0.1 - 5 |
| Compression @ 50% comp. @ 22hrs @ 70 C | percent | 0.5 - 5 |
| Indentation force at 25% deflection | pounds force | 7 - 18 |
| Coefficient of static friction @ table | unitless | 0.2 - 1.0 |
| Patient shift | inches | 1 - 3 |
| Airflow | cubic feet per minute | 0.1 - 3 |
| Foam thickness | inches | 0.75 - 3 |
| Tensile strength at 25% deflection | psi | 5 - 15 |
| Tear strength @ 20 inches per minute | lbs | 1 - 3 |
| Elongation at 20 inch per minute | percent | 125<X<250 |
| Nominal Density | kg per cubic m | 75<X<110 |
| Equivalent total friction | unitless | X>/=1 |

2700

*FIG. 27*

FIG. 30
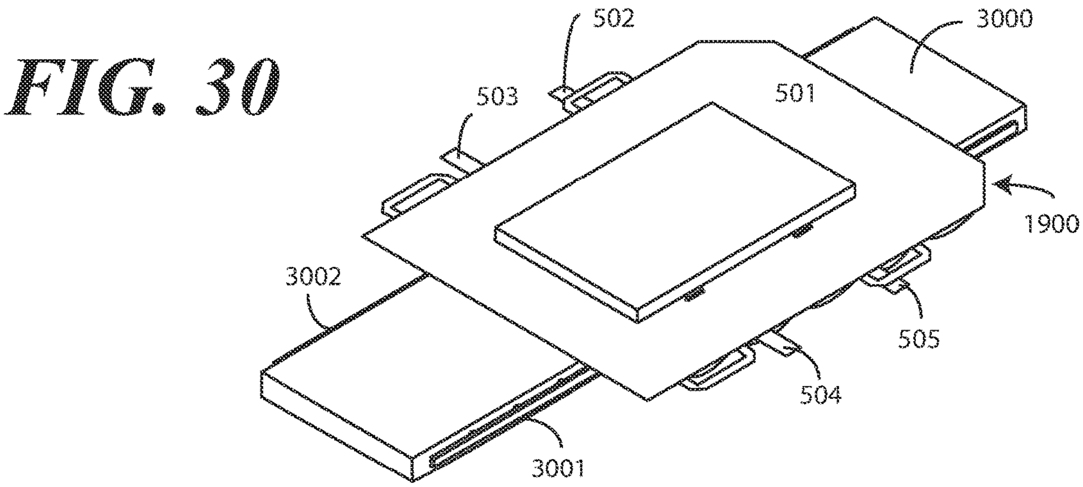
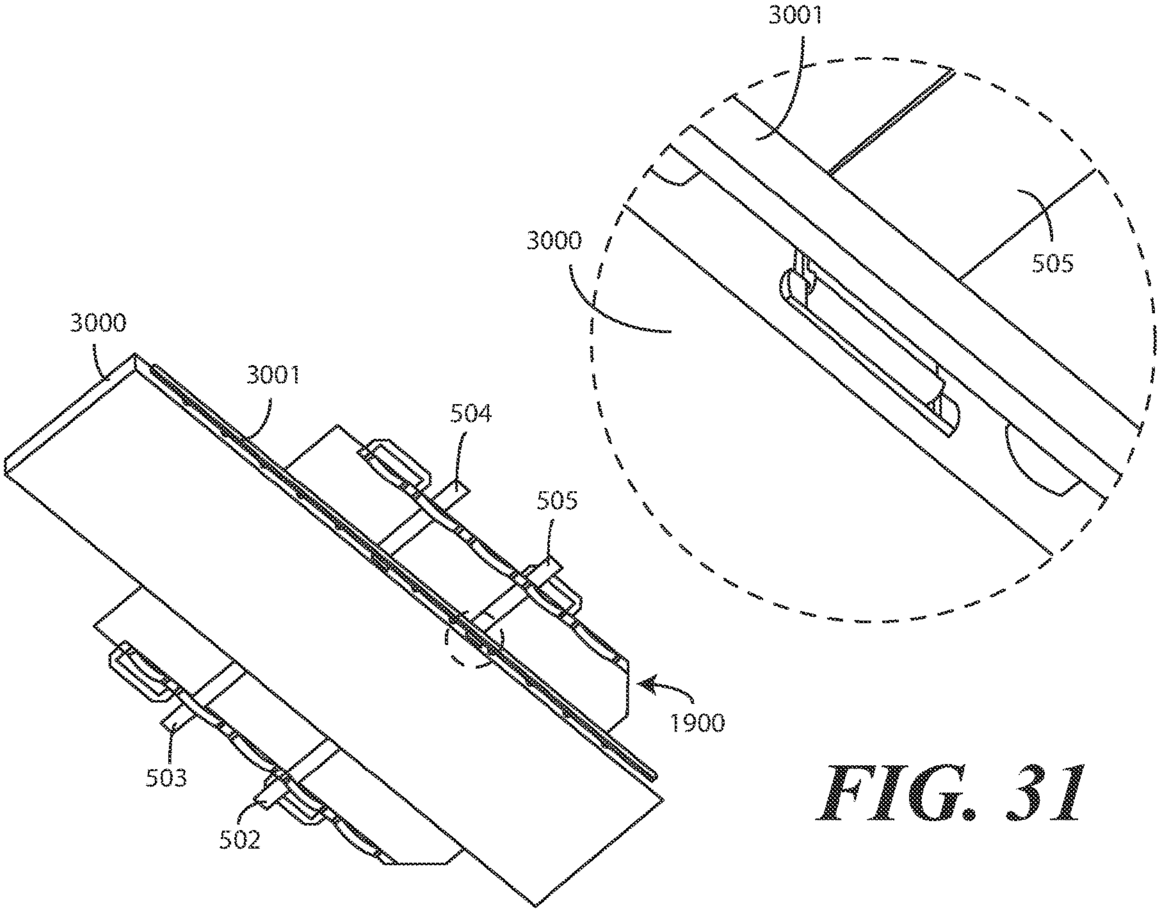
FIG. 31

3501

INFLATABLE PATIENT POSITIONER WITH SELECTIVELY ENGAGING SURFACE GRIPPING ZONES

BACKGROUND

Technical Field

This disclosure relates generally to a patient support device, and more particularly to an inflatable patient support device.

Background Art

During medical procedures a patient is generally placed on a procedure table. In some procedures, a patient positioner is used to situate the patient in a specific location or position on the procedure table. The tilt angle of the procedure table can also change during a procedure. Illustrating by example, in some abdominal or other surgical procedures the tilt angle of the procedure table gets changed such that the patient's pelvis is above the head to allow gravity to assist in moving organs not involved in the procedure away from the procedure site. Such a position is commonly referred to as the "Trendelenburg" position after the German surgeon Friedrich Trendelenburg. In addition to facilitating the gravitational movement of organs away from the procedure site, the Trendelenburg position provides an advantageous field of view of the surgeon during many procedures. In some procedures, the steeper the angle of tilt, the more effectively the patient is positioned. Some Trendelenburg positions have corresponding tilt angles of forty-five degrees or greater.

When placing a person in the Trendelenburg position, medical practitioners worry about the patient slipping or sliding along the procedure table due to the tilt angle. If a person slips, not only can it affect the procedure, but repositioning the person can require the assistance of multiple people. This problem is complicated by the fact that the patient is generally anesthetized during a surgical procedure, which makes the patient harder to reposition. Repositioning a patient can be tedious, time consuming, and especially hazardous if the surgical operation is well in progress. It would be advantageous to have an improved patient positioner that is easier to use and more reliable.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 23 illustrates a top plan view of yet another explanatory patient positioner in accordance with one or more embodiments of the disclosure.

FIG. 24 illustrates one explanatory inflation coupling suitable for use with one or more embodiments of the disclosure.

FIG. 27 illustrates a table defining characteristics of foam that work well with patient positioners configured in accordance with one or more embodiments of the disclosure.

FIG. 30 illustrates a first perspective view of one explanatory patient positioner system positioned atop a procedure table in accordance with one or more embodiments of the disclosure.

FIG. 31 illustrates a second perspective view of one explanatory patient positioner system positioned atop a procedure table in accordance with one or more embodiments of the disclosure.

Figure 1:
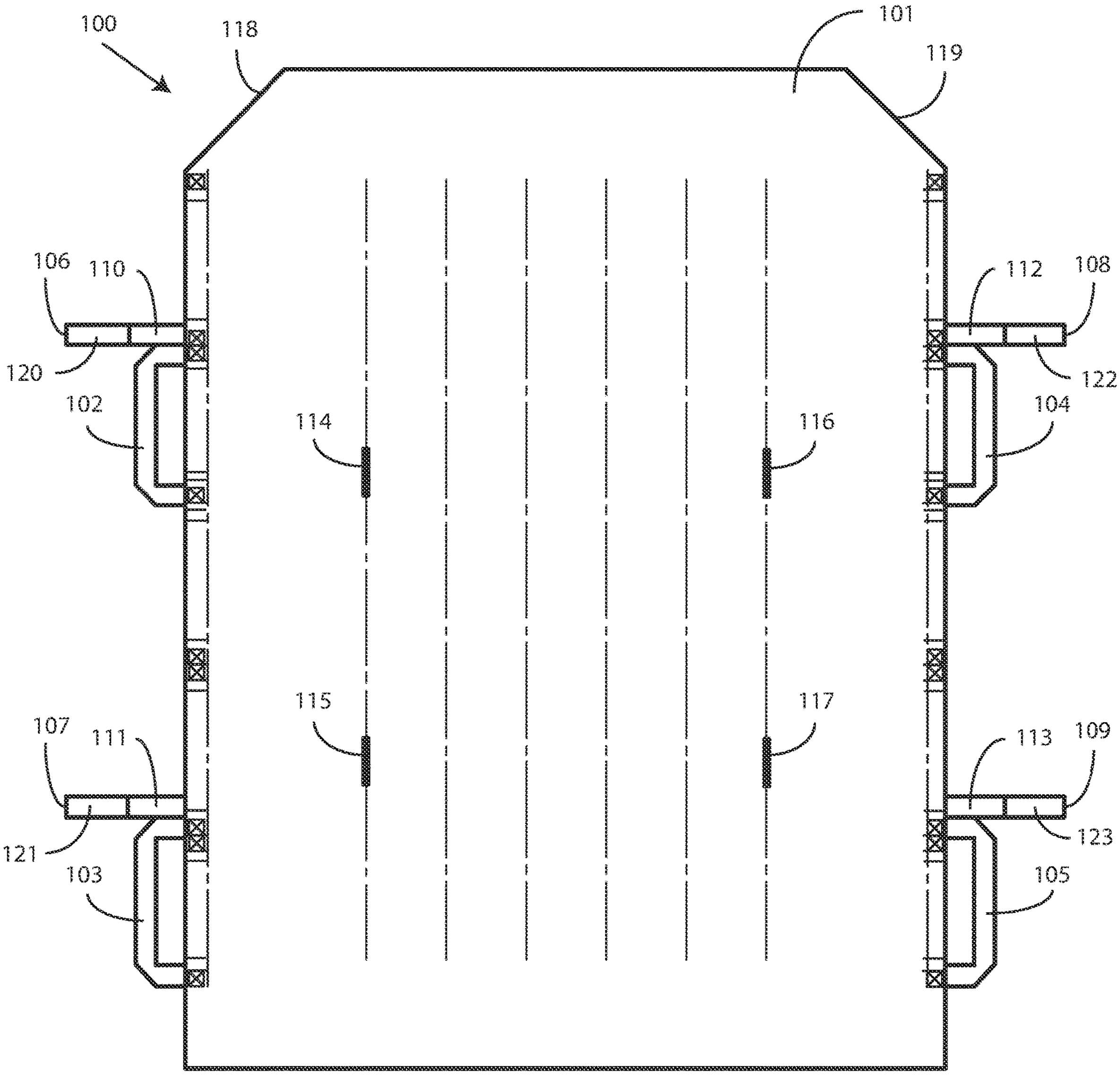
FIG. 1 illustrates a top plan view of one explanatory patient positioner in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the apparatus components and method steps described below have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, it is expected that one of ordinary skill, notwithstanding possibly significant effort and many design choices motivated by, for example, available time, current technology, and economic considerations, when guided by the concepts and principles disclosed herein will be readily capable of constructing such apparatus components and executing such methods with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a patient positioner that comprises an upper patient positioner surface coupled to a lower patient positioner surface along a perimeter. One or more baffles couple the upper patient positioner surface to the lower patient positioner surface interior of the perimeter, with the one or more baffles defining a plurality of air chambers within the patient positioner.

In one or more embodiments, one or more selectively engaging surface gripping zones are attached to the lower patient positioner surface. in one or more embodiments, the one or more selectively engaging surface gripping zones are positioned centrally along the one or more baffles on a one-to-one basis such that grippy feet of the one or more selectively engaging surface gripping zones extend distally beyond exterior surfaces of the plurality of air chambers. Thus, when the patient positioner is positioned on a procedure table with the lower patient positioner surface facing the procedure table, the grippy feet engage the procedure table to keep the patient positioner from sliding. It should be noted that as used herein, a "procedure table" includes intensive care unit beds, medical beds, surgery tables, and so forth, as "procedure table" is intended to describe any flat, curved, or other shaped surface configured to support a patient while a health care services provider performs a procedure thereon in a facility (imaging tables are frequently concave in shape).

However, in one or more embodiments the grippy feet retract within concave lacuna situated beneath apices of the plurality of air chambers when in an inflated state. This allows air exit holes to emit air to create an air bearing, thereby making it simple and easy to move the patient positioner since the grippy feet are not in contact with the procedure table when the air chambers are inflated.

Illustrating by example, in one or more embodiments the grippy feet, which define "friction enhancing zones" and are configured as dots or strips or patches situated on an upper patient positioner surface, lower patient positioner surface, or combinations thereof, can be included in zones centered around the sewn seams and are minimally on the lower patient positioner surface of the patient positioner but are optionally also situated on the upper patient positioner surface to grip patient. In one or more embodiments, the grippy feet can extend to seven eights (preferred), five-eights (more preferred), or three-eighths or less (most preferred) of a distance to a midline defined by between sewn seams. In one or more embodiments, selectively engaging surface gripping zones and corresponding materials can be symmetrical or asymmetrical around the sewn seams and/or the upper patient positioner surface or lower patient positioner surface. In one or more embodiments, the selectively engaging surface gripping zones can be rectangular, circular, triangular, configured as letters, configured as numbers, or take other shapes. In one or more embodiments, the selectively engaging surface gripping zones comprise grippy feet dots or can be continuous sheets of friction adjusting materials.

In one or more embodiments, the grippy feet friction enhancing zone material can be tailored for friction, toughness, softness to skin contact, and so forth. Some non-limiting examples of friction modifiers are polymers such as rubbers, e.g., urethane rubber, silicon rubber, polyalkylene rubber, etc., foams, gels, friction increasing surface treatments (like wax, etc.). Preferred materials are silicone polymers, urethane polymers, alkylene polymers, or combinations thereof. Other friction adjusting material or combinations thereof can also be used and one skilled in the art with this teaching can formulate accordingly.

As noted above, when a patient is anesthetized it may be difficult to situate the patient in a particular position on a procedure table. This difficulty is compounded when the procedure table needs to be tilted to perform a particular procedure. Tilting results in the patient being positioned at an angle, with gravity operating on the patient. When in the Trendelenburg position, reverse Trendelenburg position, or other position where a procedure table is tilted from horizontal, the procedure table may be tilted up to forty-five degrees at times. This can make maintaining the patient's position on the table difficult due to the fact that they can easily slide. Tilting the operating table results in the patient laying supine at an angle, wherein the patient's feet may be above the patient's head or the patient's head may be above the patient's feet. One such common positioning in surgery is the Trendelenburg position, where the patient is tilted at 15 degrees to 45 degrees and the patient's feet are elevated above the patient's head. Another common position is the reverse Trendelenburg position where the patient is tilted at 15 degrees to 45 degrees and the patient's head is elevated about the patient's pelvis. When in the Trendelenburg position, the reverse Trendelenburg position, or other position where a procedure table is tilted from horizontal, it is difficult to maintain the patient's position upon the operating table. Current methods of maintaining patient positioning can cause injury to the patient or increase the patient's level of discomfort.

Compounding this problem is the fact that patients sometimes must be repositioned or moved from one support surface to another. This can be both difficult and time consuming. If there is a need to turn or move a patient, injuries can result if the patient is not handled properly. What's more, the health care service provider can be injured from lifting, bending, or reaching during patient repositioning activities. While such injuries can be sudden, then can also result from cumulative patient repositioning activities, arising after extended performance of patient repositioning activities.

There have been many prior art attempts to provide patient positioners that retain the patient on the procedure table when in the Trendelenburg position, reverse Trendelenburg position, or other position where a procedure table is tilted from horizontal. Many involve padded barriers placed against the patient's body and held against the procedure table by elongated arms extending from rails. The arms are long and thus create large torque moments. These moments cause locking and other mechanical components to wear and fail. Moreover, these complex solutions require the time-consuming manipulation knobs, levers, and latches. Further, the length, bulkiness, and complexity of the bracing and restraining structures can interfere with a surgeon's access to procedural equipment. These patient positioners are frequently ill suited for performing patient repositioning operations as well.

Prior art positioners also fail to properly distribute the pressure applied by the patient's weight against the positioner when in the Trendelenburg position. Without proper distribution of these forces, it becomes isolated at small, concentrated locations on the patient's body. This concentrated pressure can lead to ulceration of the skin.

Embodiments of the disclosure overcome these problems by providing one or more patient positioners that allow both for the reliable and secure positioning of a patient and ease of repositioning the patient should the patient need, for example, to be moved from an operating table to a gurney, bed, or stretcher. In one or more embodiments, the patient positioner comprises an inflatable patient support device. When configured as a patient positioner system, a pad can be included to be placed over the device.

In one or more embodiments, a pump or other air output can be used to inflate the patient positioner. The patient positioner can be used for supporting, transferring, positioning, boosting, turning, and/or otherwise moving a patient on a support surface or between support surfaces.

In one or more embodiments, the patient positioner is equipped with selectively engaging surface gripping zones. In one or more embodiments, the selectively engaging surface gripping zones include "gripping" or "grippy" feet that engage a procedure table when the patient positioner is deflated, but that draw into concave contours of the patient positioner when the patient positioner is inflated, thereby allowing the otherwise low-friction bottom surface of the patient positioner slide along the procedure table. In one or more embodiments, these grippy feet are manufactured from silicone, although other materials can be used as will be obvious to those of ordinary skill in the art having the benefit of this disclosure.

Effectively, due to the deflation of the patient positioner, the grippy feet engage the procedure table when the patient positioner is deflated. In one or more embodiments, the grippy feet of each selectively engaging surface gripping zone is centered along a stitched baffle that runs the length of the patient positioner. In one or more embodiments, the stitched baffle has a height that is less than the air chambers positioned between each stitched baffle. Accordingly, when the patient positioner is inflated, concave lacuna between inflated chambers disengage the procedure table. Since the grippy feet are centered along the stitched baffles, inflation of the patient positioner draws the grippy feet into the concave lacuna, thereby causing them to effectively "retract" and disengage the surface of the procedure table. As the material supporting the selectively engaging surface gripping zones is configured to be a very low friction surface, this allows the patient positioner to slide easily along the surface of the procedure table.

In one or more embodiments, a patient positioner comprises an upper patient positioner surface. The patient positioner also comprises a lower patient positioner surface coupled to the upper patient positioner surface. In one or more embodiments, the patient positioner is configured to rest against a procedure table during a procedure.

In one or more embodiments, a plurality of grippy feet is attached to the lower patient positioner surface. In one or more embodiments, the plurality of grippy feet engage the procedure table when the patient positioner is in a deflated state and disengage the procedure table when the patient positioner is in an inflated state. Advantageously, the engagement of the grippy feet against the table prevents the patient positioner from sliding when deflated. However, when inflated the grippy feet disengage from the table by retracting into concave lacuna, thereby allowing the patient positioner to be easily moved when the air exit holes create an air bearing beneath the lower patient positioner surface and between the patient positioner and the procedure table.

In some embodiments, another plurality of grippy feet is situated on the upper patient positioner surface as well. Such positioning of the grippy feet can prevent a patient from sliding along the patient positioner. Moreover, situating grippy feet on the upper patient positioner surface can work to resist slippage when an incontinence pad or under pad is placed on the upper patient positioner surface between the patient and the patient positioner.

Other advantages offered by embodiments of the disclosure will be described below. Still others will be obvious to those of ordinary skill in the art having the benefit of this disclosure.

Figure 2:
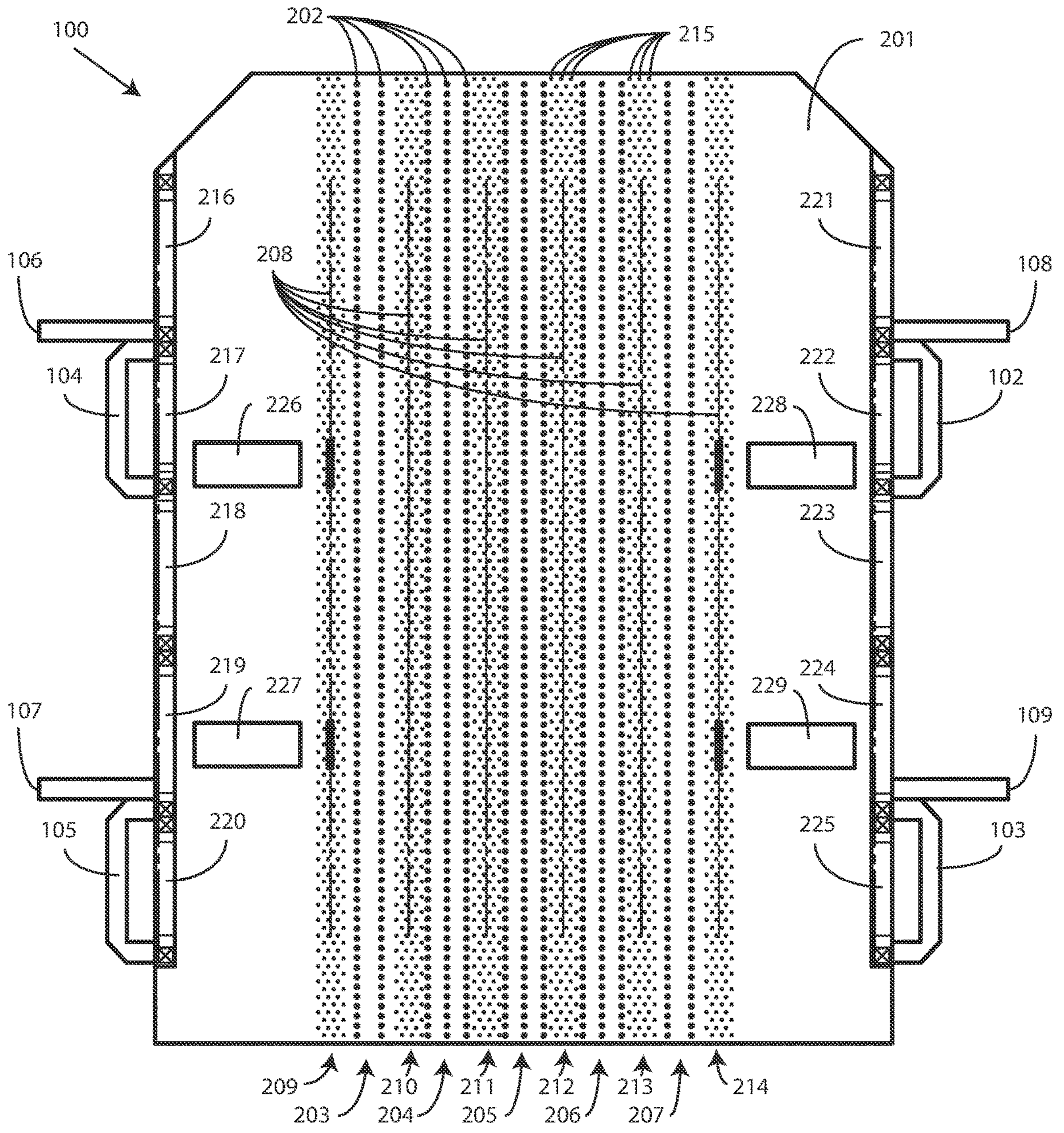
FIG. 2 illustrates a bottom plan view of one explanatory patient positioner in accordance with one or more embodiments of the disclosure.

Turning now to FIGS. 1 and 2, illustrated therein is one explanatory patient positioner 100 in accordance with one or more embodiments of the disclosure. FIG. 1 illustrates a top plan view of the patient positioner 100, while FIG. 2 illustrates a bottom plan view of the patient positioner 100. In one or more embodiments, the patient positioner 100 is selectively inflatable.

In one or more embodiments, the patient positioner 100 is configured for use in positioning a patient on a support surface of a support structure, one example of which is a procedure table. Illustrating by example, in one or more embodiments the patient positioner 100 can be used to transfer a patient from a hospital bed to a gurney or stretcher, and then from the gurney or stretcher to a to a procedure table such as an operating table.

Figure 5:
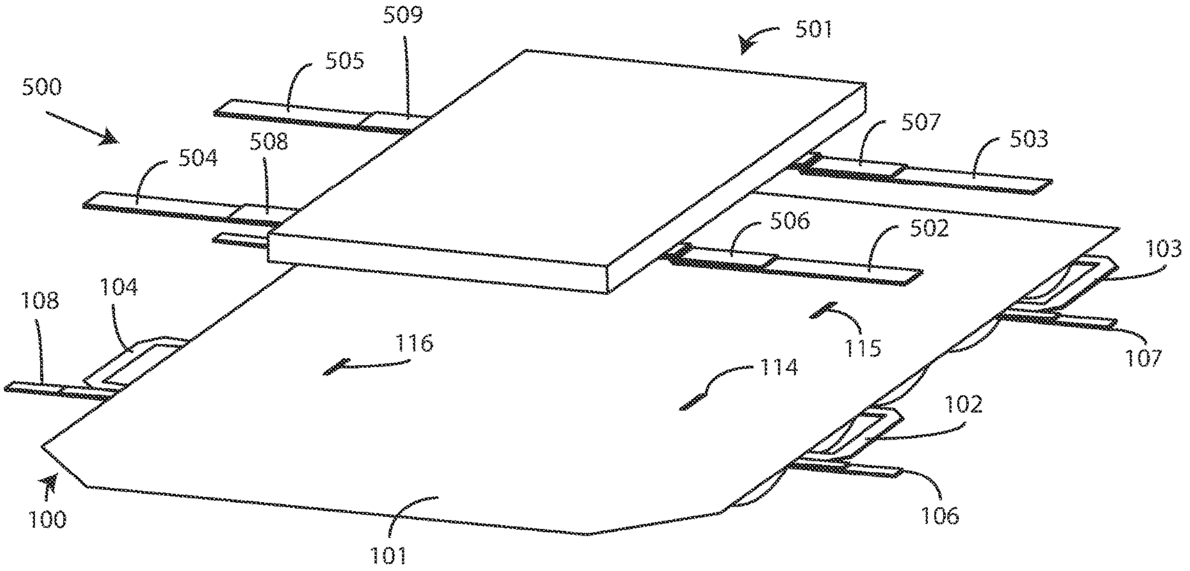
FIG. 5 illustrates an unassembled view of one explanatory patient positioner system in accordance with one or more embodiments of the disclosure.

Turning briefly to FIG. 5, a high-friction pad 501 can be included with the patient positioner 100 to form a patient positioner system 500. Additionally, as will be described below with reference to FIG. 7, an inflation device (700) can be used to selectively inflate, or deflate, the patient positioner 100.

As will further be described below, inflation of the patient positioner 100 causes grippy feet of selectively engaging surface gripping zones to disengage from a support surface, thereby allowing the patient positioner 100 to easily slide along the support surface. By contrast, deflation of the patient positioner 100 causes the grippy feet of the selectively engaging surface gripping zones to engage the support surface to securely retain a patient in a particular location on the support surface.

Turning now back to FIG. 1, in one or more embodiments the patient positioner 100 includes an upper patient positioner surface 101 and a lower patient positioner surface 201. In one or more embodiments, the upper patient positioner surface 101 and the lower patient positioner surface 201 define an inflatable body.

While the upper patient positioner surface 101 and the lower patient positioner surface 201 can be manufactured from the same material in one or more embodiments, in other embodiments the upper patient positioner surface 101 and the lower patient positioner surface 201 will be manufactured from different materials. Illustrating by example, in one or more embodiments the upper patient positioner surface 101 is manufactured from a material defining a high friction surface that can resist slippage when a patient, or alternatively the high-friction pad (501) is positioned along the upper patient positioner surface 101. By contrast, the lower patient positioner surface 201 can be constructed from a low-friction material that allows the patient positioner 100 to slide along a surface.

In one or more embodiments, the lower patient positioner surface 201 defines a plurality of air exit holes 202. In one or more embodiments, inflation of the patient positioner 100 causes air to exit through the air exit holes 202. When this occurs, and when the patient positioner 100 is situated with the lower patient positioner surface 201 on a procedure table, the exiting air creates at least a partial air bearing between the lower patient positioner surface 201 and the procedure table. Moreover, since the patient positioner 100 is wider than a patient, when the patient positioner 100 is inflated the air provides a cushion that distributes the weight of the patient over a larger area of the procedure table than would be the case if the patient were simply lying on the procedure table.

In one or more embodiments, the air bearing created by the air exiting through the air exit holes 202 and the distribution of the weight of a patient over a greater surface area reduces frictional resistance to movement between the patient positioner 100 and the procedure table. In this manner, when air is exiting the air exit holes 202 both the patient positioner 100 and the patient may be easily shifted in different directions along the procedure table. Similarly, the patient positioner 100 can be used to reposition a patient, be it to boost the patient, relocate the patient on a surface, perform lateral transfers of the patient, or perform other repositioning operations. For example, once inflated the patient positioner 100 can be used to transfer a patient from a procedure table to a hospital bed to a surface of a gurney.

In one or more embodiments, the air exit holes 202 are configured as a plurality of sets 203,204,205,206,207. Each set 203,204,205,206,207 is situated between sewn seams 208. As will be described below with reference to FIGS. 7-8, in one or more embodiments the sewn seams 208 couple stitched baffles coupling the upper patient positioner surface 101 and the lower patient positioner surface 201 to define a plurality of inner channels that can inflate with air. As shown in FIG. 2, the air exit holes 202 are centrally positioned between the sewn seams 208 so as to be centrally positioned along each inner channel. Since the inner channels are round when inflated, this allows air to escape the air exit holes 202 at locations to which the procedure table is tangent, thereby increasing the power of the air bearing.

In one or more embodiments, lower patient positioner surface 201 of the patient positioner 100 is equipped with a plurality of selectively engaging surface gripping zones 209,210,211,212,213,214. In one or more embodiments, the selectively engaging surface gripping zones 209,210,211,

212,213,214 include "gripping" or "grippy" feet 215. In one or more embodiments, the grippy feet 215 are attached to the exterior surface of the lower patient positioner surface 201. However, in other embodiments the grippy feet 215 protrude outwardly from an interior of the patient positioner 100. Accordingly, in some other embodiments the grippy feet 215 are attached to an interior surface of the lower patient positioner surface 201 and protrude through the lower patient positioner surface 201 distally away from the exterior of the lower patient positioner surface 201.

In one or more embodiments, the grippy feet 215 engage a procedure table when the patient positioner 100 is deflated. However, when the patient positioner 100 is inflated, the grippy feet 215 draw into concave contours of the patient positioner 100. This retraction into the concave contours of the patient positioner 100 thereby allow the otherwise low-friction lower patient positioner surface 201, combined with the air bearing that occurs when air is escaping the air exit holes 202, to easily slide along a procedure table.

While the grippy feet 215 are positioned on the bottom surface of the patient positioner 100 in the illustrative embodiment of FIG. 2 so as to selectively engage and disengage a procedure table depending upon whether the patient positioner 100 is inflated or deflated, it should be noted that the grippy feet 215 could also be positioned on the top surface of the patient positioner 100 so as to selectively engage the patient or, alternatively as will be described below with reference to FIGS. 5 and 6, a foam pad or other support positioned between the patient and the patient positioner 100 as well.

As will be described in more detail below, where a foam pad is used between a patient and the patient positioner 100, the foam pad can be manufactured from various materials. Examples of such materials include a viscoelastic foam that allows a patient to partially sink into the foam, thereby creating a partial body cavity within the foam that further resists mechanical in addition to the higher friction coefficient of the upper surface of the patient positioner 100. Another example of such a material that can be used is a non-viscoelastic foam that is selected with a high friction coefficient. Other examples of such materials will be described below. Still others will be obvious to those of ordinary skill in the art having the benefit of this disclosure.

In one or more embodiments, each grippy foot 215 is defined as a domed or cylindrical surface having end surfaces that have a high coefficient of friction. The grippy feet 215 can be manufactured from a variety of materials, examples of which include silicone. Silicone works well because it is semi-rigid, has a high coefficient of friction, and is compressible. The silicone can be translucent or can be color-coded to identify a function or brand of the patient positioner 100. The silicone can also be colored so as to match the color of the lower patient positioner surface 201 or the upper patient positioner surface 101.

Other thermoplastics can be used in place of silicone in other embodiments. Illustrating by example, in other embodiments the grippy feet 215 can be manufactured from polyurethane. Other materials from which the grippy feet 215 can be manufactured will be obvious to those of ordinary skill in the art having the benefit of this disclosure. In one or more embodiments, the grippy feet 215 have a higher coefficient of friction than does the lower patient positioner surface 201 of the patient positioner 100. In one or more embodiments, the grippy feet 215 are compressible.

Effectively, when the patient positioner 100 deflates, the grippy feet 215 in the selectively engaging surface gripping zones 209,210,211,212,213,214 engage the procedure table or other surface upon which the patient positioner 100 is placed. As shown in FIG. 2, in one or more embodiments the selectively engaging surface gripping zones 209,210,211, 212,213,214 are centered along each sewn seam 208, while the sets 203,204,205,206,207 of air exit holes 202 are centered between the sewn seams 208.

While the selectively engaging surface gripping zones 209,210,211,212,213,214 are centered along each sewn seam 208 in this illustrative example for maximum disengagement from the procedure table when the patient positioner 100 inflates, embodiments of the disclosure contemplate that they can be positioned in other locations along the lower patient positioner surface 201 as well. Illustrating by example, in another embodiment the selectively engaging surface gripping zones 209,210,211,212,213,214 are situated near the sewn seams 208 without being centered there. In other embodiments, the grippy feet 215 are positioned near the sewn seams 208 but are not arranged in selectively engaging surface gripping zones 209,210,211,212,213,214.

In some embodiments, the grippy feet 215 are situated along the lower patient positioner surface 201 in a region that extends about two thirds of the distance from one sewn seam to a midpoint between that sewn seam and the next adjacent sewn seam. In still other embodiments, the grippy feet 215 are situated along the lower patient positioner surface 201 in a region that extends about seven eighths of the distance from one sewn seam to a midpoint between that sewn seam and the next adjacent sewn seam. In still other embodiments, the grippy feet 215 are situated along the lower patient positioner surface 201 in a region that extends about three quarters of the distance from one sewn seam to a midpoint between that sewn seam and the next adjacent sewn seam. In still other embodiments, the grippy feet 215 are situated along the lower patient positioner surface 201 in a region that extends about half of the distance from one sewn seam to a midpoint between that sewn seam and the next adjacent sewn seam. Embodiments of the disclosure contemplate that the grippy feet 215 can be continuous, but do not extend beyond about two thirds of the distance from one seam to the midpoint between that seam and the next adjacent seam such that when the patient positioner 100 is inflated those grippy feet 215 disengage the procedure table Accordingly, embodiments of the disclosure are not limited by any specific configuration of grippy feet 215 unless specifically set forth in the claims below. Moreover, other configurations for the grippy feet 215 will be obvious to those of ordinary skill in the art having the benefit of this disclosure.

As will be illustrated below with reference to FIGS. 7-8 when the patient positioner 100 is inflated, this causes the air exit holes 202 to situate at the apices of the air channels situated between the sewn seams 208. Meanwhile, the grippy feet 215 of the selectively engaging surface gripping zones 209,210,211,212,213,214 situate in concave lacuna centered at the sewn seams 208. Effectively, as the air channels transition from flat (in the deflated state) to round (in the inflated state), the air exit holes 202 protrude out along the exterior of the air channels while the grippy feet 215 are pulled inward by the sewn seams 208 to draw away from any support surface upon which the patient positioner 100 is positioned. This allows the patient positioner 100 to easily slide along the support surface buoyed by the air bearing like a hockey puck on an air hockey table. When the patient positioner 100 is deflated, the grippy feet 215 again engage the support surface to prevent the patient positioner 100 from sliding.

In one or more embodiments, the patient positioner includes one or more handles 102,103,104,105. In the illustrative embodiment of FIGS. 1-2, the patient positioner 100 has four handles 102,103,104,105, with two being positioned on the right and two being positioned on the left. In one or more embodiments, the handles 102,103,104,105 are exposed such that they can be grasped regardless of whether the upper patient positioner surface 101 is facing upward or the lower patient positioner surface 201 is facing upward.

In one or more embodiments, the handles 102,103,104, 105 are manufactured from a polyester or nylon webbing, although other materials will be obvious to those of ordinary skill in the art having the benefit of this disclosure. In this illustrative embodiment, the handles 102,103,104,105 are stitched to the patient positioner 100 using reinforced cross stitching.

Additionally, in this illustrative embodiment the patient positioner 100 comprises one or more bed strap webbings 106,107,108,109. In this illustrative embodiment, the patient positioner 100 comprises four bed strap webbings 106,107, 108,109, with two extending from each side of the patient positioner 100, although more or fewer could be included in other embodiments. In one or more embodiments, two bed strap webbings 106,107 extend from one side of the patient positioner 100, while two other bed strap webbings 108,109 extend from the other side of the patient positioner 100. While the number of bed strap webbings 106,107,108,109 disposed on each side of the patient positioner 100 is the same in the explanatory embodiment of FIGS. 1 and 2, the number could be different as well. One side may have more securement straps than another.

In one or more embodiments, the ends of each bed strap webbing 106,107,108.109 has attached thereto optional sections of hook fastener material 120,121,122,123, while optional sections of loop fastener material 110,111,112,113 also are attached atop the bed strap webbings 106,107,108, 109. Accordingly, where this fastening material is included, and when the ends of the bed strap webbings 106,107,108, 109 are folded back atop the sections of loop fastener material 110,111,112,113, the bed strap webbings 106,107, 108,109 can be used to fasten the patient positioner 100 to a procedure table. In other embodiments, the sections of loop fastener material 110,111,112,113 can be replaced with a short strap to allow a double-strap configuration with straps of different lengths to extend from the sides of the patient positioner 100 in this illustrative embodiment. Note that the inclusion of hook fastener material 120,121,122,123 and loop fastener material 110,111,112,113 is optional, as in other embodiments the bed strap webbing 106,107,108,109 will not include such material.

Said differently, in one or more embodiments each bed strap webbing 106,107,108,109 has attached thereto a fastener. For example, as shown in FIG. 1, each bed strap webbing 106,107,108,109 has both a hook fastener 120,121, 122,123 and a loop fastener 110,111,112,113 attached thereto. The bed strap webbings 106,107,108,109 can thus be wrapped around accessory rails of a procedure table. The hook fasteners 120,121,122,123 can then attach to the loop fasteners 110,111,112,113 to secure the patient positioner 100 to the procedure table. Where the grippy feet engage the procedure table when the patient positioner 100 is inflated, the high friction upper surface 101 will conveniently and reliably retain patient in position on the procedure table. This is true even when the table is tilted. Accordingly, the patient positioner 100 of FIGS. 1 and 2 is well suited for use as a Trendelenburg positioner, reverse Trendelenburg positioner, or other positioner where a procedure table is tilted from horizontal. Note that the inclusion of hook fastener material 120,121,122,123 and loop fastener material 110, 111,112,113 is optional, as in other embodiments the bed strap webbing 106,107,108,109 will not include such material.

It should be additionally noted that where fasteners are included, the hook fasteners 120,121,122,123 and loop fasteners 110,111,112,113 of the bed strap webbings 106, 107,108,109 are but one example of a fastener suitable for attaching the patient positioner 100 to a procedure table, others will be obvious to those of ordinary skill in the art having the benefit of this disclosure. Illustrating by example, rather than using hook fasteners 120,121,122,123 and loop fasteners 110,111,112,113, each bed strap webbing 106,107, 108,109 can comprise a buckle instead. An end of such a securement strap can pass back through the buckle to secure the patient positioner 100 to the procedure table. Other securement mechanisms suitable for use with the patient positioner will be obvious to those of ordinary skill in the art having the benefit of this disclosure.

On the bottom side of the patient positioner 100, one or more side rail loops 216,217,218, 219,220,221,222,223,224, 225 (shown hanging down in three dimensions in FIGS. 5-6) that are sewn to the lower patient positioner surface 201 with reinforced cross stitching. Like the handles 102,103,104,105 and bed strap webbings 106,107,108,109, the one or more side rail loops 216, 217,218,219,220,221,222,223,224,225 can be manufactured from a polyester or nylon webbing. Other materials suitable for manufacturing these webbings will be obvious to those of ordinary skill in the art having the benefit of this disclosure.

As noted above, in one or more embodiments a high-friction pad (501) can be included with the patient positioner 100 to form a patient positioner system (500). The patient positioner 100 of FIGS. 1-2 has been configured to work in tandem with such a high-friction pad (501). Accordingly, high-friction pad features have been incorporated into the patient positioner 100. Where the patient positioner 100 is to be used as a standalone device, these features can be omitted.

As best seen in FIG. 1, in one or more embodiments the patient positioner 100 defines four slots 114,115,116,117. In one or more embodiments, as shown in FIG. 2, the one or more slots 114,115,116,117 are situated centrally within the one or more selectively engaging surface gripping zones. While the four slots 114,115,116,117 are used with a patient positioner 100 that is inflatable in this illustrative embodiment, it should be noted that they can be used with any patient positioner, regardless of whether the patient positioner is inflatable.

As will be shown in more detail with reference to FIGS. 5-6 below, in one or more embodiments the high-friction pad (501) includes straps that extend distally from its sides. In one or more embodiments, these straps can include hook fasteners. Accordingly, as shown in FIG. 2, the lower patient positioner surface 201 can include one or more loop fasteners 226,227,228,229 that are configured to attach to the hook fasteners coupled to the straps extending from the high-friction pad (501). Of course, the opposite convention could be used with the one or more loop fasteners 226,227,228,229 being replaced by hook fasteners that attach to loop fasteners coupled to the straps that extend from the high-friction pad (501).

Thus, in one or more embodiments a patient positioner comprises a plurality of slots 114,115,116,117 through which straps extending from a high-friction pad can pass. When those straps of the high-friction pad include fasteners, one example of which are hook fasteners, the bottom surface of the patient positioner can include one or more loop fasteners 226,227,228,229 that are configured to attach to the hook fasteners coupled to the straps extending from the high-friction pad (501). Again, this allows secure attachment of the high-friction pad to the patient positioner regardless of whether the patient positioner is inflatable, as is the patient positioner 100 of FIGS. 1 and 2, and regardless of whether the patient positioner includes any selectively engaging surface gripping zones 209,210,211,212,213,214.

In one or more embodiments, the patient positioner 100 measures about fifty inches in length and about thirty-eight inches in width. In one or more embodiments, the sewn seams 208 are about four inches apart, with the left most sewn seam 208 being about nine inches from the left side of the patient positioner 100. Similarly, the right most sewn seam 208 is also about nine inches away from the right side of the patient positioner 100. These dimensions are illustrative only, as others will be obvious to those of ordinary skill in the art having the benefit of this disclosure.

In one or more embodiments, the upper end of the patient positioner 100 includes two forty-five degree inwardly sloping edges 118,119. These inwardly sloping edges 118,119 are sometimes referred to as "chamfered" edges. This causes the upper portion of the patient positioner 100 situated between the uppermost, reinforced cross stitching at the top edge to define a frustoconical shape. The remainder of the patient positioner 100 extending downward (as viewed in FIGS. 1-2) from the frustoconical shape is substantially rectangular in this illustrative embodiment.

The shape of the patient positioner 100 may be different in other embodiments, including taking different shapes with varying degrees of symmetry. Illustrating by example, in other embodiments the patient positioner 100 can be rectangular with no inwardly sloping edges 118,119. However, when the inwardly sloping edges 118,119 are included, they can provide additional benefits.

During inflation, for instance, when the air enters between the upper patient positioner surface 101 and the lower patient positioner surface 201, in one or more embodiments inflates the periphery of the patient positioner 100 surrounding the patient first. Thereafter, the air gently raises the patient above the procedure table. The inclusion of the inwardly sloping edges 118,119 can function to allow the inflation profile to conform more closely to the patient's anatomical contours. During deflation of the patient positioner 100, the inclusion of the inwardly sloping edges 118,119 can allow for more complete deflation as well. (If configured as a rectangle, air may remain near the head.) Inclusion of the inwardly sloping edges 118,119 allows the weight of the shoulders and head of the patient to fully deflate the cavity of air. As noted above, in other embodiments the patient positioner 100 may have a different shape.

As will be described below with reference to FIG. 7, an inflation device (700) can be used to selectively inflate, or deflate, the patient positioner 100. In one or more embodiments, inflation of the patient positioner 100 causes the grippy feet 215 of selectively engaging surface gripping zones 209,210,211,212,213,214 to disengage from a support surface, thereby allowing the patient positioner 100 to easily slide along the support surface. By contrast, deflation of the patient positioner 100 causes the grippy feet 215 of the selectively engaging surface gripping zones 209,210,211, 212,213,214 to engage the support surface to securely retain a patient in a particular location on the support surface. Advantageously, this allows ease of patient positioning and repositioning, such as when a patient is transferred to or from a procedure table. It should be noted that the patient positioner 100 of FIGS. 1-2 can be used in tandem with one or more bed sheets (such as a fitted sheet or flat sheet), as well as pillows, blankets, or additional sheets.

In one or more embodiments, the patient positioner 100 is flexible and foldable when in the non-inflated state. The patient positioner 100 is configured to be positioned on a procedure table so that the lower patient positioner surface 201 faces, abuts, or confronts the procedure table. Illustrating by example, the lower patient positioner surface 201, as shown in FIG. 2, may be in contact with the procedure table, or may face, abut, or confront the procedure table with grippy feet 215 situated between the patient positioner 100 and the procedure table, and abutting the procedure table to prevent the patient positioner 100 from sliding.

Figure 3A:
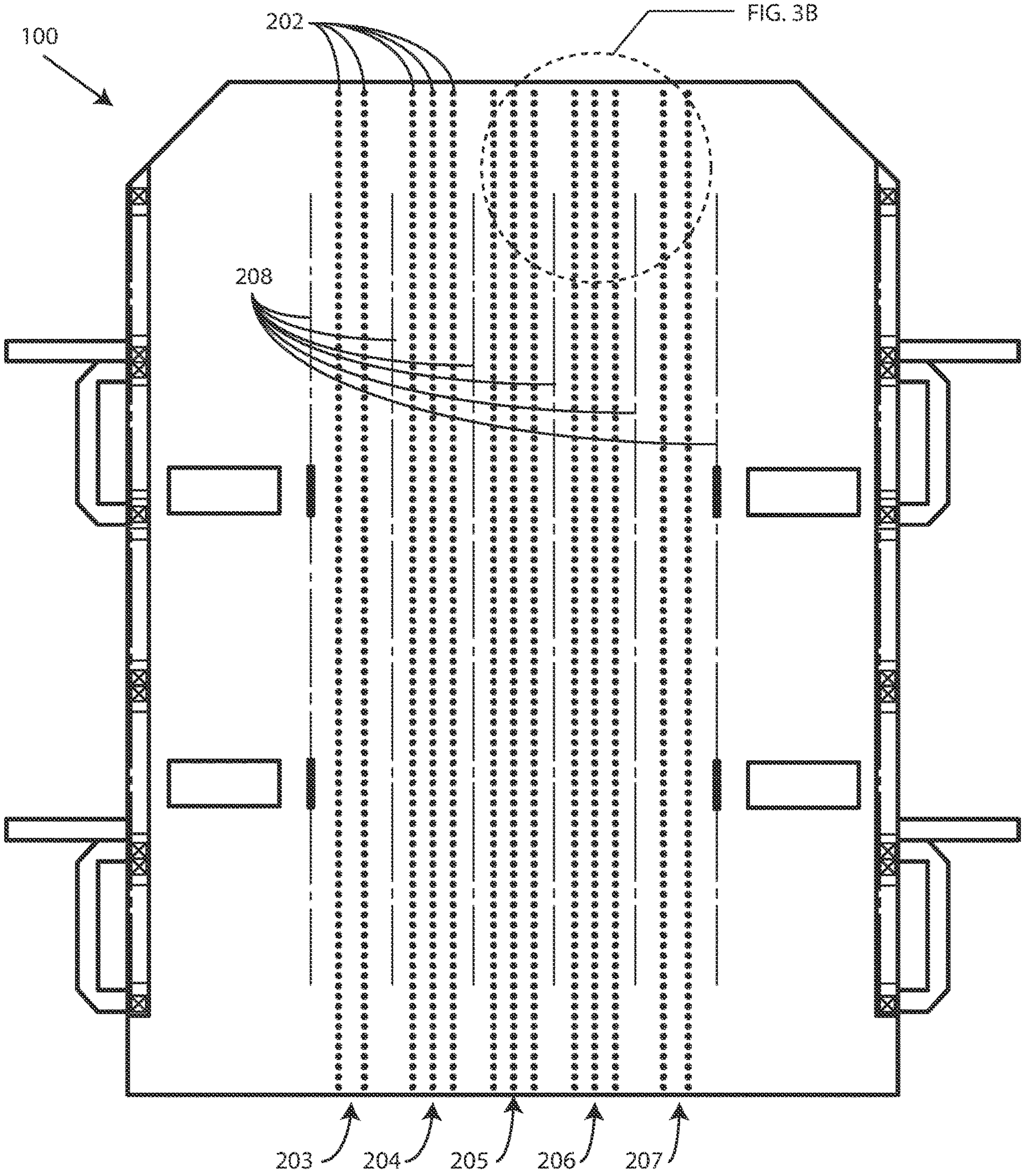
FIG. 3A illustrates the bottom plan view of FIG. 2, but with the selectively engaging surface gripping zones not illustrated for easier visibility of the air exit holes.

Turning now to FIG. 3A, illustrated therein is the bottom side of the patient positioner 100, but with the grippy feet (215) removed so that the air exit holes 202 can be more easily seen. In one or more embodiments, each air exit hole 202 has a diameter of about 0.03 inches.

As shown, the sewn seams 208 define five centrally situated air chambers, with the sets 203,204,205,206,207 of air exit holes 202 centrally situated along those air chambers. In this illustrative embodiment, the outer sets 203,207 comprise two columns of air exit holes 202, while the three central sets 204,205,206 each comprise three columns of air exit holes 202. Other configurations for the air exit holes 202 will be obvious to those of ordinary skill in the art having the benefit of this disclosure.

Figure 3B:
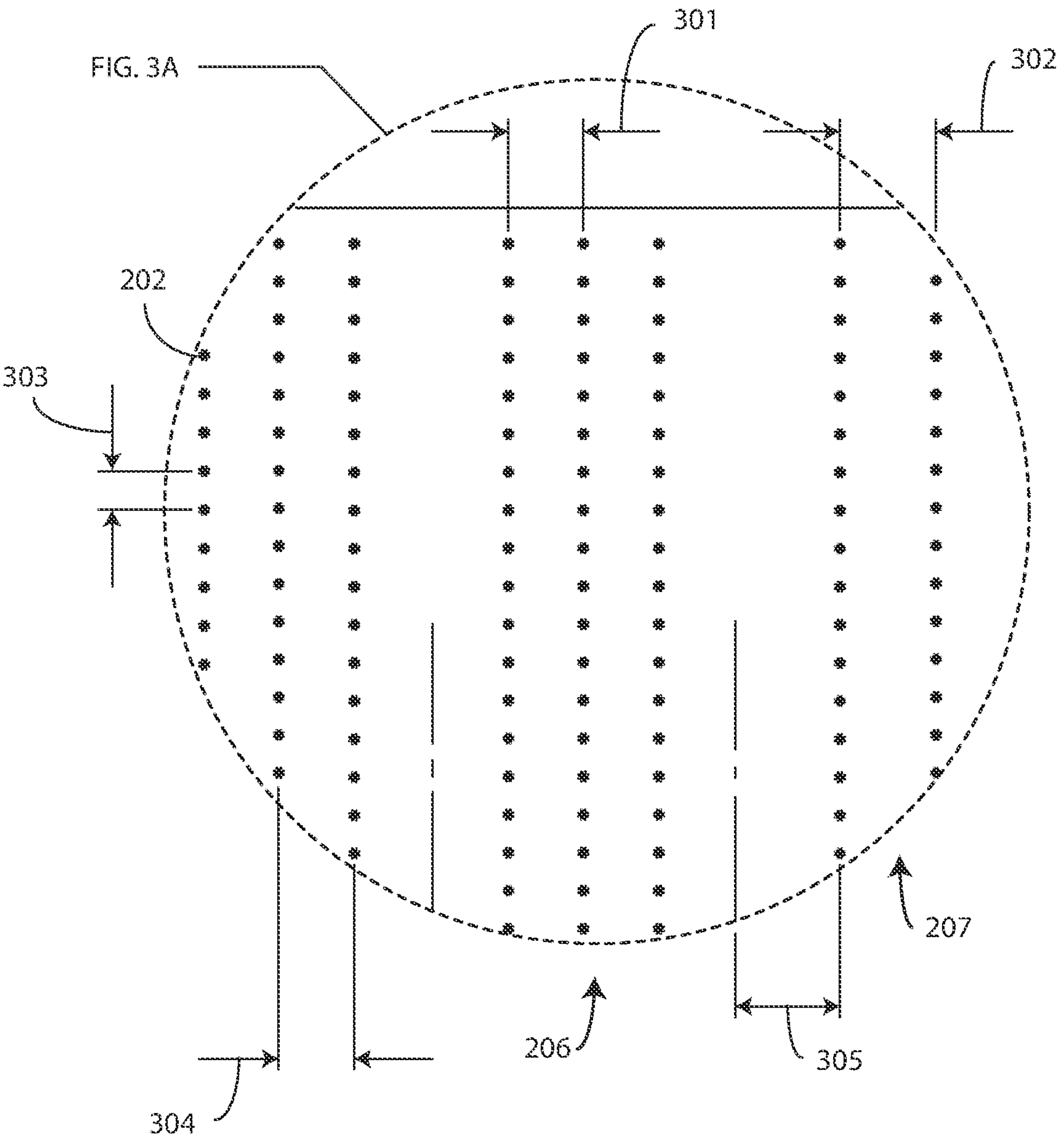
FIG. 3B shows an explanatory section of air exit holes in accordance with one or more embodiments of the disclosure.

Turning to FIG. 3B, explanatory dimensions for the air exit holes 202 are shown. In one or more embodiments, the air exit holes 202 of the three central groups (204),(205),206 have a distance 301,304 therebetween of about one inch, while the air exit holes 202 of the outer groups (203),207 have a separation distance 302 of about 1.25 inches. The vertical distance 303 between air exit holes 202 is about half an inch, while the spacing 305 between the sewn seam 208 and air exit holes columns is about 1.38 inches. This spacing 305 allows the grippy feet (215) to be situated between the air exit holes columns at locations centered along the sewn seams 208 so that they may retract into concave lacuna when the patient positioner (100) inflates. It should be noted that the dimensions of FIG. 3B are illustrative only. Others will be obvious to those of ordinary skill in the art having the benefit of this disclosure.

Figure 4A:
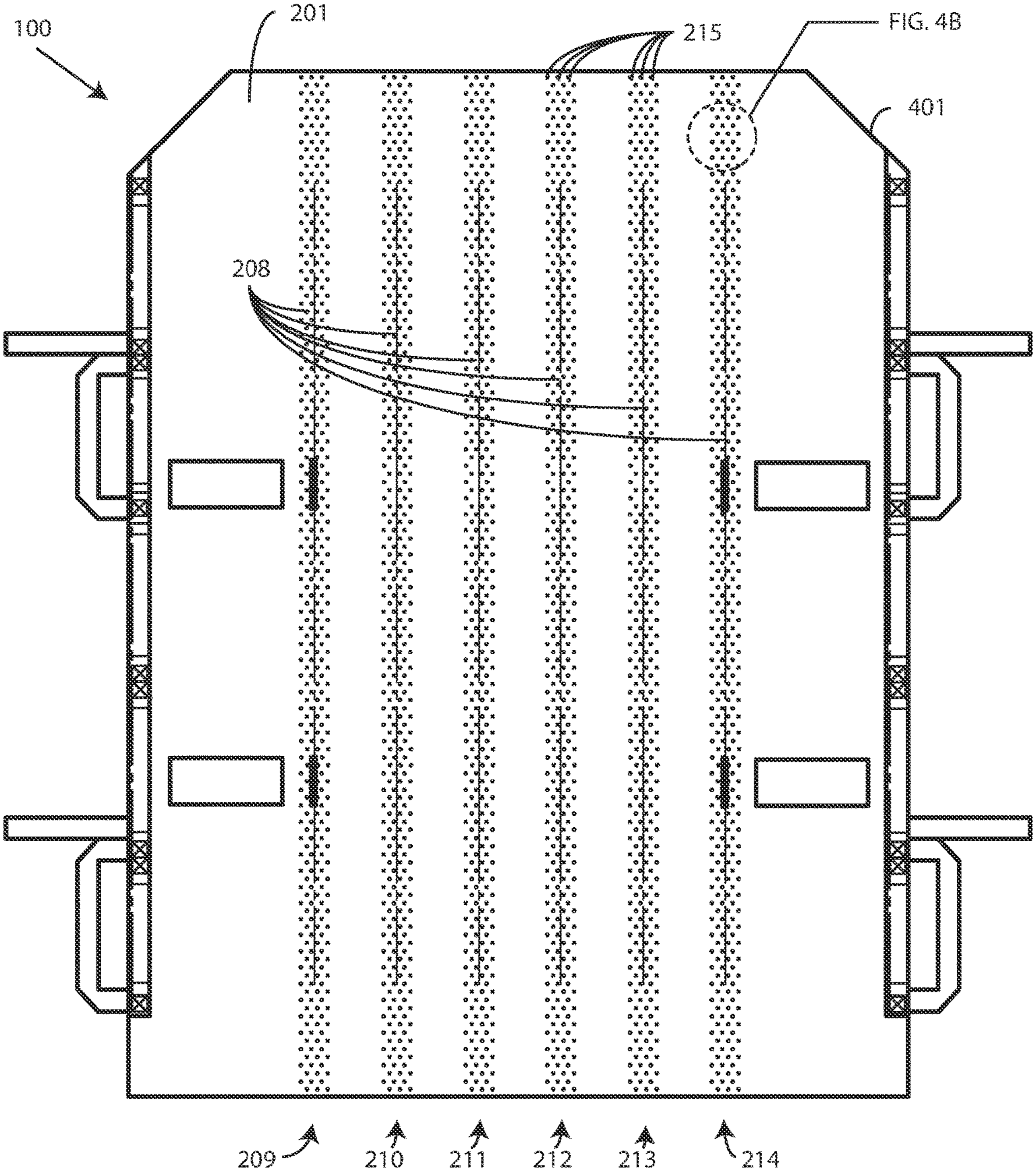
FIG. 4A shows the bottom plan view of FIG. 2, but with the air exit holes not illustrated for easier visibility of the selectively engaging surface gripping zones.

Turning now to FIG. 4A, illustrated therein is the bottom side of the patient positioner 100, but with the air exit holes (202) removed so that the selectively engaging surface gripping zones 209,210,211,212,213,214 of grippy feet 215 can be more easily seen. In one or more embodiments, the grippy feet are arranged in alternating, offset rows along a length of each selectively engaging surface gripping zone of the one or more selectively engaging surface gripping zones 209,210,211,212,213,214. This is shown in more detail in FIG. 4B.

As also shown in FIG. 4A, the upper patient positioner surface (101) is coupled to the lower patient positioner surface 201 along a perimeter 401. As will be described below with reference to FIGS. 7-8, one or more baffles are coupled between the upper patient positioner surface (101) and the lower patient positioner surface 201 using the sewn seams. These baffles are therefore situated interior of the perimeter 401. Additionally, these baffles define a plurality of air chambers within the patient positioner 100.

In this illustrative embodiment, the selectively engaging surface gripping zones 209,210, 211,212,213,214 are attached to the lower patient positioner surface 201. As shown in FIG. 4A, the selectively engaging surface gripping zones 209,210,211,212,213,214 are positioned centrally along the sewn seams 208, which positions the selectively engaging surface gripping zones 209, 210,211,212,213,214 centrally along the one or more baffles on a one-to-one basis. As will be shown in FIG. 9 below, this results in the grippy feet 215 of the selectively engaging surface gripping zones 209,210,211,212,213,214 extending beyond exterior surfaces of the plurality of air chambers when in a deflated state. However, as will be shown below in FIG. 10, the grippy feet 215 retract within concave lacuna situated beneath apices of the plurality of air chambers when in the inflated state.

Thus, in one or more embodiments the selectively engaging surface gripping zones 209,210,211,212,213,214 run the length of the patient positioner 100 as shown in FIG. 4A. However, in other embodiments, the selectively engaging surface gripping zones 209,210,211,212,213,214 can be confined only to the length of the baffle, which results in there being space between the selectively engaging surface gripping zones 209,210,211,212,213,214 and the top and bottom of the patient positioner 100. Other configurations will be obvious to those of ordinary skill in the art having the benefit of this disclosure.

Once again, the sewn seams 208 define five centrally situated air chambers. However, rather than being positioned centrally on these air chambers, the selectively engaging surface gripping zones 209,210,211, 212,213,214 of grippy feet 215 are centrally situated on the sewn seams 208. This places them only on the outer edges of each air chamber. Other configurations for the selectively engaging surface gripping zones 209,210,211,212,213,214 will be obvious to those of ordinary skill in the art having the benefit of this disclosure.

Figure 4B:
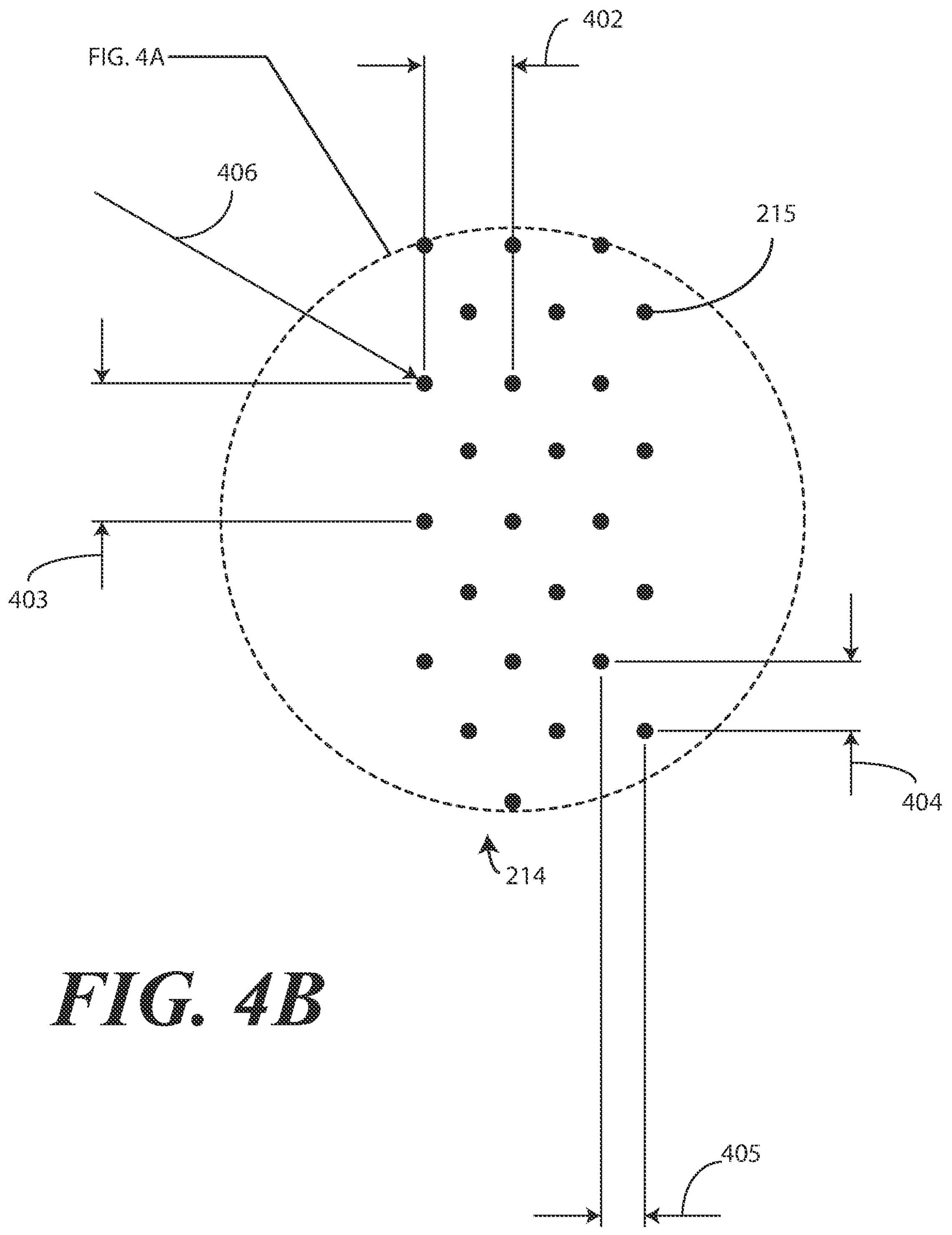
FIG. 4B illustrates an explanatory section of the selectively engaging surface gripping zones in accordance with one or more embodiments of the disclosure.

Turning to FIG. 4B, explanatory dimensions for the selectively engaging surface gripping zones (209),(210), (211),(212),(213),214 are shown. As noted above, in this embodiment the grippy feet 215 are arranged in alternating, offset rows. In this example, each row comprises three grippy feet 215.

In this illustrative embodiment, each grippy feet 215 has a diameter 406 of about 0.08 inches. The grippy feet 215 of the selectively engaging surface gripping zones (209),(210), (211),(212),(213),214 are arranged as alternating offset rows of three grippy feet 215 in this illustrative embodiment, with the vertical spacing 404 between rows being about 0.39 inches. The rows are offset 405 by about a quarter of an inch in this illustrative embodiment.

In one or more embodiments, the grippy feet 215 of each row are separated by a distance 402 of about half an inch, while the vertical separation 403 between any two vertically aligned grippy feet 215 is about 0.79 inches. As with the dimensions of FIG. 3B, the dimensions of FIG. 4B are illustrative only. Others will be obvious to those of ordinary skill in the art having the benefit of this disclosure.

To this point, the patient positioner 100 has been described as including one or more bed strap webbings 106,107,108,109 extending distally from the sides of the patient positioner 100. However, since the selectively engaging surface gripping zones (209),(210),(211),(212), (213),214 engage the procedure table, in other embodiments the one or more bed strap webbings 106,107,108,109 are unnecessary.

Figure 19:
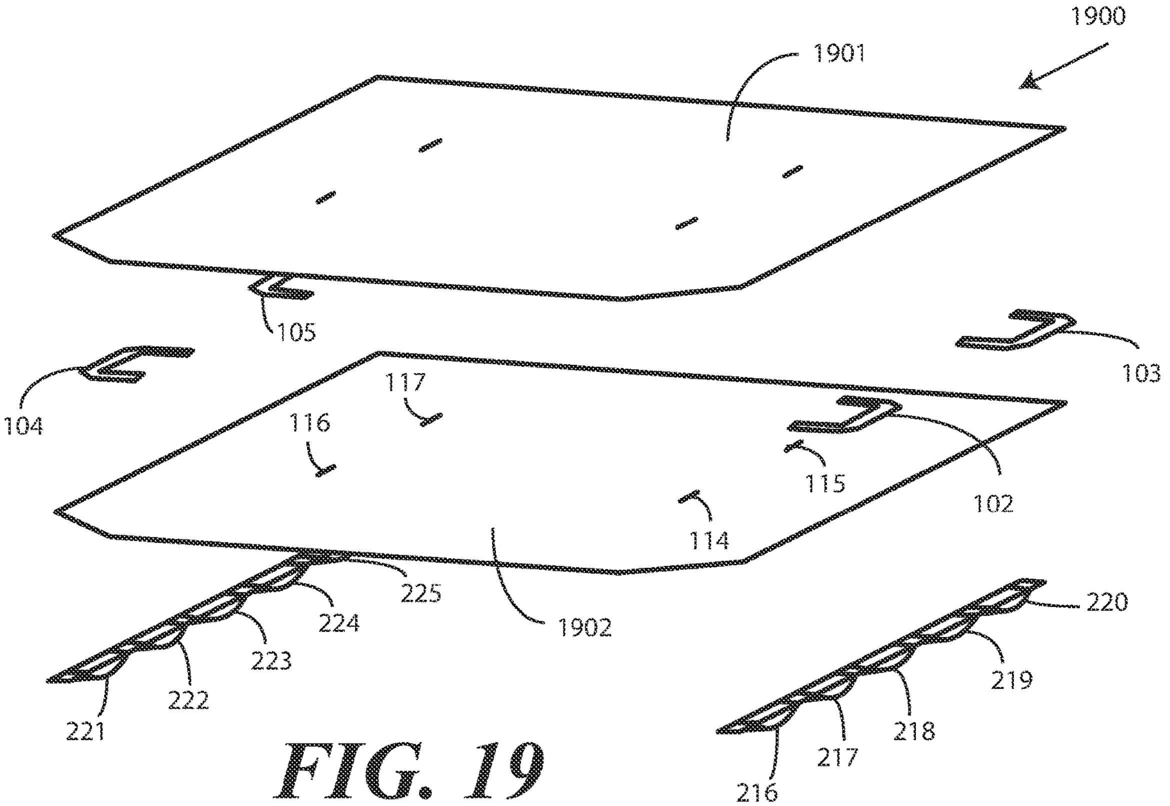
FIG. 19 illustrates an exploded view of another explanatory patient positioner in accordance with one or more embodiments of the disclosure.
Figure 20:
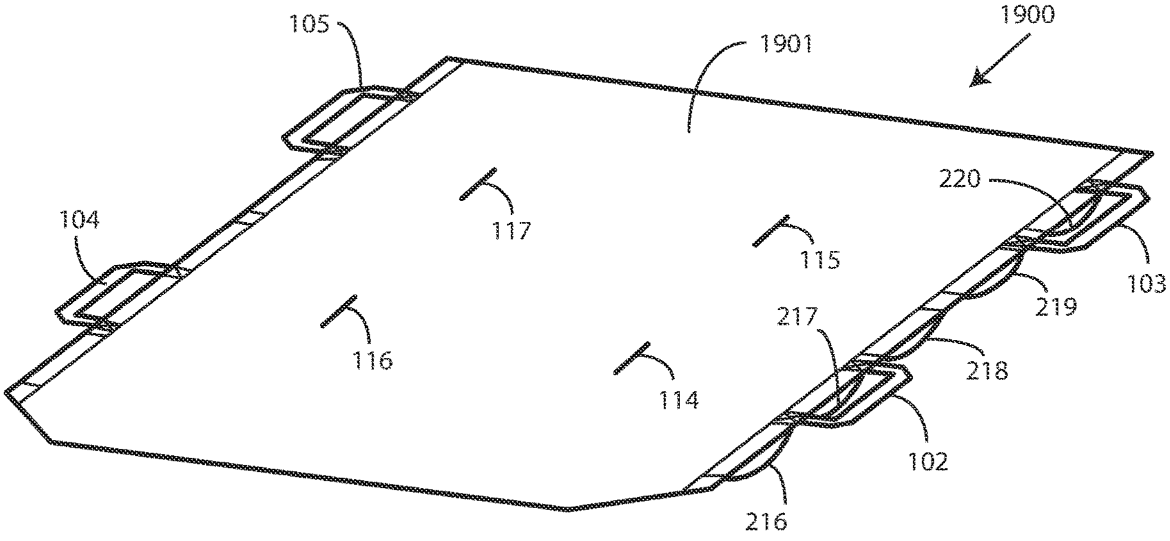
FIG. 20 illustrates a perspective view of another explanatory patient positioner in accordance with one or more embodiments of the disclosure.
Figure 21:
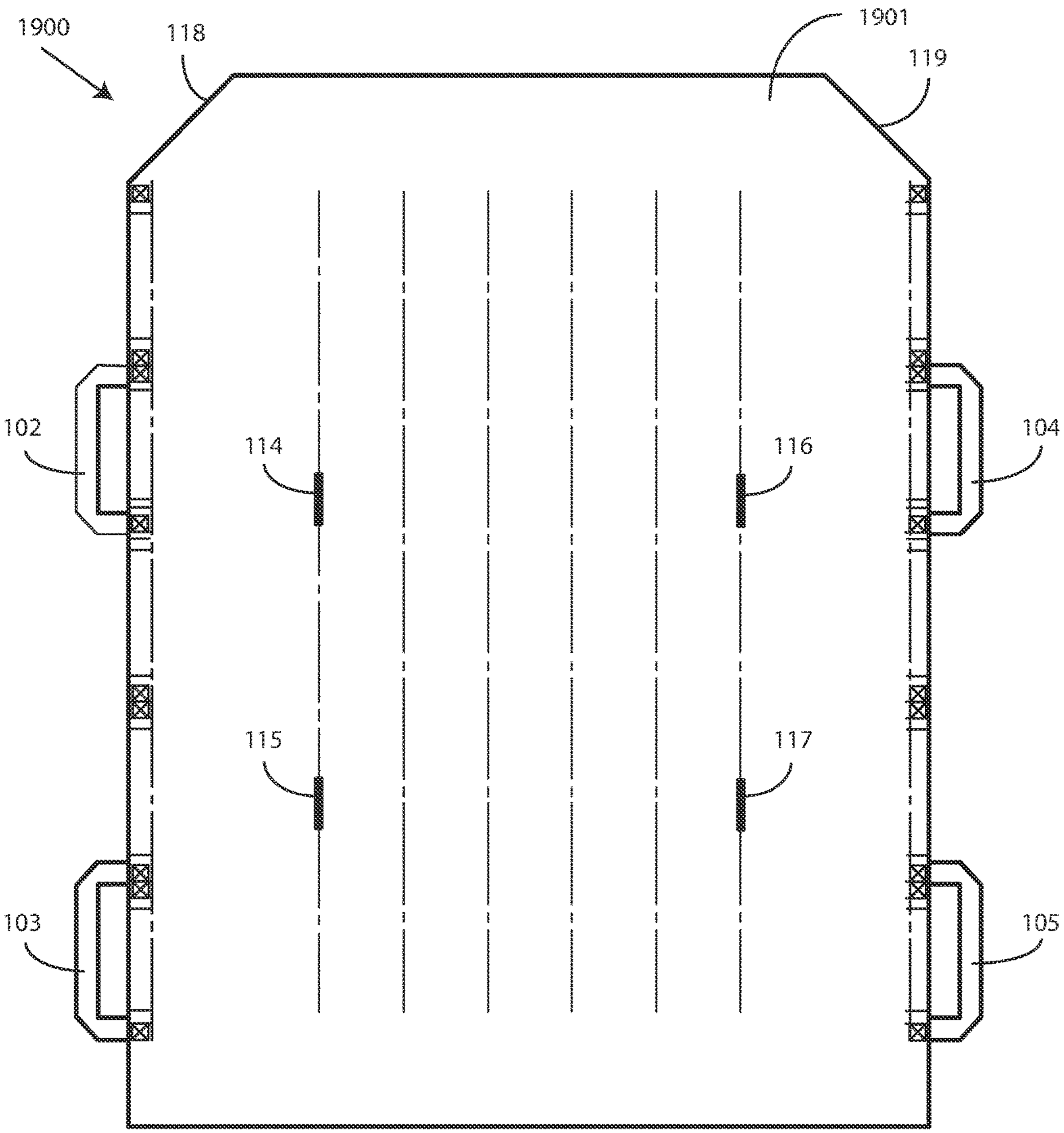
FIG. 21 illustrates a top plan view of another explanatory patient positioner in accordance with one or more embodiments of the disclosure.
Figure 22:
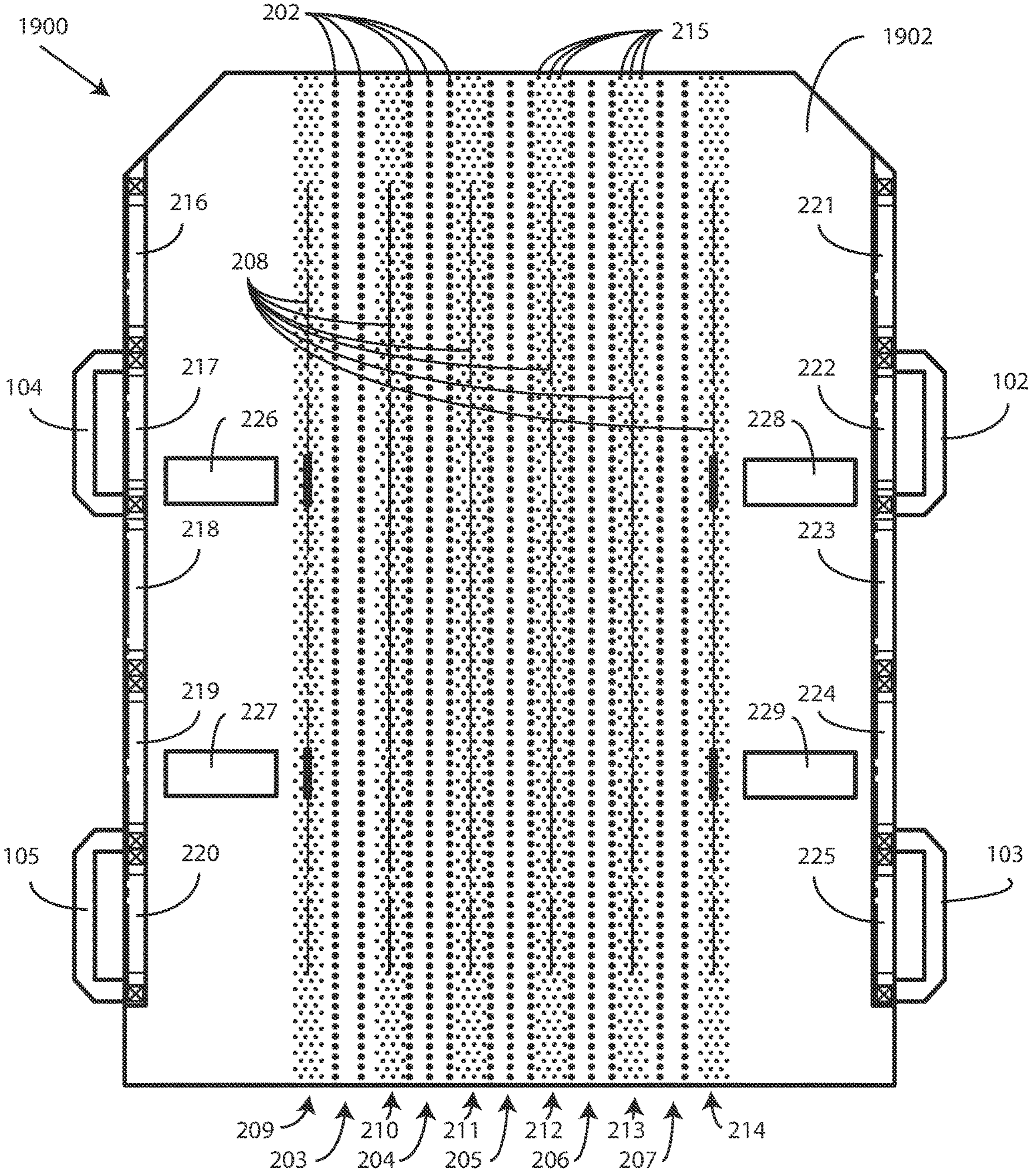
FIG. 22 illustrates a bottom plan view of another explanatory patient positioner in accordance with one or more embodiments of the disclosure.

Turning now to FIGS. 19-22, illustrated therein is one such patient positioner 1900. The patient positioner 1900 is shown in an exploded view in FIG. 19 and an assembled view in FIG. 20. FIG. 21 illustrates a top plan view of the patient positioner 1900, while FIG. 22 illustrates a bottom plan view of the patient positioner 1900. In one or more embodiments, the patient positioner 1900 is selectively inflatable.

In one or more embodiments, the patient positioner 1900 is configured for use in positioning a patient on a support surface of a support structure, one example of which is a procedure table. Illustrating by example, in one or more embodiments the patient positioner 1900 can be used to transfer a patient from a hospital bed to a gurney or stretcher, and then from the gurney or stretcher to a to a procedure table such as an operating table.

As before, a high-friction pad (501) can be included with the patient positioner 100 to form a patient positioner system (500). Additionally, an inflation device (700) can be used to selectively inflate, or deflate, the patient positioner 1900.

As before, inflation of the patient positioner 1900 causes grippy feet of selectively engaging surface gripping zones to disengage from a support surface, thereby allowing the patient positioner 1900 to easily slide along the support surface. By contrast, deflation of the patient positioner 1900 causes the grippy feet of the selectively engaging surface gripping zones to engage the support surface to securely retain a patient in a particular location on the support surface.

In one or more embodiments the patient positioner 1900 includes an upper patient positioner surface 1901 and a lower patient positioner surface 1902. In one or more embodiments, the upper patient positioner surface 1901 and the lower patient positioner surface 1902 define an inflatable body.

While the upper patient positioner surface 1901 and the lower patient positioner surface 1902 can be manufactured from the same material in one or more embodiments, in other embodiments the upper patient positioner surface 1901 and the lower patient positioner surface 1902 will be manufactured from different materials. Illustrating by example, in one or more embodiments the upper patient positioner surface 1901 is manufactured from a material defining a high friction surface that can resist slippage when a patient, or alternatively the high-friction pad (501) is positioned along the upper patient positioner surface 1901. By contrast, the lower patient positioner surface 1902 can be constructed from a low-friction material that allows the patient positioner 1900 to slide along a surface.

In one or more embodiments, the lower patient positioner surface 1902 defines a plurality of air exit holes 202. In one or more embodiments, inflation of the patient positioner 1900 causes air to exit through the air exit holes 202. When this occurs, and when the patient positioner 1900 is situated with the lower patient positioner surface 1902 on a procedure table, the exiting air creates at least a partial air bearing between the lower patient positioner surface 1902 and the procedure table. Moreover, since the patient positioner 1900 is wider than a patient, when the patient positioner 1900 is inflated the air provides a cushion that distributes the weight of the patient over a larger area of the procedure table than would be the case if the patient were simply lying on the procedure table.

In one or more embodiments, the air bearing created by the air exiting through the air exit holes 202 and the distribution of the weight of a patient over a greater surface area reduces frictional resistance to movement between the patient positioner 1900 and the procedure table. In this manner, when air is exiting the air exit holes 202 both the patient positioner 1900 and the patient may be easily shifted in different directions along the procedure table. Similarly, the patient positioner 1900 can be used to reposition a patient, be it to boost the patient, relocate the patient on a surface, perform lateral transfers of the patient, or perform other repositioning operations. For example, once inflated the patient positioner 1900 can be used to transfer a patient from a procedure table to a hospital bed to a surface of a gurney.

In one or more embodiments, the air exit holes 202 are configured as a plurality of sets 203,204,205,206,207. Each set 203,204,205,206,207 is situated between sewn seams 208. In one or more embodiments the sewn seams 208 couple stitched baffles coupling the upper patient positioner surface 1901 and the lower patient positioner surface 1902 to define a plurality of inner channels that can inflate with air. As shown in FIG. 22, the air exit holes 202 are centrally positioned between the sewn seams 208 so as to be centrally positioned along each inner channel. Since the inner channels are round when inflated, this allows air to escape the air exit holes 202 at locations to which the procedure table is tangent, thereby increasing the power of the air bearing.

In one or more embodiments, lower patient positioner surface 1902 of the patient positioner 1900 is equipped with a plurality of selectively engaging surface gripping zones 209,210,211,212,213,214. In one or more embodiments, the selectively engaging surface gripping zones 209,210,211, 212,213,214 include "gripping" or "grippy" feet 215. In one or more embodiments, the grippy feet 215 engage a procedure table when the patient positioner 1900 is deflated. However, when the patient positioner 1900 is inflated, the grippy feet 215 draw into concave contours of the patient positioner 1900. This retraction into the concave contours of the patient positioner 1900 thereby allow the otherwise low-friction lower patient positioner surface 201, combined with the air bearing that occurs when air is escaping the air exit holes 202, to easily slide along a procedure table.

While the grippy feet 215 are positioned on the bottom surface of the patient positioner 1900 in the illustrative embodiment of FIG. 22 so as to selectively engage and disengage a procedure table depending upon whether the patient positioner 1900 is inflated or deflated, it should be noted that the grippy feet 215 could also be positioned on the top surface of the patient positioner 1900 so as to selectively engage the patient or, alternatively, a foam pad or other support positioned between the patient and the patient positioner 1900 as well.

In one or more embodiments, each grippy foot 215 is defined as a domed or cylindrical surface having end surfaces that have a high coefficient of friction. The grippy feet 215 can be manufactured from a variety of materials, examples of which include silicone. Silicone works well because it is semi-rigid, has a high coefficient of friction, and is compressible. The silicone can be translucent or can be color-coded to identify a function or brand of the patient positioner 1900. The silicone can also be colored so as to match the color of the lower patient positioner surface 1902 or the upper patient positioner surface 1901.

Other thermoplastics can be used in place of silicone in other embodiments. Illustrating by example, in other embodiments the grippy feet 215 can be manufactured from polyurethane. Other materials from which the grippy feet 215 can be manufactured will be obvious to those of ordinary skill in the art having the benefit of this disclosure. In one or more embodiments, the grippy feet 215 have a higher coefficient of friction than does the lower patient positioner surface 201 of the patient positioner 1900. In one or more embodiments, the grippy feet 215 are compressible.

Effectively, when the patient positioner 1900 deflates, the grippy feet 215 in the selectively engaging surface gripping zones 209,210,211,212,213,214 engage the procedure table or other surface upon which the patient positioner 100 is placed. As shown in FIG. 22, in one or more embodiments the selectively engaging surface gripping zones 209,210, 211,212,213,214 are centered along each sewn seam 208, while the sets 203,204,205,206,207 of air exit holes 202 are centered between the sewn seams 208. When the patient positioner 100 is inflated, this causes the air exit holes 202 to situate at the apices of the air channels situated between the sewn seams 208.

Meanwhile, the grippy feet 215 of the selectively engaging surface gripping zones 209,210,211,212,213,214 situate in concave lacuna centered at the sewn seams 208. Effectively, as the air channels transition from flat (in the deflated state) to round (in the inflated state), the air exit holes 202 protrude out along the exterior of the air channels while the grippy feet 215 are pulled inward by the sewn seams 208 to draw away from any support surface upon which the patient positioner 1900 is positioned. This allows the patient positioner 1900 to easily slide along the support surface buoyed by the air bearing like a hockey puck on an air hockey table. When the patient positioner 1900 is deflated, the grippy feet 215 again engage the support surface to prevent the patient positioner 1900 from sliding.

In one or more embodiments, the patient positioner includes one or more handles 102,103,104,105. In the illustrative embodiment of FIGS. 19-22, the patient positioner 1900 has four handles 102,103,104,105, with two being positioned on the right and two being positioned on the left. In one or more embodiments, the handles 102,103,104,105 are exposed such that they can be grasped regardless of whether the upper patient positioner surface 1901 is facing upward or the lower patient positioner surface 1902 is facing upward.

In one or more embodiments, the handles 102,103,104, 105 are manufactured from a polyester or nylon webbing, although other materials will be obvious to those of ordinary skill in the art having the benefit of this disclosure. In this illustrative embodiment, the handles 102,103,104,105 are stitched to the patient positioner 1900 using reinforced cross stitching.

On the bottom side of the patient positioner 1900, one or more side rail loops 216,217,218,219,220,221,222,223,224, 225 that are sewn to the lower patient positioner surface 1902 with reinforced cross stitching. Like the handles 102, 103,104,105, the one or more side rail loops 216, 217,218, 219,220,221,222,223,224,225 can be manufactured from a polyester or nylon webbing. Other materials suitable for manufacturing these webbings will be obvious to those of ordinary skill in the art having the benefit of this disclosure.

As noted above, in one or more embodiments a high-friction pad (501) can be included with the patient positioner 1900 to form a patient positioner system (500). The patient positioner 1900 of FIGS. 19-22 has been configured to work in tandem with such a high-friction pad (501). Accordingly, high-friction pad features have been incorporated into the patient positioner 1900. Where the patient positioner 1900 is to be used as a standalone device, these features can be omitted.

As best seen in FIGS. 19-21, in one or more embodiments the patient positioner 1900 defines four slots 114,115,116, 117. In one or more embodiments, as shown in FIG. 22, the one or more slots 114,115,116,117 are situated centrally within the one or more selectively engaging surface gripping zones. In addition to the slots 114,115,116,117 being centrally located on the selectively engaging surface gripping zones, in one or more embodiments the slots 114,115,116, 117 are also located along the baffles that couple the upper patient positioner system surface 1900 and lower patient positioner surface 1902 together. Being located along the baffles is advantageous because it reduces stress on the slot border/attachment point in one or more embodiments.

In one or more embodiments the high-friction pad (501) used in conjunction with the patient positioner 1900 includes straps that extend distally from its sides. In one or more embodiments, these straps can include hook fasteners. Accordingly, as shown in FIG. 22, the lower patient positioner surface 1902 can include one or more loop fasteners 226,227,228,229 that are configured to attach to the hook fasteners coupled to the straps extending from the high-friction pad (501). Of course, the opposite convention could be used with the one or more loop fasteners 226,227,228,229 being replaced by hook fasteners that attach to loop fasteners coupled to the straps that extend from the high-friction pad (501). As with the hook fastener material (120,121,122,123) and loop fastener material (110,111,112,113) of the bed strap webbings (106,107,108,109), it should be noted that inclusion of the loop fasteners 226,227,228,229 attached to the lower patient positioner surface 1902, as well as the hook fasteners coupled to the straps extending from the high-friction pad (501)—in any of the embodiments described herein—is optional. In other embodiments, these fasteners will not be included.

In one or more embodiments, the patient positioner 1900 measures about fifty inches in length and about thirty-eight inches in width. In one or more embodiments, the sewn seams 208 are about four inches apart, with the left most sewn seam 208 being about nine inches from the left side of the patient positioner 1900. Similarly, the right most sewn seam 208 is also about nine inches away from the right side of the patient positioner 1900. These dimensions are illustrative only, as others will be obvious to those of ordinary skill in the art having the benefit of this disclosure.

In one or more embodiments, the upper end of the patient positioner 1900 includes two forty-five degree inwardly sloping edges 118,119. These inwardly sloping edges 118, 119 are sometimes referred to as “chamfered” edges. This causes the upper portion of the patient positioner 1900 situated between the uppermost, reinforced cross stitching at the top edge to define a frustoconical shape. The remainder of the patient positioner 1900 extending downward (as viewed in FIGS. 21-22) from the frustoconical shape is substantially rectangular in this illustrative embodiment.

The shape of the patient positioner 1900 may be different in other embodiments, including taking different shapes with varying degrees of symmetry. Illustrating by example, in other embodiments the patient positioner 1900 can be rectangular with no inwardly sloping edges 118,119. However, when the inwardly sloping edges 118,119 are included, they can provide additional benefits.

During inflation, for instance, when the air enters between the upper patient positioner surface 1901 and the lower patient positioner surface 19021, in one or more embodiments inflates the periphery of the patient positioner 1900 surrounding the patient first. Thereafter, the air gently raises the patient above the procedure table. The inclusion of the inwardly sloping edges 118,119 can function to allow the inflation profile to conform more closely to the patient’s anatomical contours. During deflation of the patient positioner 1900, the inclusion of the inwardly sloping edges 118,119 can allow for more complete deflation as well. (If configured as a rectangle, air may remain near the head.) Inclusion of the inwardly sloping edges 118,119 allows the weight of the shoulders and head of the patient to fully deflate the cavity of air. As noted above, in other embodiments the patient positioner 1900 may have a different shape.

An inflation device (700) can be used to selectively inflate, or deflate, the patient positioner 1900. In one or more embodiments, inflation of the patient positioner 1900 causes the grippy feet 215 of selectively engaging surface gripping zones 209,210,211,212,213,214 to disengage from a support surface, thereby allowing the patient positioner 1900 to easily slide along the support surface. By contrast, deflation of the patient positioner 1900 causes the grippy feet 215 of the selectively engaging surface gripping zones 209,210, 211,212,213,214 to engage the support surface to securely retain a patient in a particular location on the support surface. Advantageously, this allows ease of patient positioning and repositioning, such as when a patient is transferred to or from a procedure table. It should be noted that the patient positioner 1900 of FIGS. 19-22 can be used in tandem with one or more bed sheets (such as a fitted sheet or flat sheet), as well as pillows, blankets, or additional sheets.

In one or more embodiments, the patient positioner 1900 is flexible and foldable when in the non-inflated state. The patient positioner 1900 is configured to be positioned on a procedure table so that the lower patient positioner surface 1902 faces, abuts, or confronts the procedure table. Illustrating by example, the lower patient positioner surface 19021, as shown in FIG. 22, may be in contact with the procedure table, or may face, abut, or confront the procedure table with grippy feet 215 situated between the patient positioner 1900 and the procedure table, and abutting the procedure table to prevent the patient positioner 1900 from sliding.

Figure 33A:
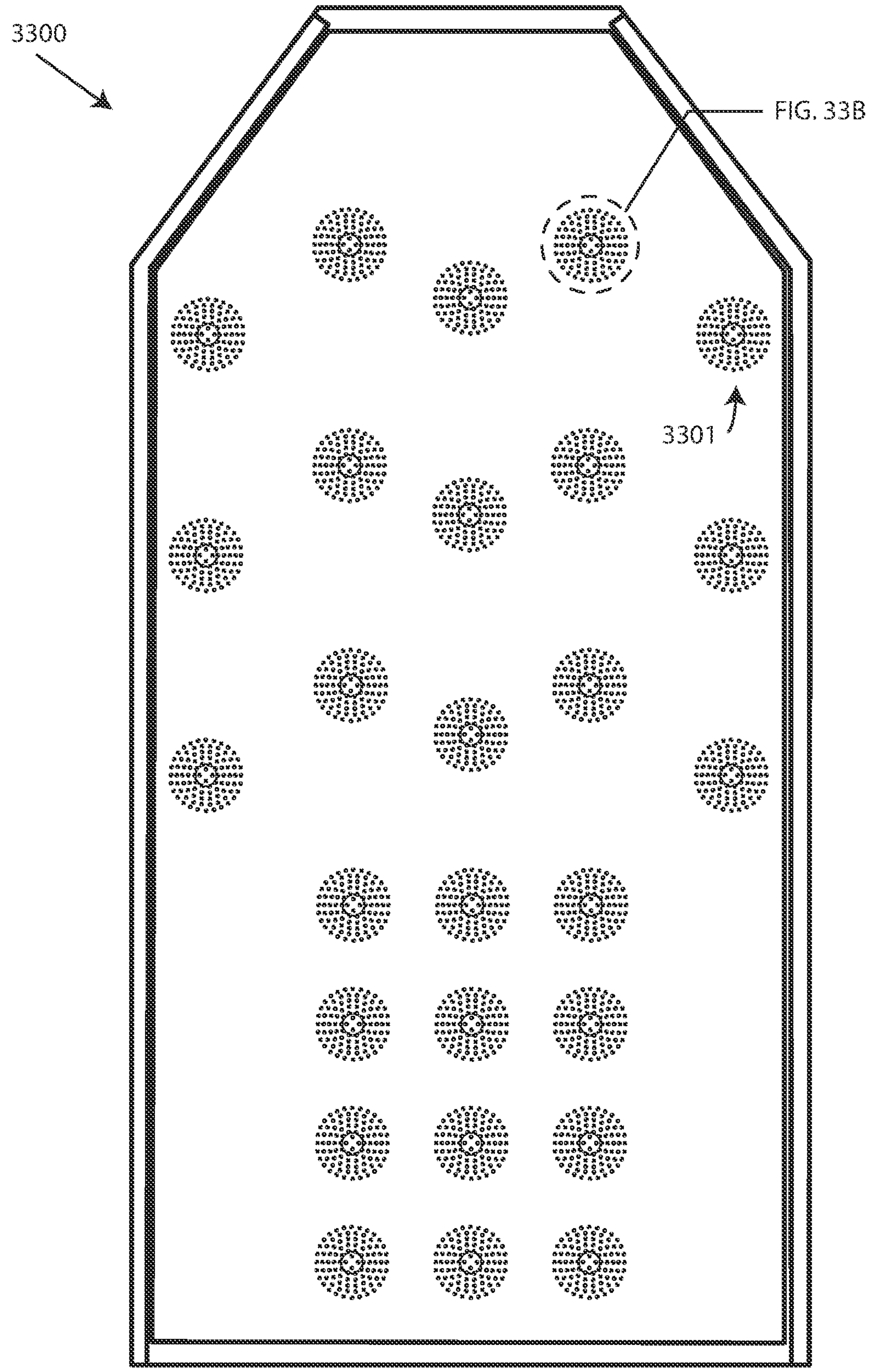
FIG. 33A illustrates still another patient positioner, shown in the bottom plan view, but with the air exit holes not illustrated for easier visibility of the selectively engaging surface gripping zones.
Figure 33B:
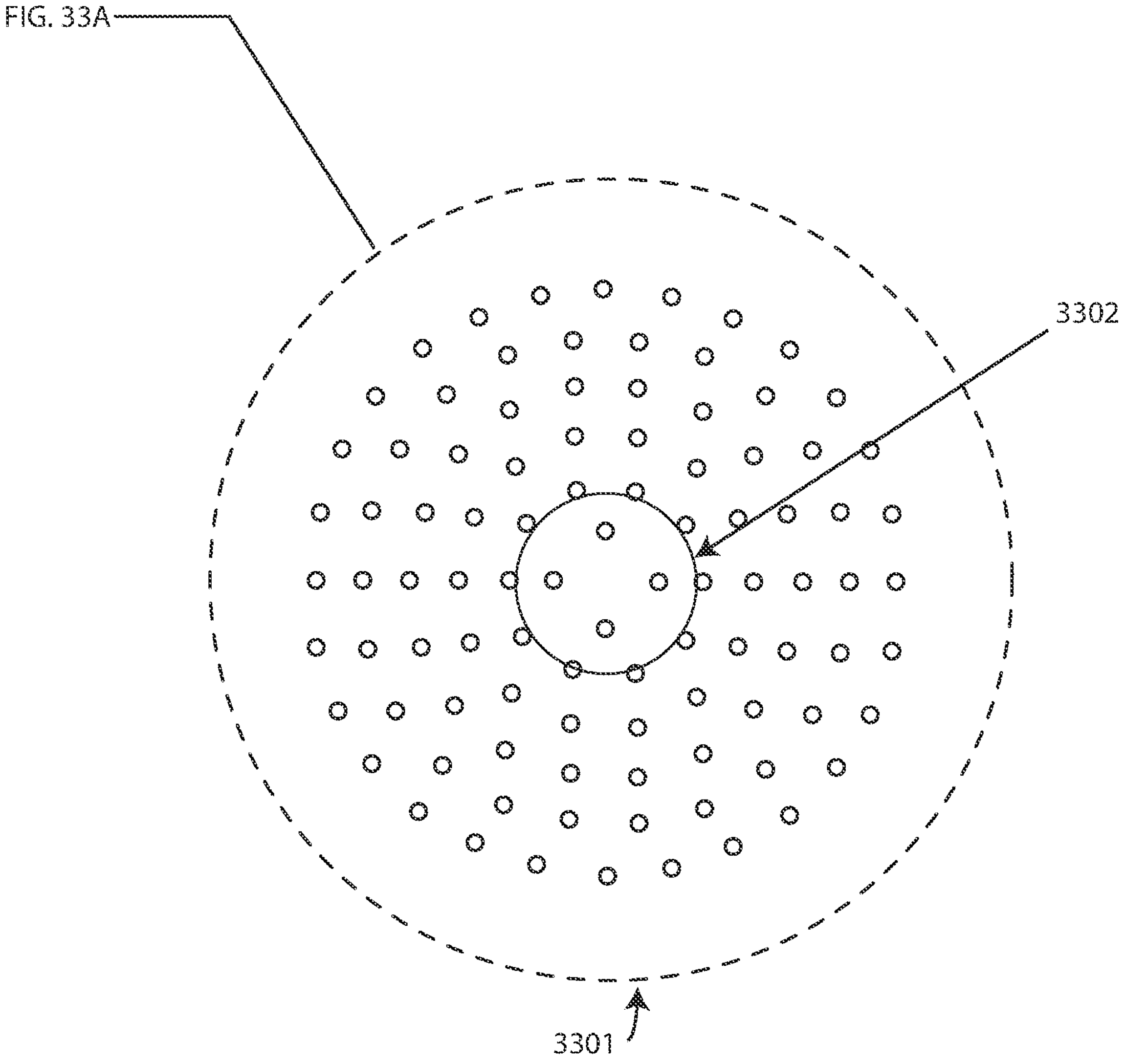
FIG. 33B illustrates an explanatory section of the selectively engaging surface gripping zones from FIG. 33A in accordance with one or more embodiments of the disclosure.

Just as the number and/or presence of bed strap webbings (106,107,108,109) can vary, so too can the configuration of the grippy feet 215. Turning briefly to FIGS. 33A-33B, illustrated therein is one such example.

Beginning with FIG. 33A, illustrated therein is the bottom side of another patient positioner 3300, but with the air exit holes (202) removed so that the selectively engaging surface gripping zones 3301 of grippy feet (215) can be more easily seen. In one or more embodiments, the grippy feet (215) are arranged in circular patterns with the selectively engaging surface gripping zones 3301 mirroring the human anatomy. In this example, three columns of selectively engaging surface gripping zones 3301 are arranged under the leg section of the patient positioner 3300, while fifteen selectively engaging surface gripping zones 3301 are arranged under the torso and arm portions of the patient positioner 3300. This configuration incorporates the grippy feet (215) configured in accordance with embodiments of the disclosure into other configurations of medical devices, one of which is described in US Published Patent Application No. 2023/0240924 to Kea et al., published Aug. 3, 2023, which was incorporated herein by reference for all purposes. Others will be obvious to those of ordinary skill in the art having the benefit of this disclosure. Details of the selectively engaging surface gripping zones 3301, along with circular couplings 3302, are shown in FIG. 33B.

As also shown in FIG. 4A, the upper patient positioner surface is coupled to the lower patient positioner surface along a perimeter. In this illustrative embodiment, the patient positioner 3300 consists of the upper patient positioner surface and the lower patient positioner surface, coupled together at the perimeter, and also coupled together with circular couplings (3302) positioned at various locations along the patient positioner 3300. While the circular couplings (3302) of this illustrative embodiment are shown as being circular for explanatory purposes, those of ordinary skill in the art would understand that they could also be configured as a set of concentric circles, squares, hexagons, etc. The grippy feet (215) are shown surrounding these circular couplings (3302), also in a circular pattern, in this illustrative embodiment.

In this illustrative embodiment, the selectively engaging surface gripping zones 3301 are attached to the lower patient positioner surface. As shown in FIG. 33A, the selectively engaging surface gripping zones 3301 are positioned concentrically with the circular couplings (3302), which positions the selectively engaging surface gripping zones 3301 centrally along the one or more circular couplings (3402) on a one-to-one basis. As described above, this results in the grippy feet (215) of the selectively engaging surface gripping zones 3301 extending beyond exterior surfaces of the plurality of air chambers when in a deflated state. However, the grippy feet (215) retract within concave lacuna caused by the one or more circular couplings 3402 when in the inflated state.

Figure 34A:
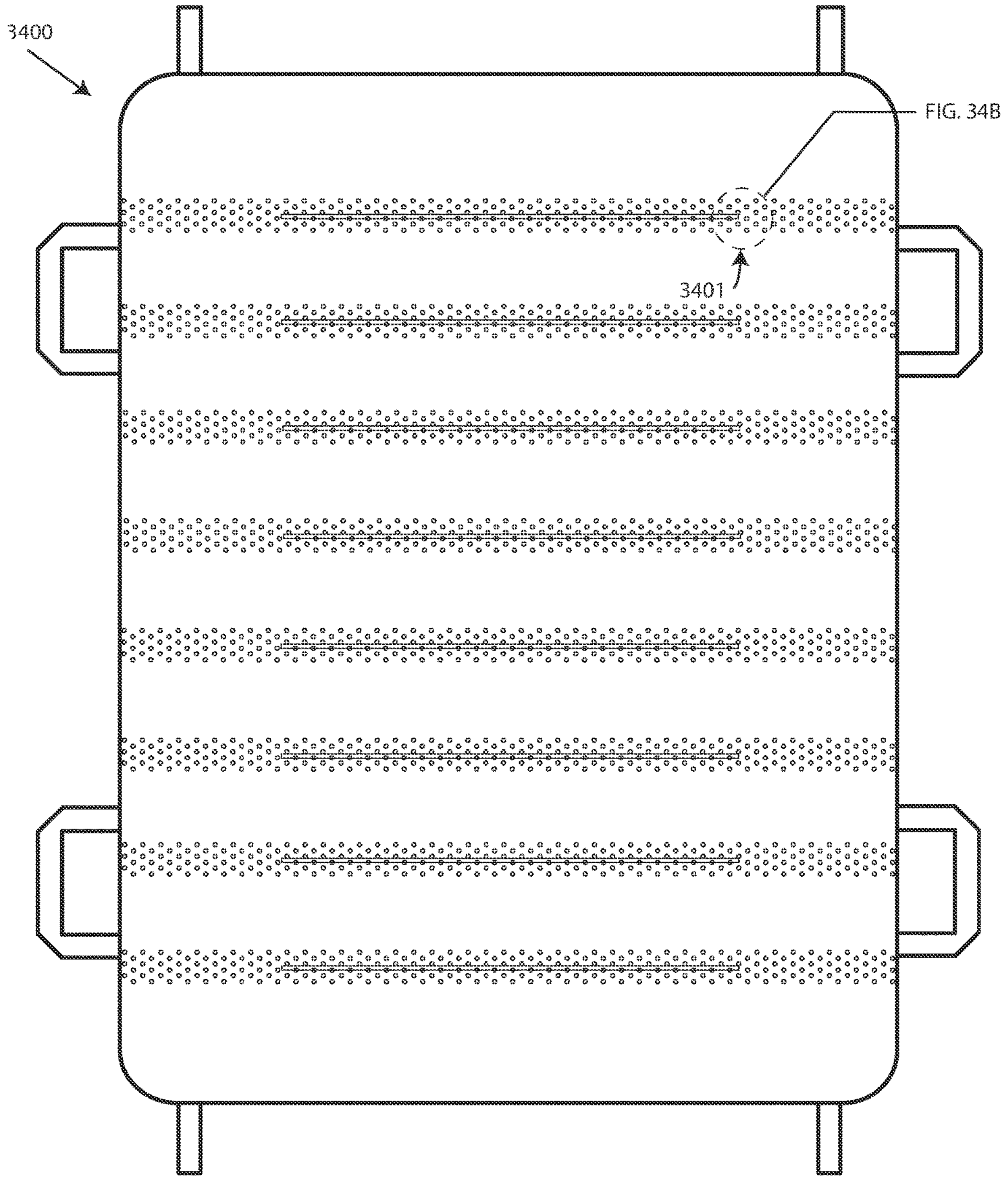
FIG. 34A illustrates still another patient positioner, shown in the bottom plan view, but with the air exit holes not illustrated for easier visibility of the selectively engaging surface gripping zones.
Figure 34B:
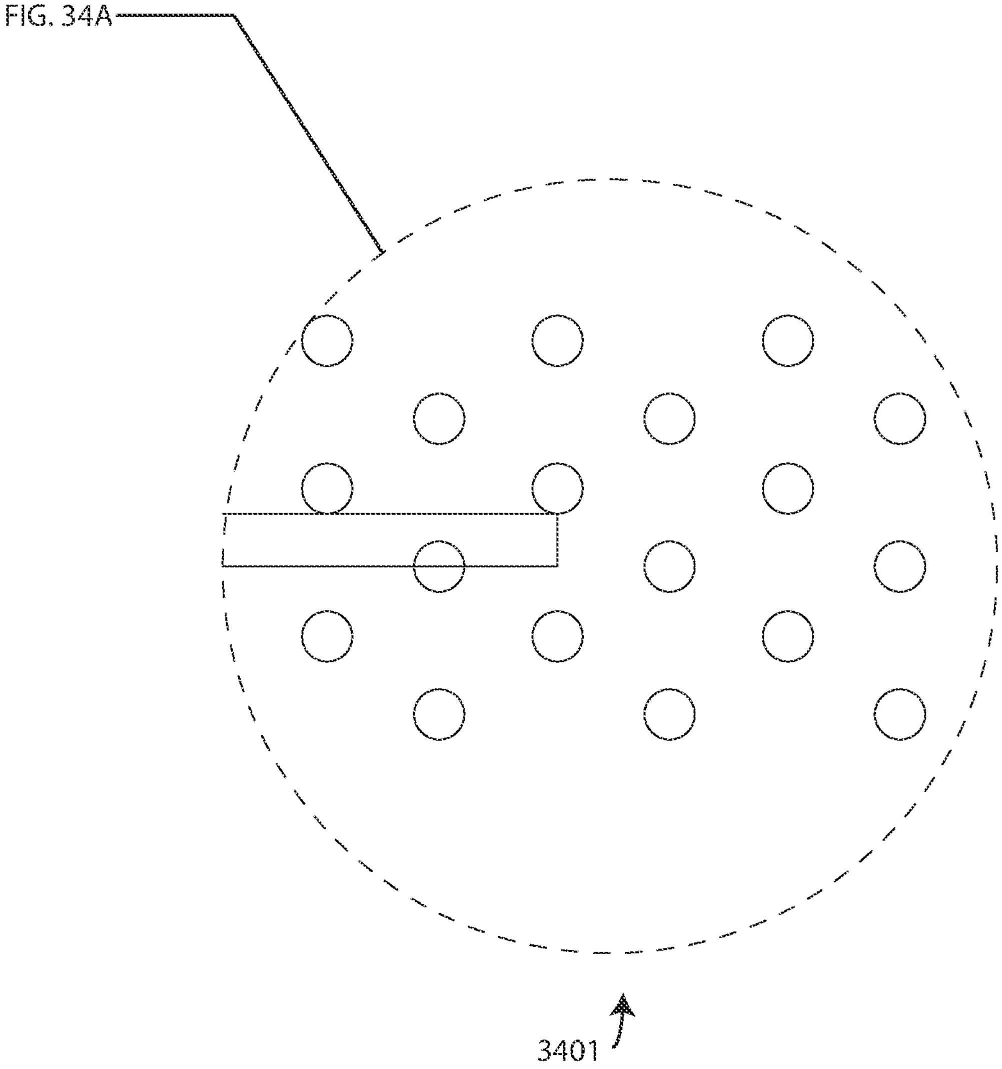
FIG. 34B illustrates an explanatory section of the selectively engaging surface gripping zones from FIG. 34A in accordance with one or more embodiments of the disclosure.

Turning now to FIGS. 34A-34B, illustrated therein is the bottom side of another patient positioner 3400, again with the air exit holes (202) removed so that the selectively engaging surface gripping zones 3401 of grippy feet (215) can be more easily seen. In one or more embodiments, the grippy feet (215) are arranged in lateral rows. In this example, eight rows of selectively engaging surface gripping zones 3401 span the width of the patient positioner 3400. Other numbers of rows of selectively engaging surface gripping zones 3401 will be obvious to those of ordinary skill in the art having the benefit of this disclosure. This configuration incorporates the grippy feet (215) configured in accordance with embodiments of the disclosure into other configurations of medical devices, one of which is described in US Published Patent Application No. 2022/0339045 to Cook et al., published Oct. 27, 2022, which was incorporated herein by reference for all purposes. Others will be obvious to those of ordinary skill in the art having the benefit of this disclosure. Details of the selectively engaging surface gripping zones 3401 are shown in FIG. 33B.

Figure 35A:
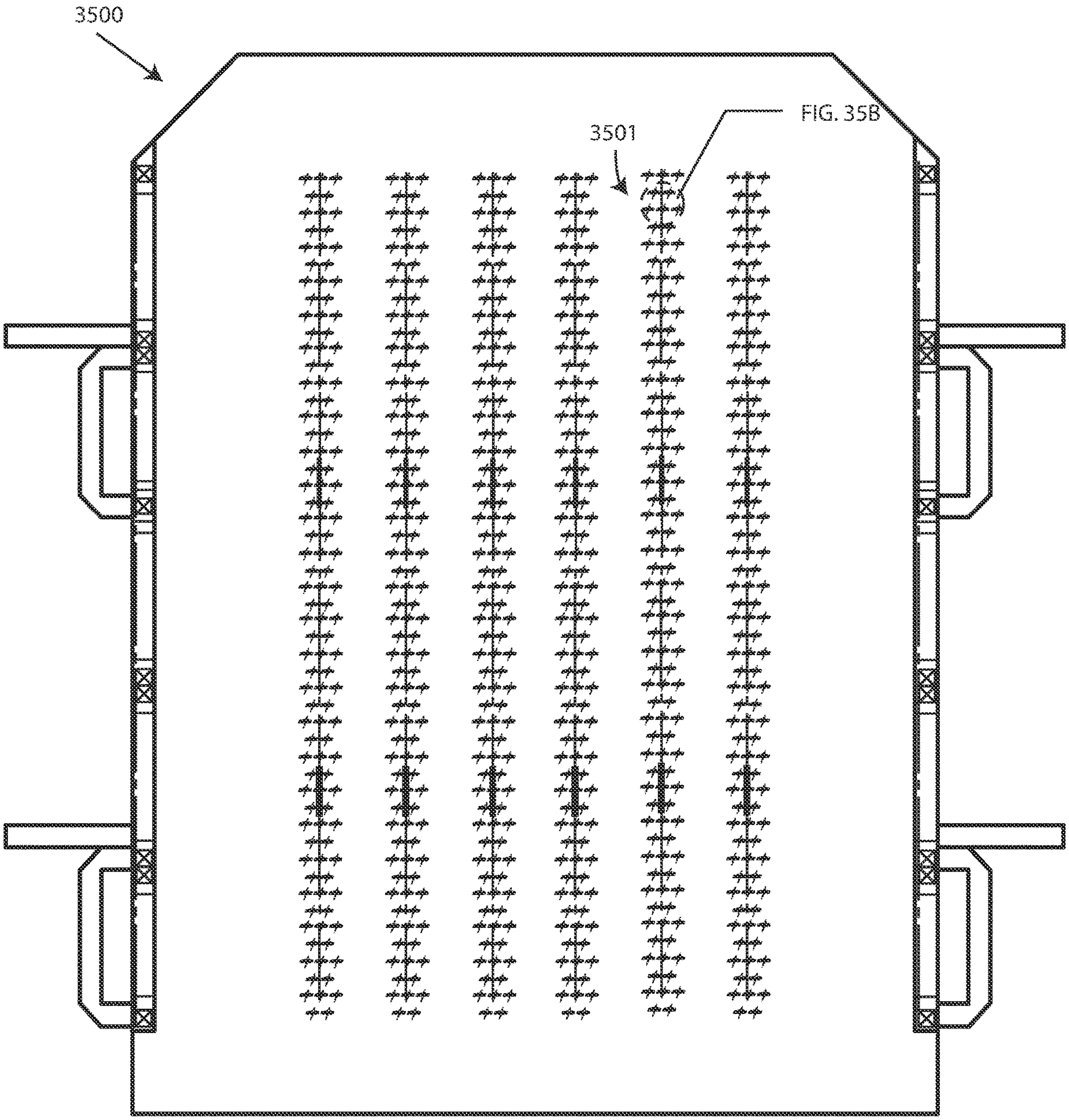
FIG. 35A illustrates still another patient positioner, shown in the bottom plan view, but with the air exit holes not illustrated for easier visibility of the selectively engaging surface gripping zones.
Figures 35A, 35B:
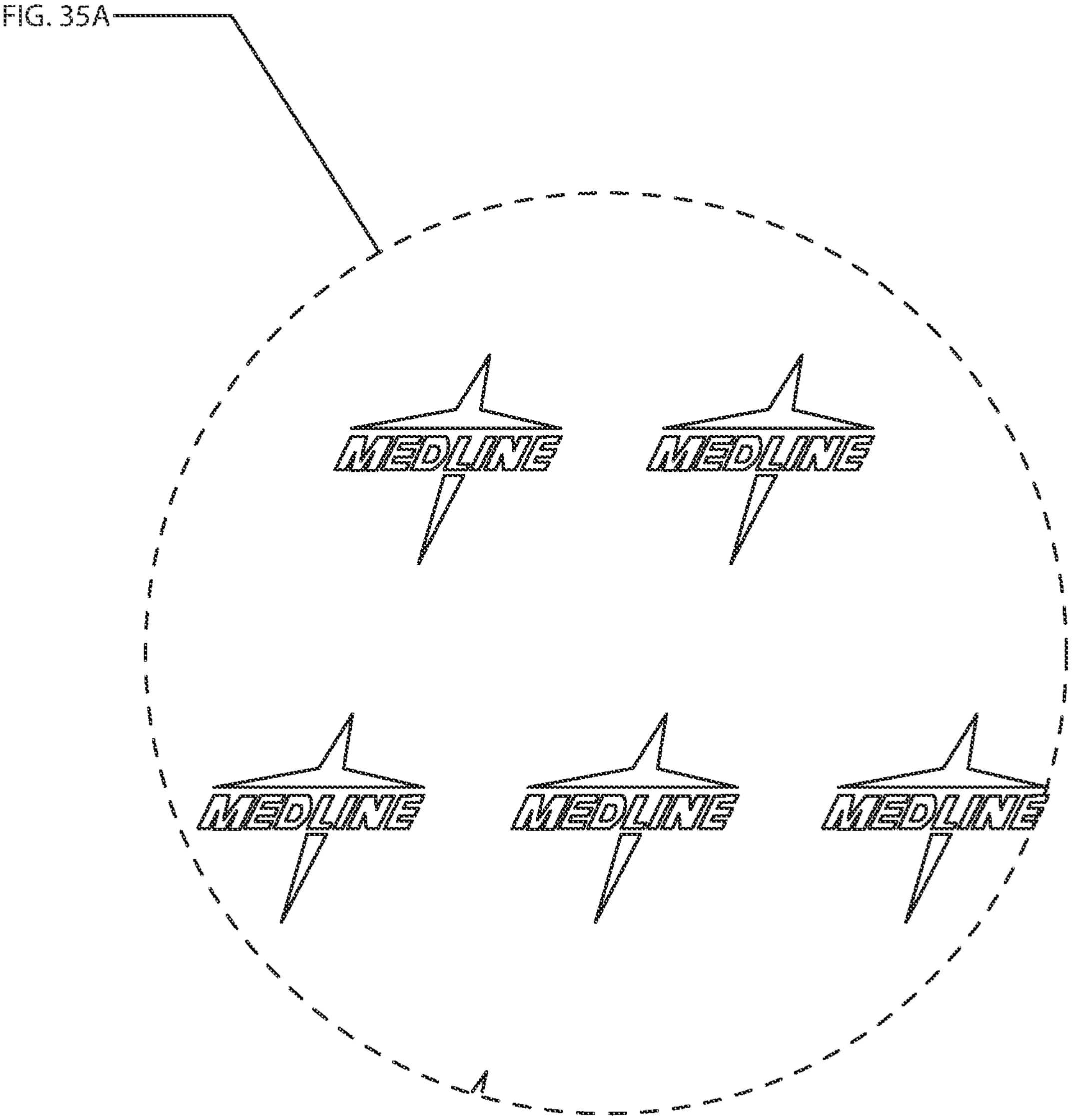
FIG. 35B illustrates an explanatory section of the selectively engaging surface gripping zones from FIG. 35A in accordance with one or more embodiments of the disclosure.

Turning now to FIGS. 35A-35B, illustrated therein is the bottom side of another patient positioner 3500, again with the air exit holes (202) removed so that the selectively engaging surface gripping zones 3501 of grippy feet (215) can be more easily seen. In one or more embodiments, the grippy feet (215) are arranged in vertical columns, with each grippy feet configured as a logo.

In this example, six columns of selectively engaging surface gripping zones 3501 span the height of the patient positioner 3500. Other numbers of columns of selectively engaging surface gripping zones 3501 will be obvious to those of ordinary skill in the art having the benefit of this disclosure. Details of the selectively engaging surface gripping zones 3501, including the logoed grippy feet shape, are shown in FIG. 35B.

Figure 6:
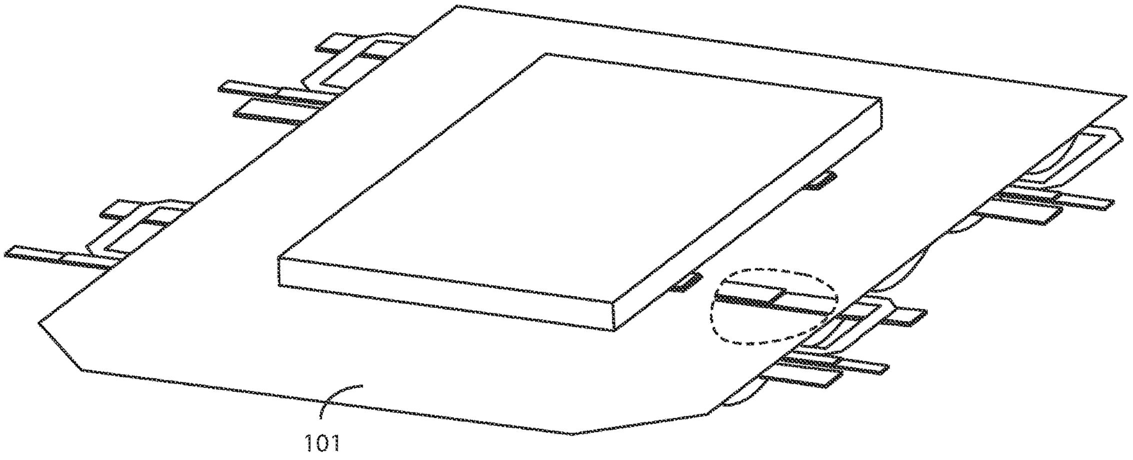
FIG. 6 illustrates an assembled view of one explanatory patient positioner system in accordance with one or more embodiments of the disclosure.

Turning now to FIGS. 5-6, illustrated therein is one explanatory patient positioner system 500 in accordance with one or more embodiments of the disclosure. The patient positioner system 500 is shown in an unassembled configuration in FIG. 5 and an assembled configuration in FIG. 6. The patient positioner system 500 of FIGS. 5-6 uses the patient positioner 100 of FIGS. 1-2 but could use the patient positioner (1900) of FIGS. 19-22 as well.

In one or more embodiments, a high-friction pad 501 can be included with the patient positioner 100 to form a patient positioner system 500. The high-friction pad 501 can be manufactured from a variety of materials.

Illustrating by example, in one or more embodiments the high-friction pad 501 is manufactured from an elastic foam that has no memory. In other embodiments, the high-friction pad 501 is manufactured from a viscoelastic foam, which is sometimes referred to as a "memory foam."

In still other embodiments, the high-friction pad 501 is manufactured from a viscoelastic foam pad that assists in holding the patient in a desired position atop the patient positioner 100 on a procedure table. The high-friction pad 501 can therefore help support a patient on the patient positioner 100 when situated in the Trendelenburg position, reverse Trendelenburg position, or other position where a procedure table is tilted from horizontal. Where included, the high-friction pad 501 helps to assist in minimizing sliding, shifting, or similar undesirable movements of the patient on the procedure table.

When manufactured from a viscoelastic foam, the viscoelastic foam also cushions and supports the patient while promoting a distribution of pressure forces across the patient's body to reduce and/or minimize damage to nerves and/or tissue from concentrated pressure forces. For example, the viscoelastic foam will minimize or can eliminate brachial plexopathy, including pain, decreased movement, or decreased sensation in the arm and shoulder by minimizing pressure to a patient's neck, arms, and/or shoulders, and thereby minimizing or reducing a nerve event.

Turning briefly to FIG. 27, desirable characteristics of such a viscoelastic foam are shown in the table 2700 of FIG. 27. This table lists the characteristic 2701, the units of measurement 2702 of the characteristic, and the desired target 2703 of the characteristic 2701 for optimal performance. It should be noted that while the characteristics 2701 of FIG. 27 are desirable, they are not required. In other embodiments, the high-friction pad 501 is manufactured from any old foam. Other foams suitable for manufacturing the high-friction pad 501 will be obvious to those of ordinary skill in the art having the benefit of this disclosure.

As shown in the table 2700, in one or more embodiments the high-friction pad 501 is manufactured from a material where the rate of recovery, i.e., the time required for a viscoelastic foam to return to its starting shape, is in the range of approximately two to ten seconds for approximately fifty percent to eighty percent recovery after deformation caused by placing an adult torso on an approximately one-inch-thick layer of viscoelastic foam. The rate of recovery is in the range of approximately six to fifteen seconds for approximately eighty percent to ninety percent recovery after deformation caused by placing an adult torso on an approximately one-inch-thick layer of viscoelastic foam.

In one or more embodiments, the rate of recovery is in the range of approximately ten to thirty-five seconds for one hundred percent recovery after deformation caused by placing an adult torso on an approximately one-inch-thick layer of viscoelastic foam. The ball rebound of the viscoelastic foam used for the high-friction pad 501 is in the range of less than or substantially less than approximately one percent to approximately one percent or several percent or is in the range of or approximately in the range of 0.1 percent to 1.9 percent, or up to three percent or five percent, and as much as several percent.

In one or more embodiments, the compression set (the residual compression of the foam after twenty-two hours at seventy degrees Celsius) of the viscoelastic foam used for the high-friction pad 501, for a twenty-five percent compression of the foam, is in the range of less than one percent or tenths of a percent, e.g., for example, less than 0.4 percent or 0.3 percent, to several percent. In one or more embodiments, the compression set of the viscoelastic foam used for the high-friction pad 501, for a fifty percent compression of the foam, is in the range of less than one percent or tenths of a percent, such as, for example, less than 0.5 percent, to several percent. In one or more embodiments, the indentation force deflection of the viscoelastic foam used for the high-friction pad 501, at a twenty-five percent deflection, is in the range of several pounds of force to tens of pounds of force, such as in the range of approximately ten to approximately fifteen pounds, or in the range of approximately seven to approximately eighteen pounds, or is in the range of approximately twelve pounds, such as, for example, 11.7, 11.8, 11.9, 12.0, 12.1, 12.2, 12.3, and 12.4 pounds.

In one or more embodiments, the coefficient of static friction between the viscoelastic foam used for the high-friction pad 501 and the surface of a procedure table is greater than 0.2 or is in the range of approximately 0.2 or 0.5 to approximately 0.7 or 1.0. In one or more embodiments, the viscoelastic foam used for the high-friction pad 501 is designed such that the patient may shift on the viscoelastic foam less than one inch, or up to approximately an inch, or in the range of approximately one inch to approximately three inches. The airflow in or through the viscoelastic foam used for the high-friction pad 501 is in the range of tenths of a cubic foot per minute to several cubic feet per minute in one or more embodiments, such as, for example, approximately 0.1 or 0.3 cubic foot per minute to approximately 1.0 or 3.0 cubic feet per minute or is in the range of approximately 0.53 cubic feet per minute, plus or minus 0.3 cubic feet per minute.

In one or more embodiments, the thickness of the viscoelastic foam used for the high-friction pad 501 is in the range of from three-fourths of an inch to one inch, or to approximately one inch, or to one and a half inches, or to three inches or greater, which thickness is selected to minimize and/or prevent bottoming out on the operating table of one or more of the portions of the body of a patient lying on the viscoelastic foam pad, depending on the weight and/or size of the patient. In one or more embodiments, the tensile strength (at twenty-five percent deflection) of the viscoelastic foam used for the high-friction pad 501 is in the range of at least approximately five pounds per square inch (PSI) or approximately eight PSI to approximately twelve PSI or approximately fifteen PSI or is in the range of approximately ten PSI.

In one or more embodiments, the tear strength (in a twenty inches per minute test) of the viscoelastic foam used for the high-friction pad 501 is in the range of approximately one to approximately two or three pounds of force per inch, or in the range of approximately 1.5 pounds of force per inch. In one or more embodiments, the elongation (in a twenty inches per minute test) of the viscoelastic foam used for the high-friction pad 501 is in the range of between one hundred and twenty-five and two-hundred and fifty percent, or is in the range of approximately 172 percent, plus or minus 25 percent.

In one or more embodiments, the nominal density of the viscoelastic foam used for the high-friction pad 501 is in a range of approximately one hundred kilograms per cubic meter or is in the range of approximately seventy-five or eighty-three kilograms per cubic meter to approximately 103 or 110 kilograms per cubic meter, such as, for example, 93.1 kilograms per cubic meter. In one or more embodiments, the flammability of the viscoelastic foam used for the high-friction pad 501 should pass various tests by CAL, FMVSS and FAR, and the viscoelastic foam should pass the European Union's Restriction of Hazardous Substances (EU RoHS) standards.

Examples of viscoelastic foams meeting these requirements are described in the following US Patents, each of which is incorporated herein by reference for all purposes:

U.S. Pat. No. 10,912,699 to Pigazzi, which issued Feb. 9, 2021;

U.S. Pat. No. 10,322,050 to Pigazzi, which issued Jun. 18, 2019;

U.S. Pat. No. 9,750,656 to Pigazzi, which issued Sep. 5, 2017;

U.S. Pat. No. 10,045,902 to Pigazzi, which issued Aug. 14, 2018;

U.S. Pat. No. 10,285,890 to Pigazzi, which issued May 14, 2019;

U.S. Pat. No. 9,931,262 to Pigazzi, which issued Apr. 3, 2018;

U.S. Pat. No. 9,949,883 to Pigazzi, which issued Apr. 24, 2018;

U.S. Pat. No. 9,782,287 to Pigazzi, which issued Oct. 10, 2017;

U.S. Pat. No. 8,464,720 to Pigazzi, which issued Jun. 18, 2013;

U.S. Pat. No. 8,511,314 to Pigazzi, which issued Aug. 20, 2013;

U.S. Pat. No. 9,161,876 to Pigazzi, which issued Oct. 20, 2015; and

U.S. Pat. No. 10,098,800 to Pigazzi, which issued Oct. 16, 2018.

Turning now back to FIGS. 5-6, as previously described the patient positioner 100 defines an inflatable body with the upper patient positioner surface 101 and lower patient positioner surface (201) separating when the patient positioner 100 is filled with air to define an internal cavity that can be inflated with air or another gaseous substance in one or more embodiments.

In this illustrative embodiment, the upper patient positioner surface 101 and the lower patient positioner surface (201) are two separate pieces of sheet material that are connected together around their peripheries, such as by stitching and/or adhesives, or one or more other connection techniques described herein. In some embodiments, the upper patient positioner surface 101 and the lower patient positioner surface (201) may be connected to one another by a sidewall, or a plurality of side walls made from a flexible material that is attached at their peripheries.

In other embodiments, the upper patient positioner surface 101 and lower patient positioner surface (201) can be made from a single piece of material that is folded over and connected by stitching along the free ends or that is formed in a loop. Alternatively, the upper patient positioner surface 101 and lower patient positioner surface (201) may be formed of multiple pieces. Both the upper patient positioner surface 101 and lower patient positioner surface (201) can be manufactured from the same material in one embodiment. In other embodiments, the upper patient positioner surface 101 and lower patient positioner surface (201) can be manufactured from different materials.

In one or more embodiments, each of the upper patient positioner surface 101 and the lower patient positioner surface (201) comprise a single layer of material. In other embodiments, each of the upper patient positioner surface

101 and the lower patient positioner surface (201) comprise multiple layers that may be formed of the same or different materials.

Additionally, the sheet material(s) of the upper patient positioner surface 101 and lower patient positioner surface (201) can be selected to exhibit different properties, examples of which include favorable breathability, durability, imagining compatibility, flammability, biocompatibility, pressure distribution profile, heat transmission, electrical conductivity, and cleaning properties. Illustrating by example, if the patient positioner 100 is intended to remain under a patient for an extended period of time, materials for the upper patient positioner surface 101 and the lower patient positioner surface (201) may be selected so that they are breathable fabrics or other materials that have sufficient breathability to allow passage of heat and moisture vapor away from the patient, while also having sufficient resistance to air passage to retain inflation.

In other embodiments, such as when the patient positioner 100 is used solely as a patient transfer device that is not left beneath a patient for an extended period of time, breathability may not be a primary concern when selecting a material for the upper patient positioner surface 101 and the lower patient positioner surface (201). In such an embodiment, factors such as durability, ease of cleaning, liquid repellence, and cost may be properties of primary concern. Some examples of materials suitable for use in constructing the upper patient positioner surface 101 and the lower patient positioner surface (201) that meet these criteria but do not provide a high degree of breathability include woven polyester and non-woven polypropylene.

In some embodiments, selection of materials for the upper patient positioner surface 101 and the lower patient positioner surface (201) may be a function of a desired amount of friction, water permeability or impermeability, air permeability or impermeability, and so forth. Some suitable materials for the upper patient positioner surface 101 and the lower patient positioner surface (201) include polyester and/or nylon (polyamide).

The upper patient positioner surface 101 and the lower patient positioner surface (201) may have coatings disposed therein, with those coatings exhibiting elevated coefficients of friction. Additives to the upper patient positioner surface 101 and the lower patient positioner surface (201) can decrease static potential, increase the coefficient of friction of the upper patient positioner surface 101, decrease the coefficient of friction of the lower patient positioner surface (201), or perform other functions.

As described above with reference to FIGS. 1-2, the inclusion of handles 102,103,104,(105) facilitates pulling and other movement of the patient positioner 100. These handles 102,103,104,(105) can be configured for multiple different types of movement, including boosting a patient onto a procedure table. In one or more embodiments, the handles 102,103,104,(105) are constructed from webbing of a strong material that are connected to the patient positioner 100 with reinforced cross stitching. In other embodiments, the handles 102,103,104,(105) may be connected to the patient positioner 100 using other techniques, examples of which include thermal welding, sonic welding, adhesives, and so forth. Other connection techniques will be obvious to those of ordinary skill in the art having the benefit of this disclosure.

In one or more embodiments, the high-friction pad 501 is manufactured from a high friction material. Coupling the high-friction pad 501 to the patient positioner 100 assists in maintaining the position of a patient on the patient positioner 100.

In one or more embodiments, the high-friction pad 501 is placed against the upper patient positioner surface 101. Thereafter, straps 502,503,504,505 extending from the sides of the high-friction pad 501 can be passed through the slots 114,115,116,(117) of the patient positioner 100, with hook fasteners 506,507,508,509 attached to the straps 502,503,504,505 attaching to the loop fasteners (226),(227),(228),(229) attached to the lower patient positioner surface (201) shown in FIG. 2 above. As noted above, the convention can be switched with the hook fasteners 506,507,508,509 being replaced by loop fasteners and so forth. The assembled patient positioner 100 with this engagement is shown in FIG. 6.

Figure 32:
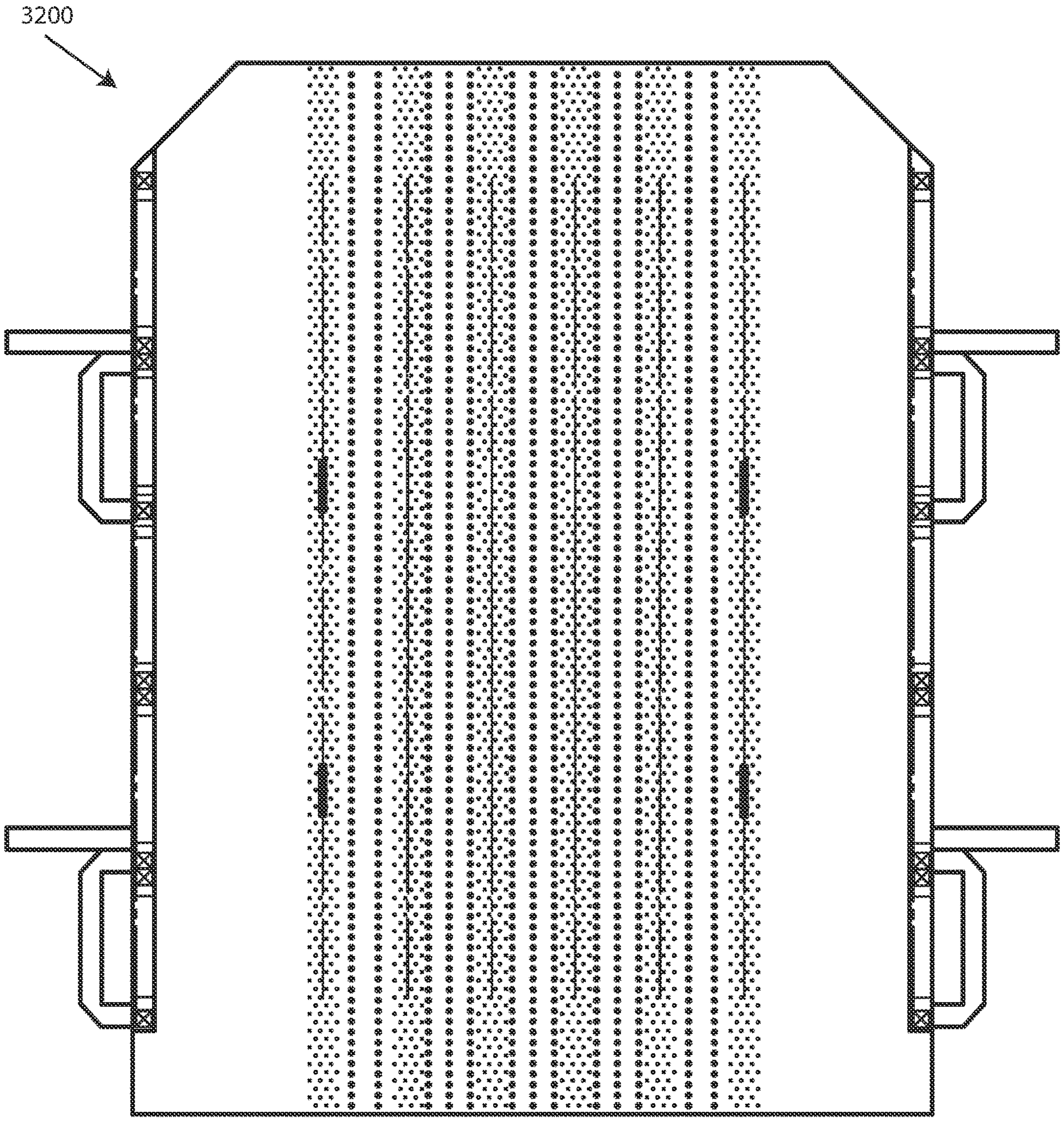
FIG. 32 illustrates yet another explanatory patient positioner that omits any hook or loop fasteners on the lower patient positioner surface.

As also noted above, in one or more embodiments the inclusion of the hook fasteners 506,507,508,509 and the corresponding loop fasteners is optional. Thus, in other embodiments the straps 502,503,504,505 simply tunnel through the slots 114,115,116,(117) of the patient positioner 100 and attach directly to the procedure table. Illustrating by example, a patient positioner 3200 having no fasteners attached to its lower patient positioner surface is shown in FIG. 32. The high-friction pad used with this patient positioner 3200 would include no corresponding fasteners. Instead, its straps would simply tunnel through the slots and optionally attach to the procedure table.

Once assembled, the straps 105,106,107,(108) of the patient positioner 100, as well as the straps 502,503,504,505 of the high-friction pad 501, can be wrapped around the rail of a procedure table. Optional buckles (not shown) can be used for such attachment in in one or more embodiments, while hook and loop fasteners, snaps, ties, and other attachment techniques can be used in other embodiments.

Turning briefly to FIGS. 30-31, illustrated therein is the patient positioner 1900 having no bed straps but having a high-friction pad 501 attached thereto as in the assembly of FIG. 6 above. As shown, the patient positioner 1900 and high-friction pad 501 have been placed atop a procedure table 3000. In this illustrative embodiment, the procedure table 300 has one or more siderails 3001,3002 attached to its sides.

In the illustrative embodiment of FIG. 30, the straps 502,503,504,505 of the high-friction pad tunnel through the slots 114,115,116,117. Thereafter, the straps 502,503,504,505 can be attached to the siderails 3001,3002 of the procedure table 3000.

Turning now to FIG. 32, the underside of the procedure table 3000 is shown. As illustrated in the magnified view 3101, in one or more embodiments the straps 505 of the high-friction pad (501) can be passed through the siderail 3001 of the procedure table 3000 to secure both the high-friction pad 501 and the patient positioner 1900 to the procedure table 3000.

Turning now back to FIGS. 5-6, in one or more embodiments the high-friction pad 501 is placed such that it abuts the upper patient positioner surface 101 to provide a resting surface for a patient. In the illustrative embodiment of FIGS. 5-6, the high-friction pad 501 is smaller in size than the patient positioner 100. Accordingly, in this embodiment the high-friction pad 501 is configured for only the upper body of the patient to lie thereon. In other embodiments, the high-friction pad 501 can be configured to be of similar size as the patient positioner 100 and may be configured for the entire body of the patient to lie thereon.

When positioning a patient in the Trendelenburg position, reverse Trendelenburg position, or other position where a procedure table is tilted from horizontal, the high-friction pad 501 serves to increase the coefficient of friction between the patient and the patient positioner 100. The high-friction pad 501 may include a top surface that is coated with a high friction material to further increase the coefficient of friction. This increased coefficient of friction serves to maintain the patient positioning when the patient is tilted to a severe incline.

Figure 28:
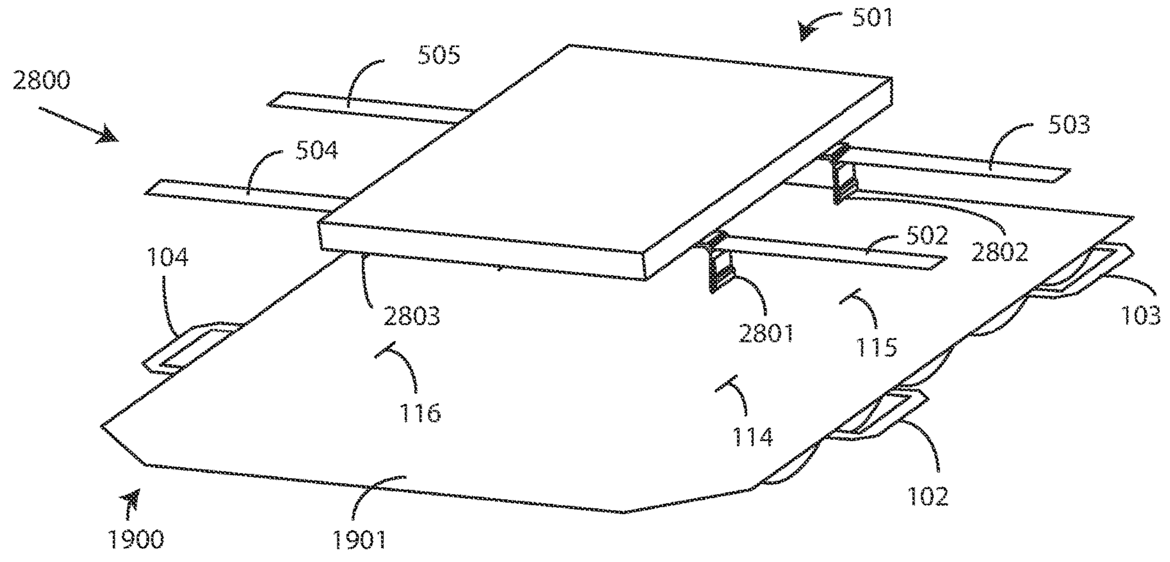
FIG. 28 illustrates an unassembled view of still another explanatory patient positioner system in accordance with one or more embodiments of the disclosure.
Figure 29:
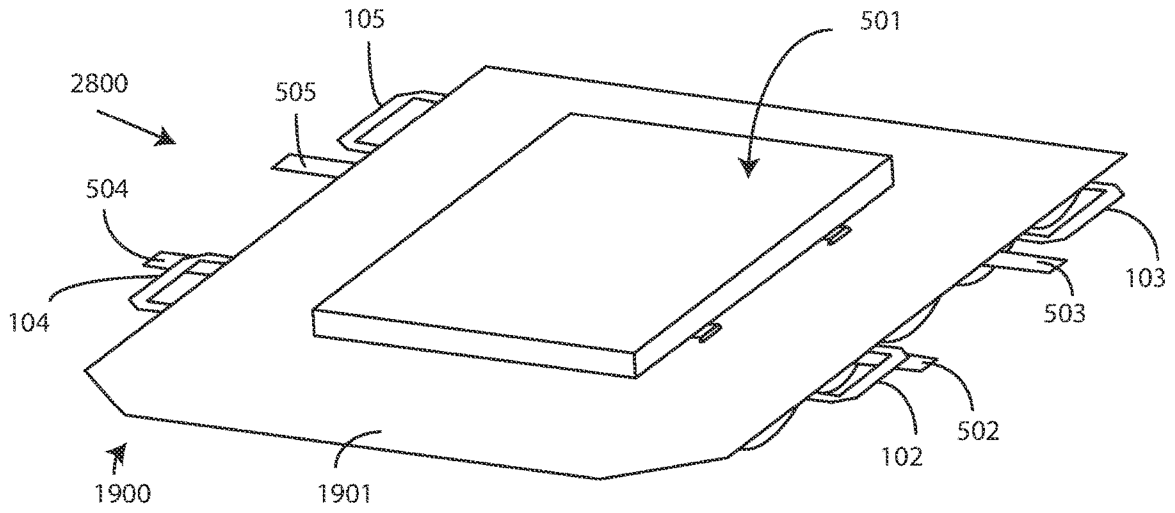
FIG. 29 illustrates an assembled view of the explanatory patient positioner system of FIG. 28 in accordance with one or more embodiments of the disclosure.

Turning now to FIGS. 28-29, illustrated therein is yet another explanatory patient positioner system 2800 in accordance with one or more embodiments of the disclosure. The patient positioner system 2800 is shown in an unassembled configuration in FIG. 28 and an assembled configuration with a high-friction pad 501 positioned thereon in FIG. 29. The patient positioner system 2800 of FIGS. 28-29 uses the patient positioner 1900 of FIGS. 19-20 but could use the patient positioner (100) of FIGS. 1-6 as well. Alternatively, it could use the patient positioner (3200) of FIG. 32.

In one or more embodiments, a high-friction pad 501 can be included with the patient positioner 1900 to form a patient positioner system 2800. The high-friction pad 501 can be manufactured from a variety of materials, as previously described.

As previously described the patient positioner 1900 defines an inflatable body with the upper patient positioner surface 1901 and lower patient positioner surface (1902) separating when the patient positioner 1900 is filled with air to define an internal cavity that can be inflated with air or another gaseous substance in one or more embodiments.

In this illustrative embodiment, the upper patient positioner surface 1901 and the lower patient positioner surface (1902) are two separate pieces of sheet material that are connected together around their peripheries, such as by stitching and/or adhesives, or one or more other connection techniques described herein. In some embodiments, the upper patient positioner surface 1901 and the lower patient positioner surface (1902) may be connected to one another by a sidewall, or a plurality of side walls made from a flexible material that is attached at their peripheries.

Both the upper patient positioner surface 1901 and lower patient positioner surface (1902) can be manufactured from the same material in one embodiment. In other embodiments, the upper patient positioner surface 1901 and lower patient positioner surface (1902) can be manufactured from different materials. In one or more embodiments, each of the upper patient positioner surface 1901 and the lower patient positioner surface (1902) comprise a single layer of material. In other embodiments, each of the upper patient positioner surface 1901 and the lower patient positioner surface (1902) comprise multiple layers that may be formed of the same or different materials.

In one or more embodiments, the inclusion of handles 102,103,104,105 facilitates pulling and other movement of the patient positioner 1900. These handles 102,103,104,105 can be configured for multiple different types of movement, including boosting a patient onto a procedure table.

In one or more embodiments, the high-friction pad 501 is manufactured from a high friction material. Coupling the high-friction pad 501 to the patient positioner 1900 assists in maintaining the position of a patient on the patient positioner 1900.

In this illustrative embodiment, in addition to having straps 502,503,504,505 extending from the sides of the high-friction pad 501, there are also loop clips 2801,2802, 2803 that correspond to the straps 502,503,504,505 on a one-to-one basis (a fourth loop clip is hidden by the high-friction pad 501 in FIG. 28). In one or more embodiments, each loop clip 2801,2802,2803 allows a corresponding strap 502,503,504,505 to wrap around and—where hook and loop fasteners are attached to the straps 502,503,504,505—allow the straps 502,503,504,505 to attach to themselves. In one or more embodiments, the loop clips 2801,2802,2803 each pass through a corresponding slot 114,115,116,(117) when the high-friction pad 501 abuts the patient positioner 1900.

In one or more embodiments, each loop clip 2801,2802, 2803 effectively functions as a strap buckle. In one or more embodiments, the loop clips 2801,2802,2803 do not clip onto anything. Instead, the straps 502,503,504,505 pass through the loop clips 2801,2802,2803 and then double back on themselves. Where hook and loop fasteners are included, these portions of the straps 502,503,504,505 can attach to each other with the corresponding loop clip 2801,2802,2803 positioned therebetween. While the loop clips 2801,2802, 2803 are optional, their inclusion makes it easier to get tight securement between patient positioner 1900 and high-friction pad 501 compared to trying to pull two individual straps tight and then fasten them together. The assembled patient positioner 2800 with this engagement is shown in FIG. 28.

Once assembled, the straps 502,503,504,505 of the high-friction pad 501 can be wrapped around the rail of a procedure table as shown in FIG. 31.

Figure 7:
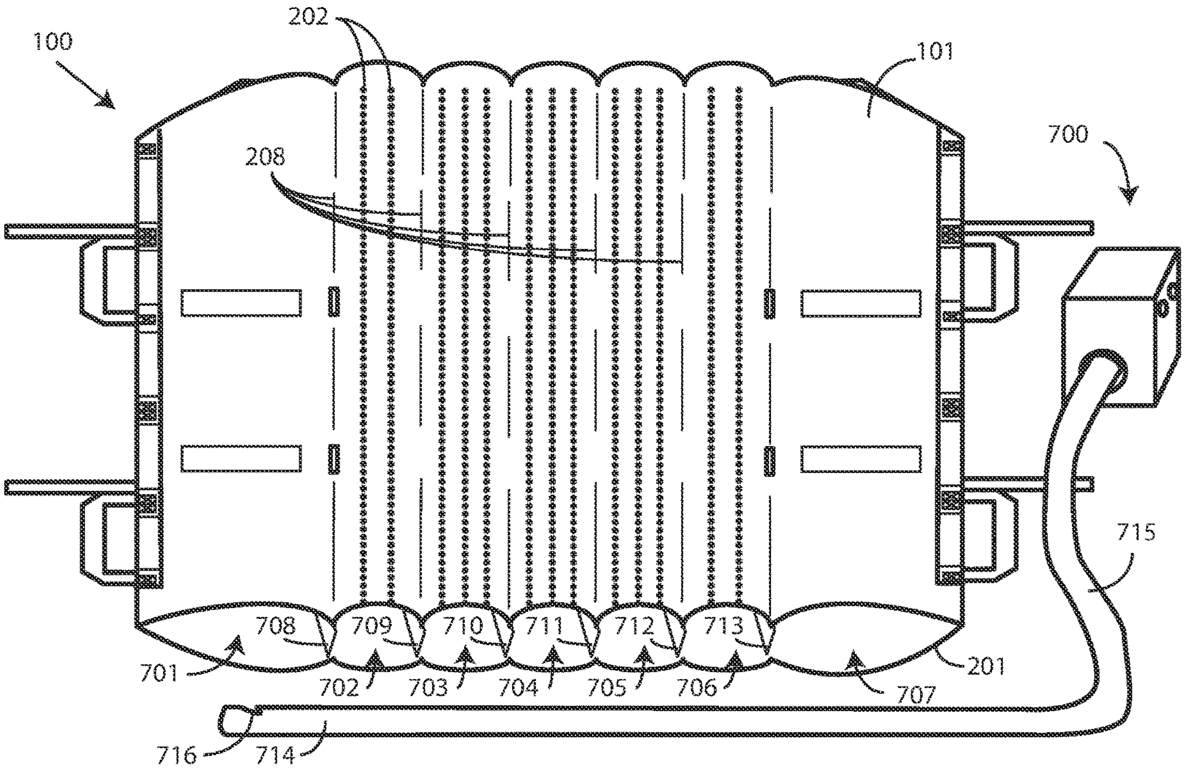
FIG. 7 illustrates a bottom isometric view of one explanatory patient positioner with a cutaway end in accordance with one or more embodiments of the disclosure, but with the selectively engaging surface gripping zones not illustrated for easier visibility of the air exit holes.
Figure 8:
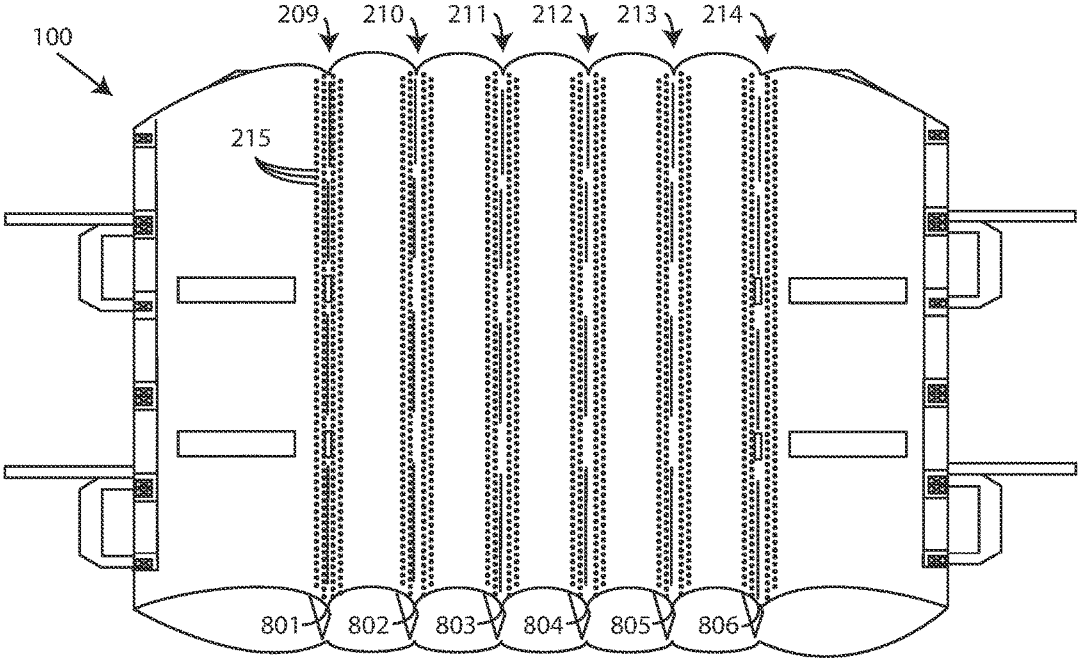
FIG. 8 illustrates a bottom isometric view of one explanatory patient positioner with a cutaway end in accordance with one or more embodiments of the disclosure, but with the air exit holes not illustrated for easier visibility of the selectively engaging surface gripping zones.

Turning now to FIGS. 7-8, illustrated therein is the patient positioner 100 of FIGS. 1-2 in an inflated state with the bottom end cut away so that the inner air chambers can be more readily seen. FIGS. 7-8 both illustrate bottom perspective views of the patient positioner 100. However, FIG. 7 the patient positioner 100 with a cutaway end and with the selectively engaging surface gripping zones 209,210,211, 212,213,214 not illustrated for easier visibility of the air exit holes 202.

FIG. 8 illustrates the patient positioner 100 is shown in the same manner, but with the air exit holes 202 not illustrated for easier visibility of the selectively engaging surface gripping zones 209,210,211, 212,213,214. As shown in FIG. 8, each selectively engaging surface gripping zone 209,210, 211, 212,213,214 comprises three columns of the grippy feet 215 on one side of the stitched baffle 708,709,710,711,712, 713 and three other columns of the grippy feet 215 on another side of the stitched baffle 708,709,710,711,712,713.

As shown in FIGS. 7-8, in one or more embodiments the patient positioner defines a plurality of air chambers 701, 702,703,704,705,706,707 situated between a plurality of stitched baffles 708,709,710,711,712,713 coupled between the upper patient positioner surface 101 and the lower patient positioner surface 201 by the sewn seams 208. Each air chamber 701,702,703, 704,705,706,707 extends longitudinally along the patient positioner 100 in this illustrative embodiment. In other embodiments, the air chambers 701, 702,703,704,705,706,707 extend laterally across the patient positioner 100. Other configurations will be obvious to those of ordinary skill in the art having the benefit of this disclosure.

The patient positioner 100 may comprise one layer of air chambers 701,702,703,704,705,706,707, as shown in FIGS. 7-8. However, in other embodiments the patient positioner 100 can include two or more layers of air chambers 701, 702,703,704,705,706,707. These air chambers 701,702,703, 704,705,706,707 can be formed by portions of the upper patient positioner surface 101 and lower patient positioner surface 201, by stitched baffles, or by other techniques.

In one or more embodiments, an air delivery sock 714 can be inserted into a port defined by one or more of the upper patient positioner surfaces 101 and/or the lower patient positioner surface 201. When an air hose 715 is coupled between the air delivery sock 714 and an inflation device 700, air can flow into the air chambers 701,702,703,704, 705,706,707 to inflate the patient positioner 100 as shown in FIGS. 7-8. The air delivery sock 714 can include one or more openings 716 to facilitate this air delivery.

In one or more embodiments, the patient positioner 100 can include a closure to seal around the air hose 715 and/or the air delivery sock 714. In one or more embodiments, the closure can be manually adjusted constrict the corresponding port around the air hose 715. The closure can also be manipulated to secure the port(s) around the air hose 715.

In one or more embodiments, the inflation device 700 is capable of providing air at a pressure in the range of approximately five to approximately twenty pounds per square inch to inflate the patient positioner 100. The air from the inflation device 700 inflates the patient positioner 100 and lifts the patient upward.

As can be seen in FIG. 7, when the patient positioner 100 inflates, the air chambers 701,702,703,704,705,706,707 define cylindrical or rounded shapes. Since the air exit holes 202 are situated centrally along these air chambers 701,702, 703,704,705,706,707, they protrude from the patient positioner 100 and situated at apices of the air chambers 701, 702,703,704,705,706, 707. By contrast, since the selectively engaging surface gripping zones 209,210,211,212,213,214 of the grippy feet 215 are centrally located along the sewn seams 208, the grippy feet 215 are drawn into concave lacuna 801,802,803,804,805,806 situated at edges of the air chambers 701,702,703,704,705,706,707. When the lower patient positioner surface 201 is positioned such that it abuts a surface, this causes the grippy feet 215 to retract and disengage the surface while air exits the air exit holes 202, thereby defining an air bearing between the patient positioner 100 and the surface. When the patient positioner 100 deflates, the grippy feet 215 again engage the support surface to prevent the patient positioner 100 from sliding.

Accordingly, in one or more embodiments the grippy feet 215 of each selectively engaging surface gripping zone 209,210,211,212,213,214 is centered along a stitched baffle 708, 709,710,711,712,713 that runs the length of the patient positioner 100. In one or more embodiments, the stitched baffle 709,710,711,712,713 has a height that is less than the air chambers 701,702,703,704,705,706,707 positioned between each stitched baffle 708,709,710, 711,712,713. When the patient positioner 100 is inflated, concave lacuna 801,802,803,804, 805,806 defined between the air chambers 701,702,703,704,705,706,707. Since the grippy feet 215 are centered along the stitched baffles 709,710,711,712,713, inflation of the patient positioner 100 draws the grippy feet 215 into the concave lacuna 801,802,803,804,805,806, thereby causing them to effectively "retract" and disengage the surface of the procedure table upon which the patient positioner 100 is placed. As the material supporting the selectively engaging surface gripping zones 209,210,211, 212,213,214 is configured to be a very low friction surface, this fact, combined with the air bearing created by air escaping from the air exit holes 202, allows the patient positioner 100 to slide easily along the surface of the procedure table.

While the air hose 715 and/or the air delivery sock 714 is one explanatory way of inflating the patient positioner 100, embodiments of the disclosure are not so limited. Turning briefly to FIGS. 23-24, illustrated therein is another explanatory patient positioner 2300 that has closures 2301,2302 at the bottom corners that include both hook fasteners 2303 and loop fasteners 2304. As shown in the exploded view of FIG. 24, an air hose 715 can be attached to an inlet port 2401 extending from the closure 2301 to inflate the air chambers (701,702,703,704,705,706,707). One or more baffles 2305, 2306,2307 can be included to ensure one-way airflow into the air chambers (701,702,703,704,705,706,707). (Note that only three baffles 2305,2306,2307 are shown in FIG. 23, but the left side of the patient positioner 2300 is a mirror image with three additional baffles in this illustrative embodiment.) Once the air hose 715 is attached to the inlet port 2401, the hook fastener 2303 can attach to the loop fastener 2304 to seal the closure 2301 around the air hose 715 in one or more embodiments.

Figure 9:
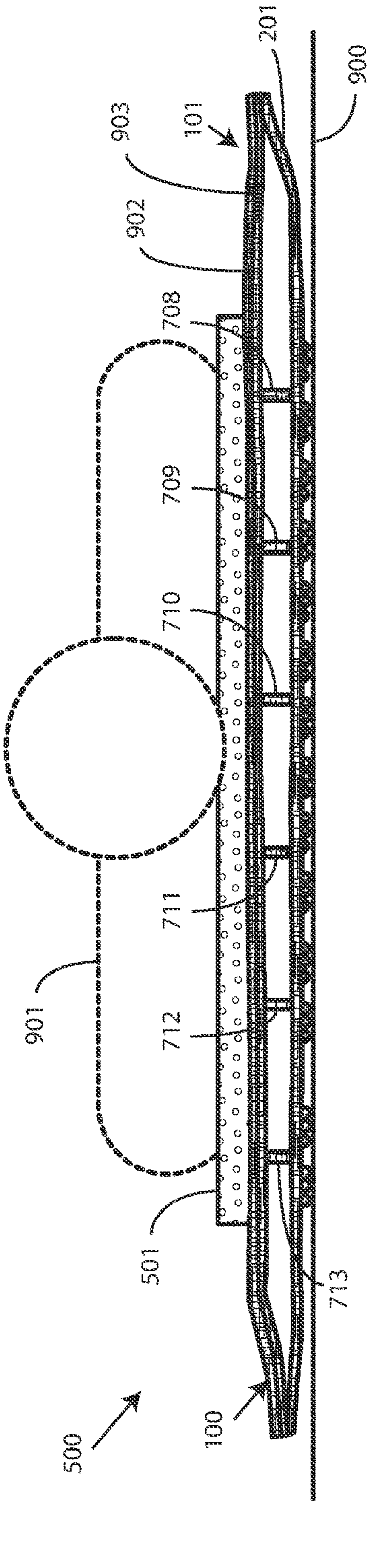
FIG. 9 illustrates an end, cutaway view of one explanatory patient positioner in a deflated state in accordance with one or more embodiments of the disclosure.

Turning now to FIG. 9, illustrated therein is the patient positioner system 500 of FIGS. 5-6 with the patient positioner 100 in a deflated state. A patient 901 has been placed on the high-friction pad 501. In one or more embodiments, the upper patient positioner surface 101 comprises an upper, high friction layer 902. In one or more embodiments, the upper, high friction layer 902 comprises a microfiber fabric.

In one or more embodiments, the upper patient positioner surface 101 also includes a substrate layer 903. In one or more embodiments, the substrate layer 903 is manufactured from plastic or nylon. Other materials suitable for use in the upper patient positioner surface 101 will be obvious to those of ordinary skill in the art having the benefit of this disclosure.

Similarly, the lower patient positioner surface 201 can comprise, for example, plastic or nylon. In one or more embodiments, the lower patient positioner surface 201 comprises a lower friction material than does the upper patient positioner surface. Illustrating by example, in one or more embodiments the lower patient positioner surface 201 is configured to have a kinetic friction force ranging from about 10-70 pound-feet when passed over a cotton hospital bedsheet. This range works well in practice as it corresponds to the force required to continue moving a two-hundred-pound object positioned on the patient positioner 100 across the bedsheet at a constant rate after initiating motion of the object. In one or more embodiments, the upper surface of the high friction layer 902 may create a higher frictional force with the patient than the lower surface of the lower patient positioner surface 201 creates with a procedure table 900.

As shown in FIG. 9, the stitched baffles 708,709,710,711, 712,713 connect the upper patient positioner surface 101 and the lower patient positioner surface 201. In this illustrative embodiment, the stitched baffles 708,709,710,711, 712,713 are joined to the upper patient positioner surface 101 and the lower patient positioner surface 201 by stitching, and in particular the sewn seams (208). However, in other embodiments, the stitched baffles 708,709,710,711, 712,713 are joined to the upper patient positioner surface 101 and the lower patient positioner surface 201 by adhesive. In one or more embodiments, the stitched baffles 708,709,710,711,712,713 are folded when the patient positioner 100 is in the deflated configuration and are substantially planar when the patient positioner 100 is in the inflated configuration.

As shown in FIG. 9, when the patient positioner 100 is in the deflated state, the grippy feet 215 engage the procedure table 900. This occurs because the grippy feet 215 extend distally beyond the lower exterior surfaces of the air chambers defined by the stitched baffles 708,709, 710,711,712, 713. In this manner, i.e., when the grippy feet 215 abut the procedure table 900, the grippy feet 215 prevent the patient positioner 100 from sliding across the procedure table 900. This is true even when the procedure table 900 is tilted to a Trendelenburg position, reverse Trendelenburg position, or other position where a procedure table is tilted from horizontal.

Figure 10:
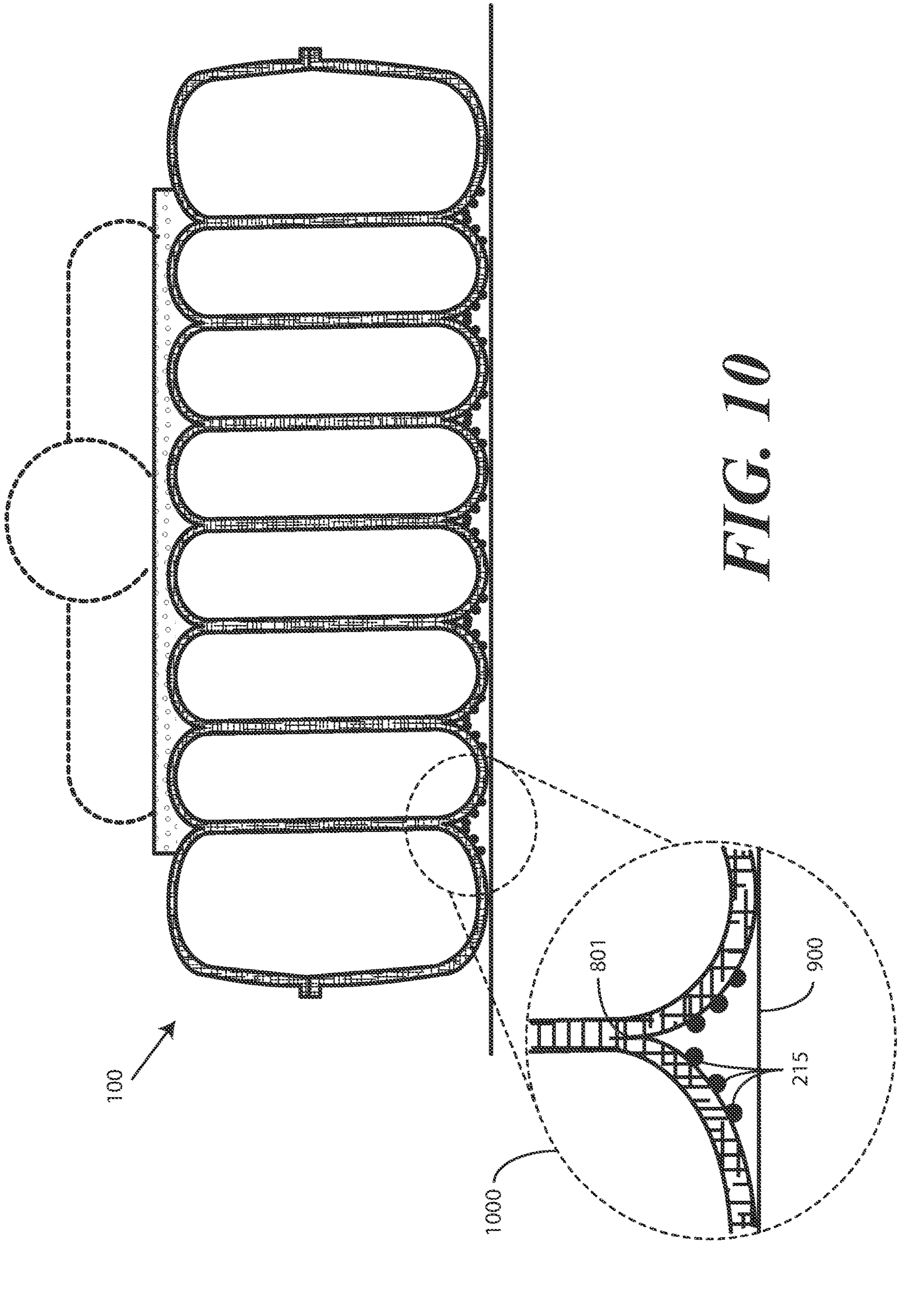
FIG. 10 illustrates an end, cutaway view of one explanatory patient positioner in an inflated state in accordance with one or more embodiments of the disclosure.

By contrast, turning now to FIG. 10, the inflation device (700) is providing air to the air chambers of the patient positioner 100. With the patient positioner 100 inflated, the stitched baffles separate interiors to define the air chambers. When this occurs, as shown in the magnified view 1000, the grippy feet 215 are drawn into concave lacuna 801. This causes the grippy feet 215 to retract within the concave lacuna 801 and to situate beneath apices (which are shown as nadirs in FIG. 10) of the plurality of air chambers when in the inflated state. Said differently, the outermost surface of the air chambers, which abuts the procedure table 900 in FIG. 10 (or an air bearing situated between these outermost surfaces and the procedure table 900) extends more distally from a central axis of the patient positioner 100 than do the grippy feet 215.

In this illustrative embodiment, as shown in the magnified view 1000, half of the grippy feet 215 of each selectively engaging surface gripping zone of the one or more selectively engaging surface gripping zones situate on a first side of the concave lacuna 801 when the plurality of air chambers is in the inflated state. Another half of the grippy feet 215 of the each selectively engaging surface gripping zone of the one or more selectively engaging surface gripping zones situate on a second side of the concave lacuna when the plurality of air chambers is in the inflated state.

This causes the grippy feet 215 to disengage the procedure table 900. Meanwhile, the air exit holes (202), which are situated centrally on the apices of the plurality of air chambers, create an air bearing between the patient positioner 100 and the procedure table 900. This disengagement of the grippy feet 215, since they are beneath the apices of the air chambers, combined with the air bearing created by air escaping from the air exit holes (202), allows the patient positioner 100 to slide easily along the surface of the procedure table 900.

In FIGS. 9-10, the patient 901 was positioned on the high-friction pad 501. However, embodiments of the disclosure contemplate that the patient positioner 100 can be used without the high-friction pad 501. Additionally, since the stitched baffles 708,709,710,711,712,713 are folded when the patient positioner 100 is in the deflated configuration, embodiments of the disclosure contemplate that the upper patient positioner surface 101 may slide relative to the lower patient positioner surface 201 when the high-friction pad 501 is not used. This can allow the patient 901 to slip slightly from side to side.

Figure 11:
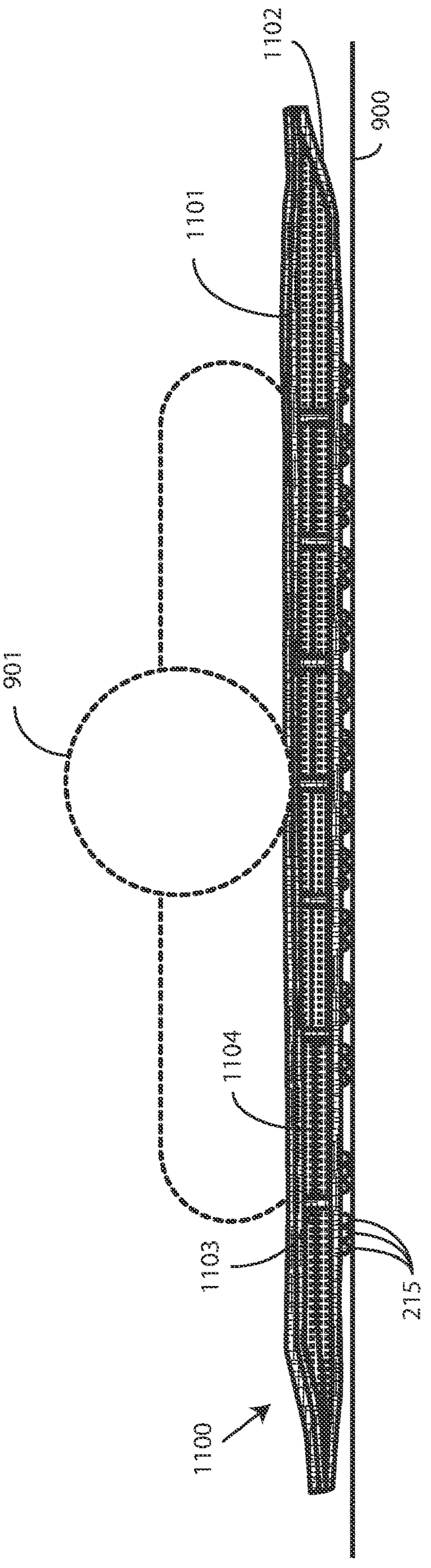
FIG. 11 illustrates an end, cutaway view of another explanatory patient positioner in a deflated state in accordance with one or more embodiments of the disclosure.

To correct this problem, turning now to FIG. 11, illustrated therein is another patient positioner 1100 configured in accordance with one or more embodiments of the disclosure. As before, the patient positioner 100 includes an upper patient positioner surface 1101 that is joined to a lower patient positioner surface 1102. One or more processors stitched baffles 1103 are coupled between the upper patient positioner surface 1101 and the lower patient positioner surface 1102 as previously described. Patient positioner 1100 differs from the patient positioner (100) previously described in that a low-tack pressure sensitive adhesive 1104 has been coated along the inner surfaces of both the upper patient positioner surface 1101 and the lower patient positioner surface 1102.

In one or more embodiments, the low-tack pressure sensitive adhesive 1104 is configured as a strip of double-sided tape or another removable adhesive. In other embodiments, the low-tack pressure sensitive adhesive 1104 is configured as a polyurethane-based gel having adhesive qualities, and as such, acting as an adhesive, having a shear strength sufficient to prevent sliding or slippage of the upper patient positioner surface 1101 relative to the lower patient positioner surface 1102 when the patient positioner 1100 is in the deflated condition. Thus, if a patient 901 is placed atop the patient positioner 1100, the low-tack pressure sensitive adhesive 1104 will keep the upper patient positioner surface 1101 from translating relative to the lower patient positioner surface 1102.

While the low-tack pressure sensitive adhesive 1104 is shown being positioned on the interior of the patient positioner 1100 in this illustrative embodiment, in other embodiments the low-tack pressure sensitive adhesive 1104 is placed on the exterior of the patient positioner 1100 as well. Of course, a combination of interior low-tack pressure sensitive adhesive 1104 and exterior low-tack pressure sensitive adhesive could be used as well.

In particular, the adhesive qualities of the low-tack pressure sensitive adhesive 1104 prevent slippage but have a low enough level of tack that they still allow a person to manually adjust the upper patient positioner surface 1101 relative to the lower patient positioner surface 1102 when desired. Illustrating by example, in one or more embodiments the upper patient positioner surface 1101 can be lifted away from the lower patient positioner surface 1102, thereby separating the layers of low-tack pressure sensitive adhesive 1104. The upper patient positioner surface 1101 and lower patient positioner surface 1102 can then be repositioned. When they connect again, the low-tack pressure sensitive adhesive 1104 will keep them from shearing relative to each other.

Figure 12:
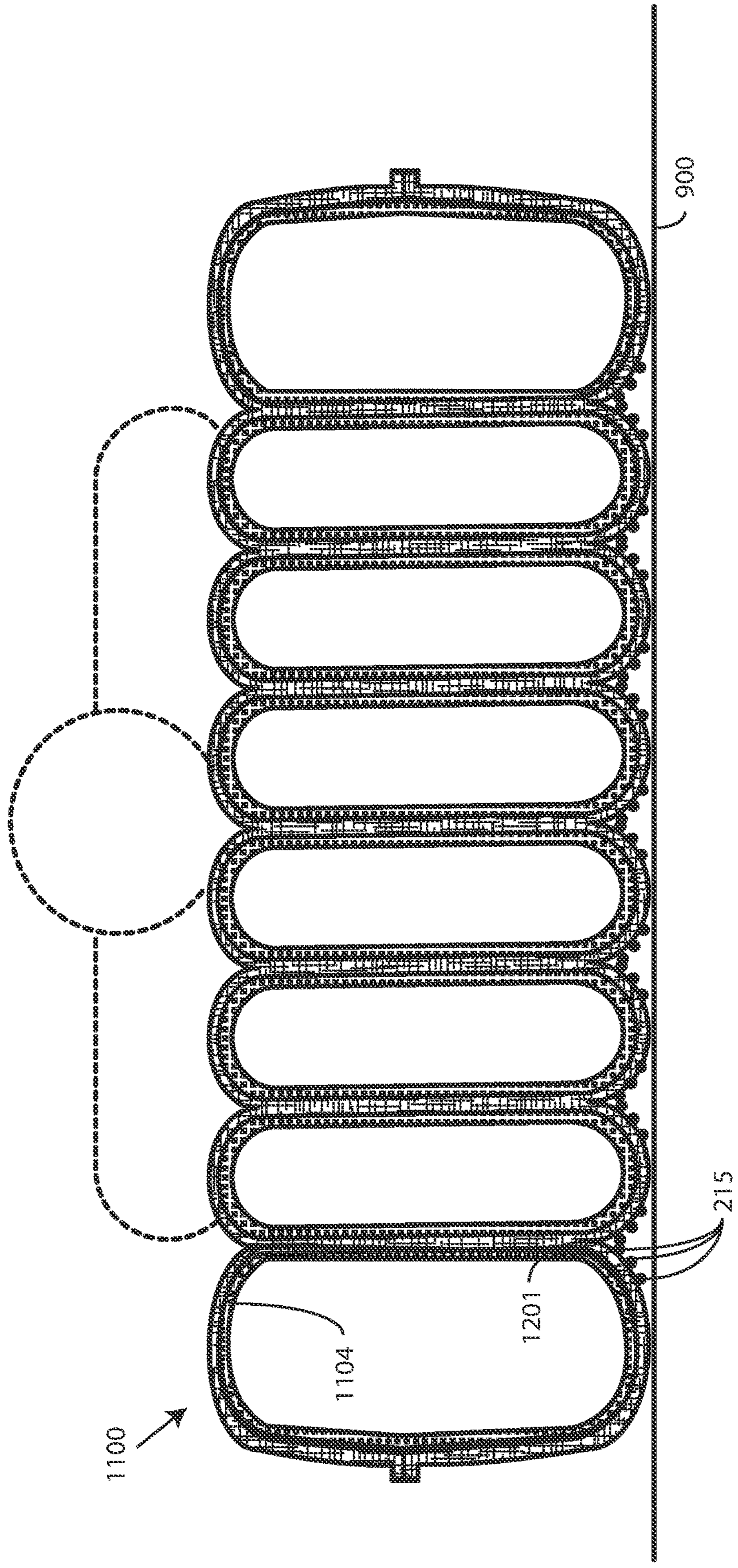
FIG. 12 illustrates an inflated view of another explanatory patient positioner in an inflated state in accordance with one or more embodiments of the disclosure.

When the patient positioner 1100 is in the deflated condition, the grippy feet 215 engage the procedure table 900 to prevent the patient positioner 1100 from sliding along the procedure table 900. However, as shown in FIG. 12, when the patient positioner 1100 is inflated, the layers of low-tack pressure sensitive adhesive 1104 separate. The grippy feet 215 also recede into the concave lacuna 1201 to disengage from the procedure table 900 as previously described.

Figure 13:
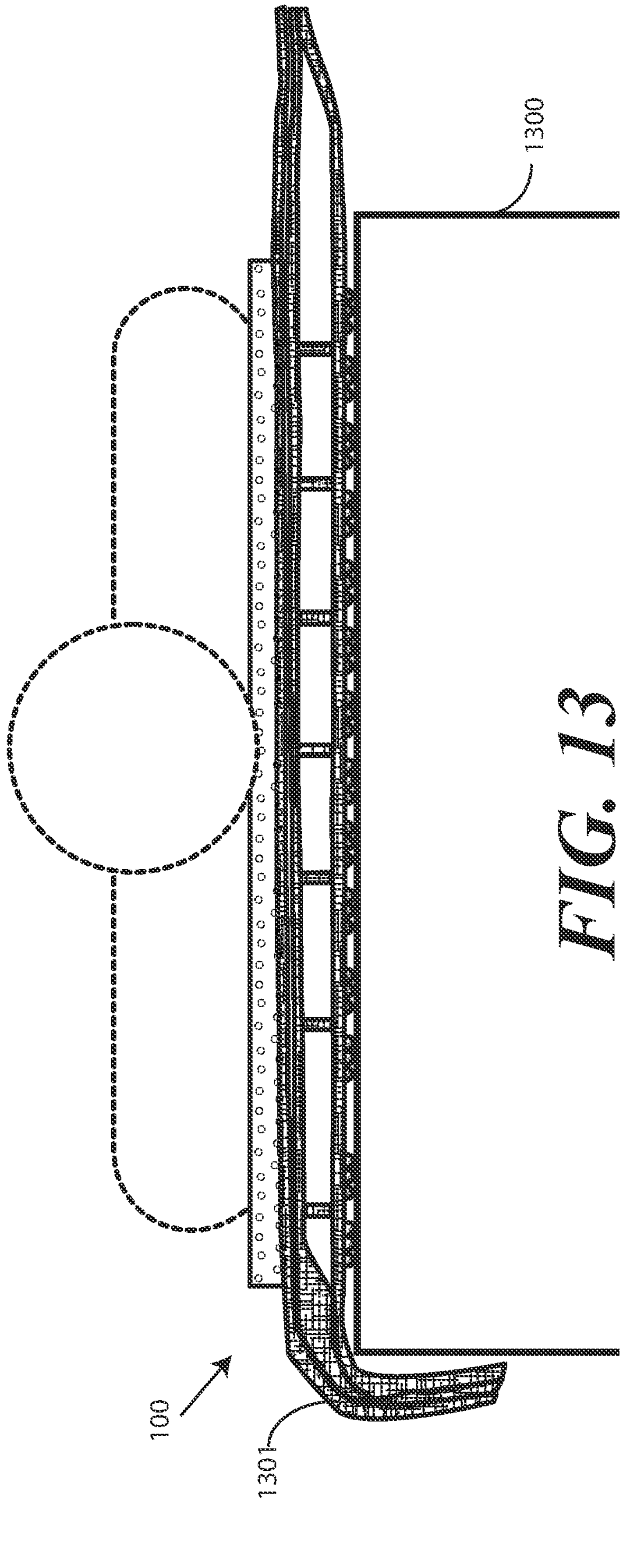
FIG. 13 illustrates an end, cutaway view of one explanatory patient positioner on a narrow table in accordance with one or more embodiments of the disclosure.

Another situation that can be mildly irritating and that is contemplated by embodiments of the disclosure is shown in FIG. 13. Turning now to FIG. 13, a patient positioner 100 configured in accordance with embodiments of the disclosure is shown in a deflated state.

Here, the procedure table 1300 is narrower than the patient positioner 100. Accordingly, when the patient positioner 100 is deflated, a portion 1301 of the patient positioner 100 hangs over the side of the procedure table 1300.

Figure 14:
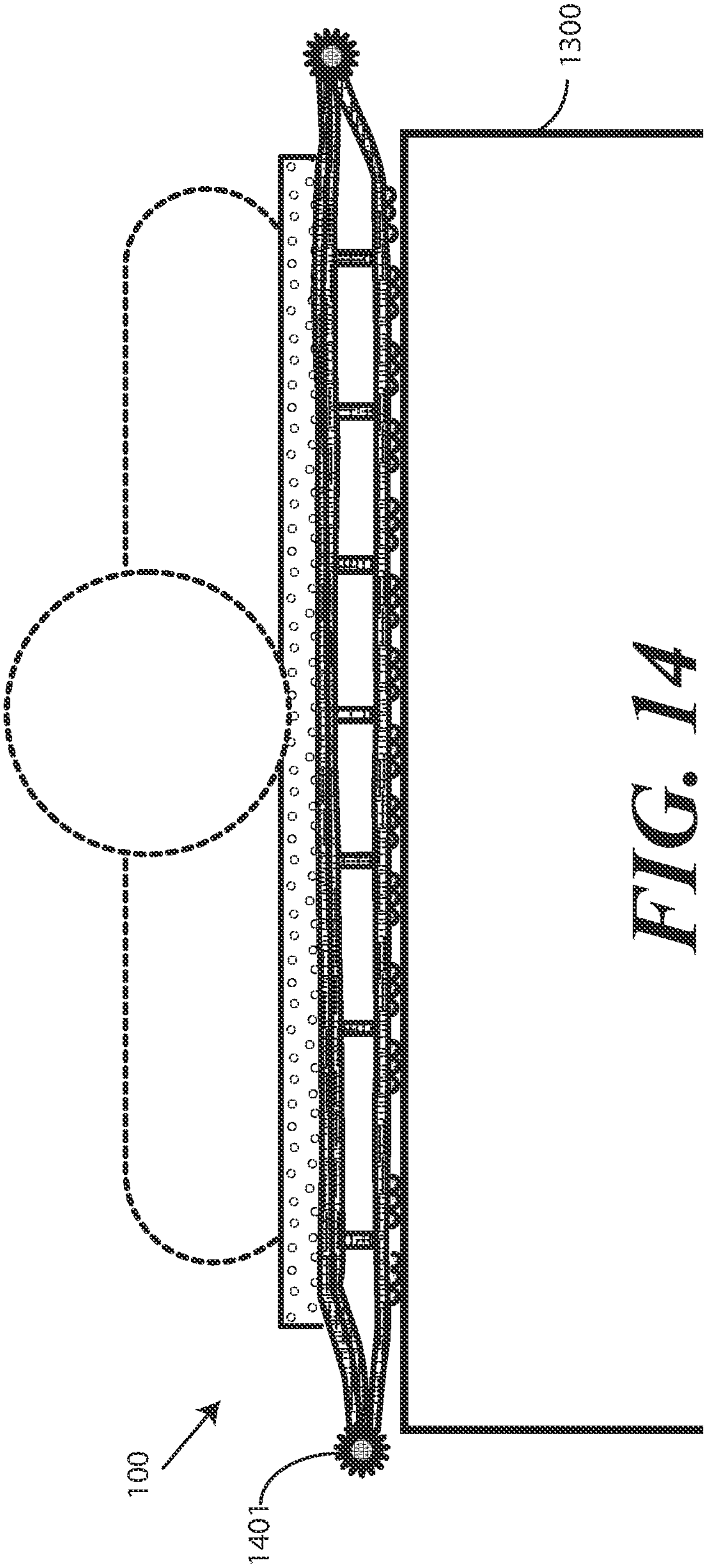
FIG. 14 illustrates yet another explanatory patient positioner in accordance with one or more embodiments of the disclosure.

To remedy this problem, turning now to FIG. 14, a band of elastic 1401 can be coupled to the perimeter of the patient positioner 100. Where included this band of elastic 1401 gathers the sides of the patient positioner 100 when the patient positioner 100 is in the deflated state to prevent them from spilling over the sides of the procedure table 1300. It should be noted that the band of elastic 1401 is optional and may not be included in all embodiments.

Figure 15:
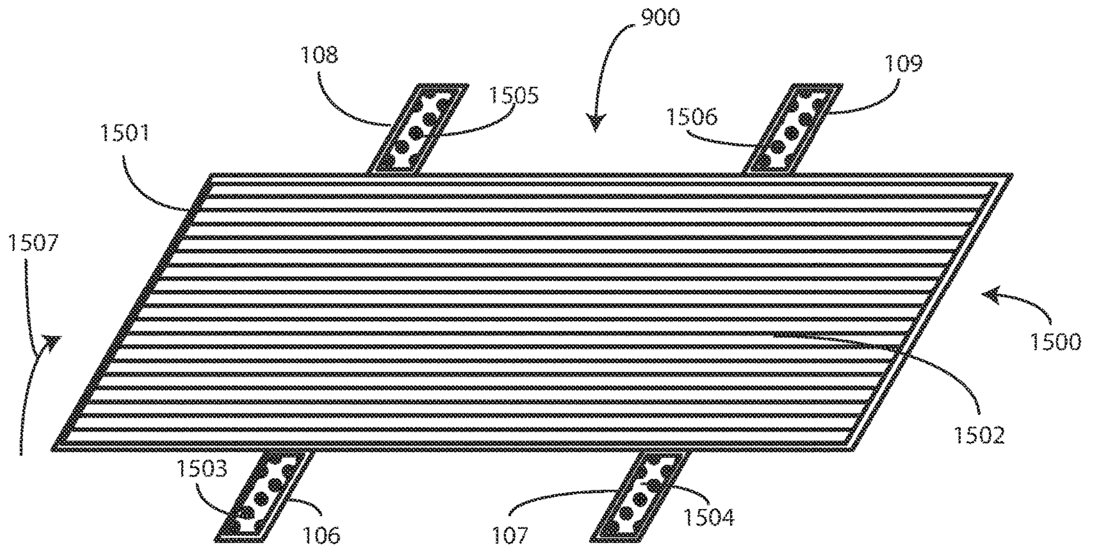
FIG. 15 illustrates one explanatory patient positioner configured in accordance with one or more embodiments of the disclosure.

Turning now to FIGS. 15-18, illustrated therein is one explanatory patient positioner 1500 being used in a Trendelenburg application. While the Trendelburg position used for illustration purposes, it should be noted that the patient positioner 1500 is also suitable for use when a patient is in the reverse Trendelenburg position or another position where a procedure table is tilted from horizontal. As shown in FIG. 15, one or more one or more bed strap webbings 106,107,108,109 extending distally from the sides of the patient positioner 1500. The patient positioner 1500 includes a table covering portion 1501.

Figure 16:
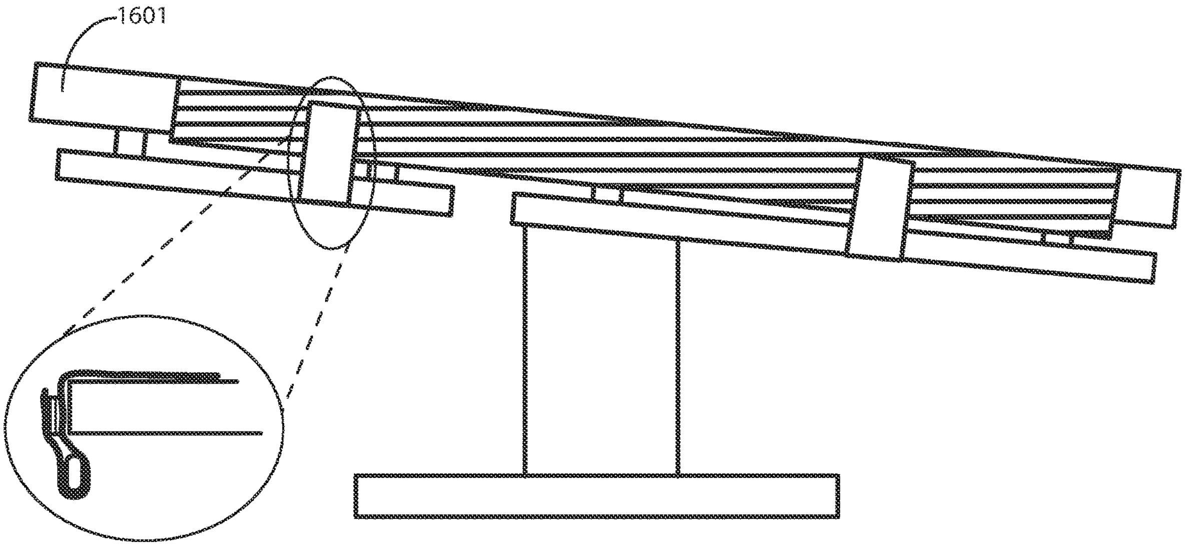
FIG. 16 illustrates one explanatory patient positioner coupled to a procedure table in accordance with one or more embodiments of the disclosure.

In this illustrative embodiment, the table covering portion 1501 has disposed thereon another area of grippy feet 1502 that selectively engage a patient when positioned upon the patient positioner 1500. In one or more embodiments, the one or more bed strap webbings 106,107,108,109 each comprise hook and loop fasteners 1503,1504,1505,1506. Accordingly, the one or more bed strap webbings 106,107, 108,109 can be folded 1507 back upon themselves to attach the patient positioner 1500 to a procedure table 1601, as shown in FIG. 16. As before, the inclusion of hook and loop fasteners 1503,1504,1505,1506 is optional. In other embodiments no hook and loop fasteners 1503,1504,1505,1506 are included.

Figure 17:
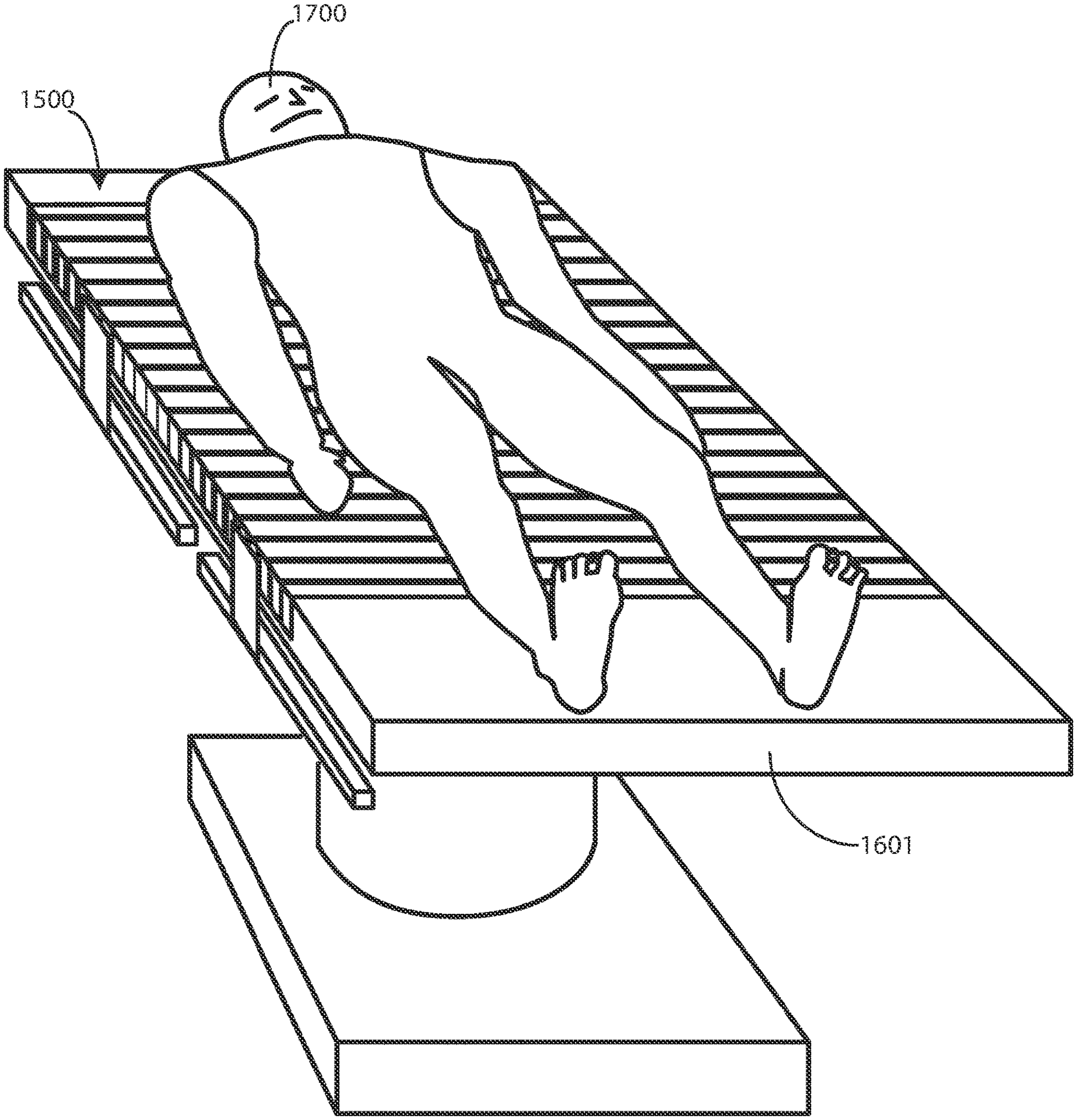
FIG. 17 illustrates a perspective view of a patient on a procedure table being supported by an explanatory patient positioner configured in accordance with one or more embodiments of the disclosure.
Figure 18:
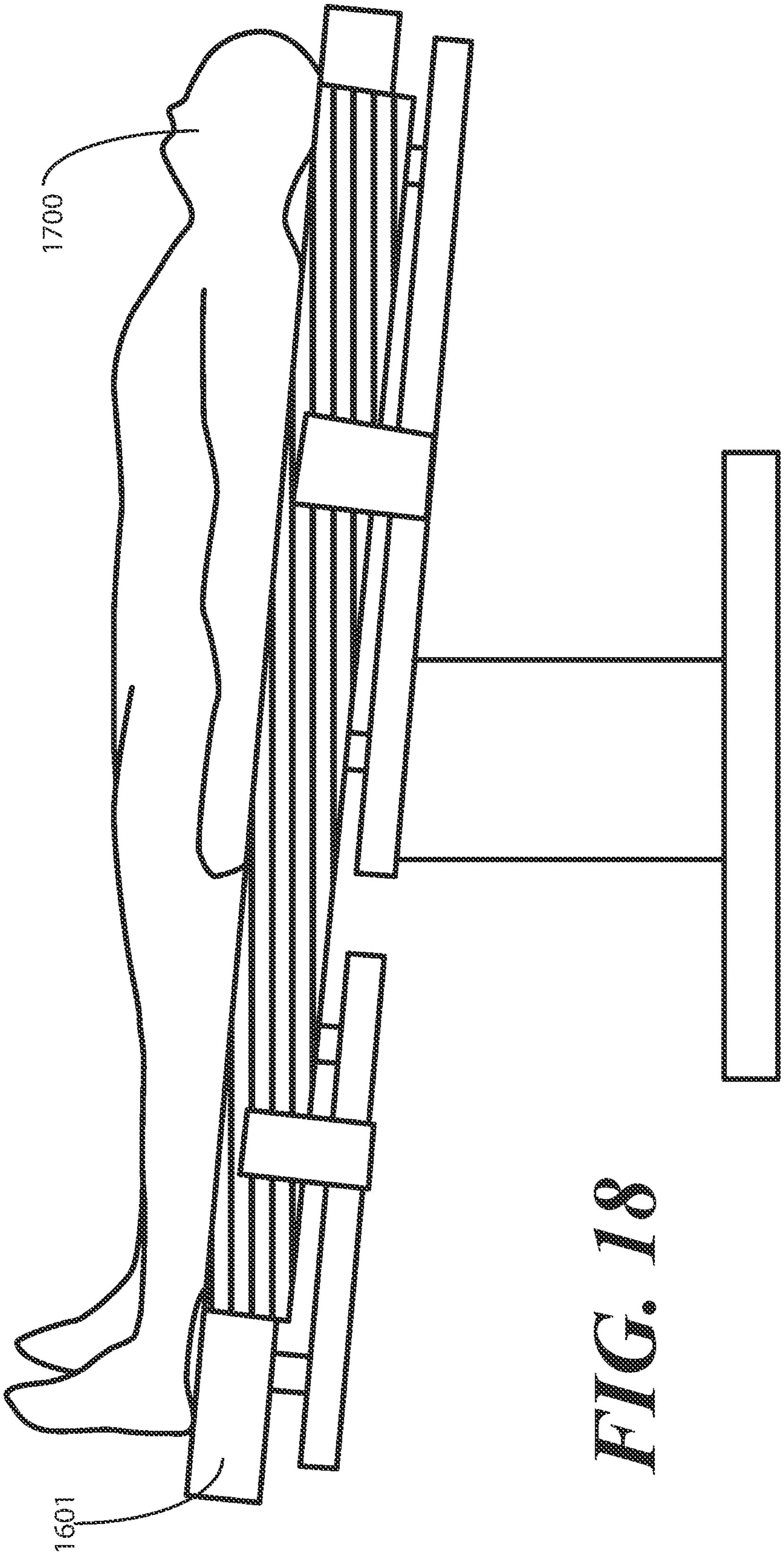
FIG. 18 illustrates a side elevation view of a patient on a procedure table being supported by an explanatory patient positioner configured in accordance with one or more embodiments of the disclosure.

As shown in FIG. 17, the patient positioner 1500 securely retains the patient 1700 to the procedure table 1601. As shown in FIG. 18, the procedure table 1601 can then be placed in the Trendelenburg position, reverse Trendelenburg position, or other position where a procedure table is tilted from horizontal without fear of the patient 1700 moving.

Figure 25:
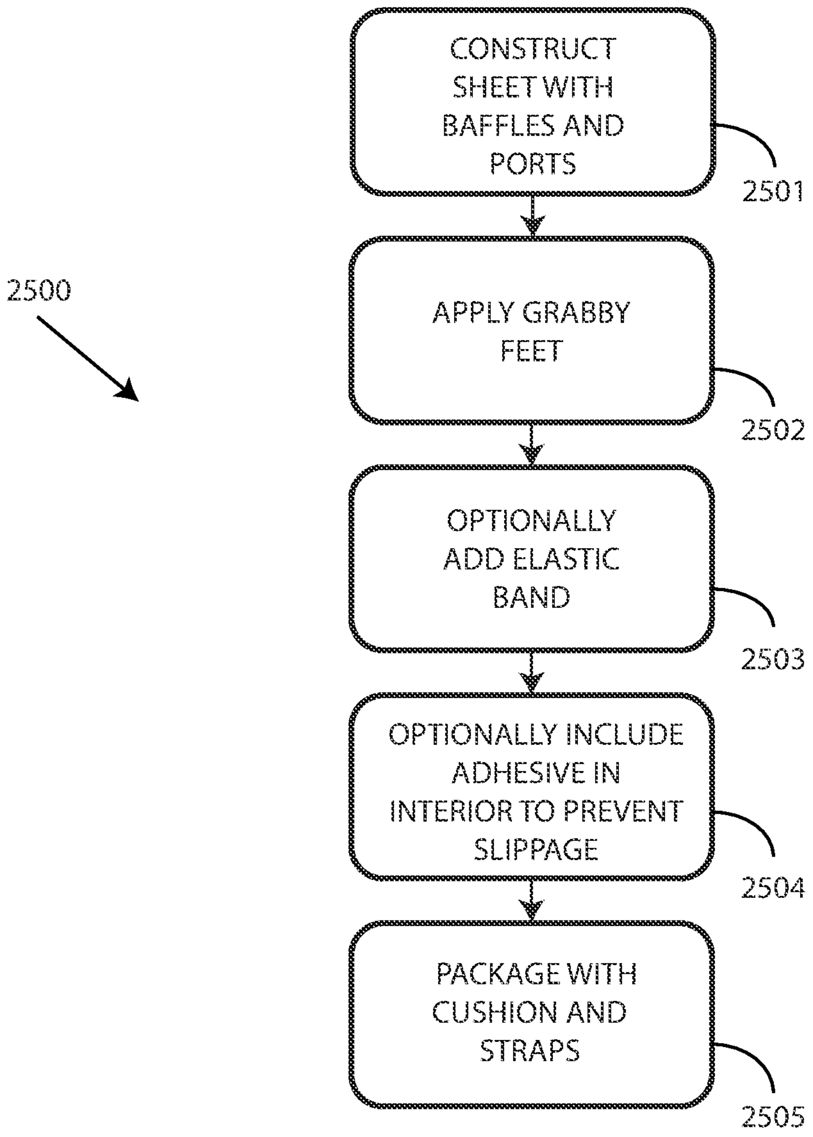
FIG. 25 illustrates one explanatory method in accordance with one or more embodiments of the disclosure.

Turning now to FIG. 25, illustrated therein is one explanatory method 2500 for manufacturing a patient positioner in accordance with one or more embodiments of the disclosure. Beginning at step 2501, a patient positioner is constructed with baffles and ports. As such, step 2501 can comprise coupling baffles between an upper patient positioner surface and a lower patient positioner surface to define one or more air chambers between the upper patient positioner surface and the lower patient positioner surface.

In one or more embodiments, this step 2501 comprises coupling an upper patient positioner surface to a lower patient positioner surface, defining one or more inflation ports in one or both of the upper patient positioner surface and/or lower patient positioner surface, defining air exit holes in the lower patient positioner surface, and creating stitched baffle (or baffles connected another way) between the lower patient positioner surface and the upper patient positioner surface.

In one or more embodiments, the air exit holes are configured as columns situated centrally between the stitched baffles, as previously described. This positions the air exit holes at apices of the air chambers defined between the stitched baffles when the patient positioner is inflated. Handles and straps can be attached to the patient positioner at step 2501 as well. In one or more embodiments, the air exit holes are positioned along the one or more air cambers between the selectively engaging surface gripping zones that are applied at step 2502.

At step 2502, the method 2500 comprises selectively engaging surface gripping zones of grippy feet to the lower patient positioner surface. In one or more embodiments, each selectively engaging surface gripping zone is centrally situated along the stitched baffles such that retracts within a concave lacuna when the patient positioner is inflated. In one or more embodiments, the grippy feet are applied in alternating, offset rows of three grippy feet along the stitched baffles. Other placement configurations will be obvious to those of ordinary skill in the art having the benefit of this disclosure.

At step 2503, the method 2500 optionally applies a band of elastic, as described above with reference to FIG. 14, to a perimeter of the patient positioner. Step 2504 can optionally comprise coating the interior surfaces of the upper patient positioner surface and lower patient positioner surface with a low-tack pressure sensitive adhesive such as that described above with reference to FIGS. 11-12.

At step 2505, the patient positioner can be packaged for shipment. Optionally, step 2505 can comprise adding a high-friction pad to the package so that the packaged assembly defines a patient positioner system.

Figure 26:
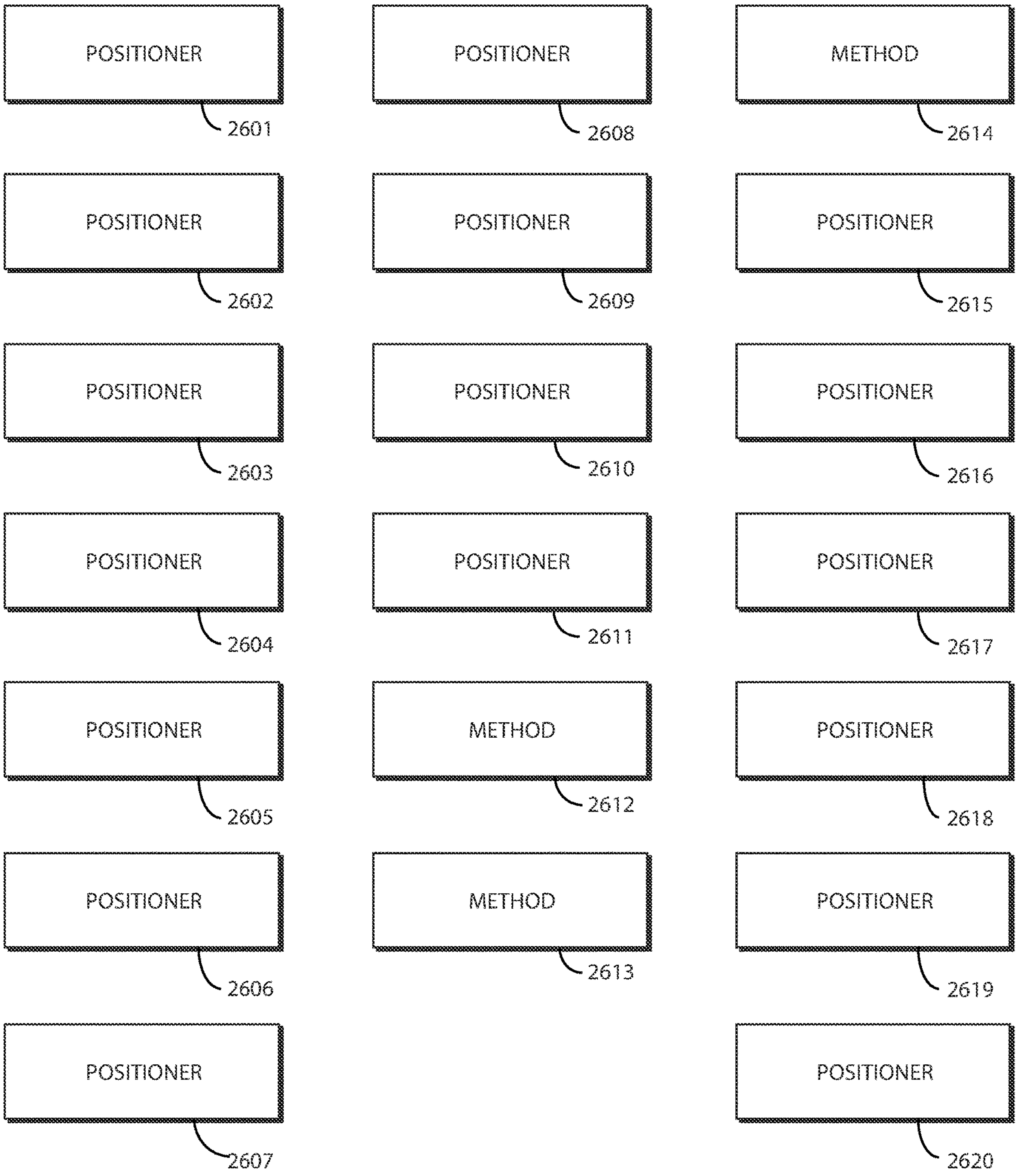
FIG. 26 illustrates various embodiments of the disclosure.

Turning now to FIG. 26, illustrated therein are various embodiments of the disclosure. The embodiments of FIG. 26 are shown as labeled boxes in FIG. 26 due to the fact that the individual components of these embodiments have been illustrated in detail in FIGS. 1-25, which precede FIG. 26. Accordingly, since these items have previously been illustrated and described, their repeated illustration is no longer essential for a proper understanding of these embodiments. Thus, the embodiments are shown as labeled boxes.

At 2601, a patient positioner comprises an upper patient positioner surface coupled to a lower patient positioner surface along a perimeter. At 2601, the patient positioner comprises one or more baffles coupling the upper patient positioner surface to the lower patient positioner surface interior of the perimeter with the one or more baffles defining a plurality of air chambers within the patient positioner.

At 2601, the patient positioner comprises one or more selectively engaging surface gripping zones attached to the lower patient positioner surface. At 2601, the one or more selectively engaging surface gripping zones are positioned centrally along the one or more baffles on a one-to-one basis such that grippy feet of the one or more selectively engaging surface gripping zones extend distally beyond surfaces of the plurality of air chambers when in a deflated state and retract within concave lacuna situated beneath apices of the plurality of air chambers when in an inflated state.

At 2602, the grippy feet of the one or more selectively engaging surface gripping zones of 2601 are configured to engage a procedure table upon which the patient positioner is placed when the plurality of air chambers is in the deflated state and disengage the procedure table when the plurality of chambers is in the inflated state. At 2602, the grippy feet of 2601 are made of silicone.

At 2604, the grippy feet of 2603 are arranged in alternating, offset rows along a length of each selectively engaging surface gripping zone of the one or more selectively engaging surface gripping zones. At 2605, the alternating, offset rows of 2604 each comprise three grippy feet.

At 2606, the lower patient positioner surface of 2601 also defines a plurality of air exit holes. At 2607, the plurality of air exit holes of 2606 is centrally situated along the apices of the plurality of air chambers when in the inflated state.

At 2608, the patient positioner of 2601 defines one or more slots situated within the one or more selectively engaging surface gripping zones. At 2609, the one or more slots of 2608 are centrally situated within the one or more selectively engaging surface gripping zones.

At 2610, the grippy feet of 2601 have a diameter less than one tenth of an inch. At 2611, half of the grippy feet of each selectively engaging surface gripping zone of the one or more selectively engaging surface gripping zones of 2601 situate on a first side of the concave lacuna when the plurality of air chambers are in the inflated state and another half of the grippy feet of the each selectively engaging surface gripping zone of the one or more selectively engaging surface gripping zones situate on a second side of the concave lacuna when the plurality of air chambers are in the inflated state.

At 2612, a method of constructing a patient positioner comprises attaching an upper patient positioner surface to a lower patient positioner surface. At 2612, the method comprises coupling baffles between the upper patient positioner surface and the lower patient positioner surface to define one or more air chambers between the upper patient positioner surface and the lower patient positioner surface. At 2612, the method comprises attaching selectively engaging surface gripping zones of grippy feet to the lower patient positioner surface such that the selectively engaging surface gripping zones are centrally positioned atop the baffles on a one-to-one basis.

At 2613, the attaching the selectively engaging surface gripping zones of 2612 comprises applying the grippy feet in alternating, offset rows along the baffles. At 2614, the method of 2613 further comprises configuring air exit holes in the lower patient positioner surface along the one or more air chambers between the selectively engaging surface gripping zones.

At 2615, a patient positioner comprises an upper patient positioner surface and a lower patient positioner surface coupled to the upper patient positioner surface. At 2615, the lower patient positioner surface is configured to rest against a procedure table during a procedure.

At 2615, the patient positioner comprises a plurality of grippy feet attached to the lower patient positioner surface. At 2615, the plurality of grippy feet engage the procedure table when the patient positioner is in a deflated state and disengage the procedure table when the patient positioner is in an inflated state.

At 2616, the plurality of grippy feet of 2615 is arranged in selectively engaging surface gripping zones. At 2616, the lower patient positioner surface defines a plurality of air exit holes situated between the selectively engaging surface gripping zones.

At 2617, the plurality of air exit holes of 2616 is configured to create an air bearing between the procedure table and the patient positioner when the patient positioner is in the inflated state and the grippy feet are disengaged from the procedure table. At 2618, the patient positioner of 2616 further comprises a plurality of stitched baffles coupling the upper patient positioner surface to the lower patient positioner surface. At 2618, the plurality of stitched baffle defines a plurality of air chambers within the patient positioner.

At 2619, each selectively engaging surface gripping zone of the selectively engaging surface gripping zones of 2618 are centrally positioned along a stitched baffle of the stitched baffles. At 2620, each selectively engaging surface gripping zone of 2618 comprises three columns of the grippy feet on one side of the stitched baffle and three other columns of the grippy feet on another side of the stitched baffle.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, with the aforementioned teachings it can be understood that other inflatable sheet architectures can be modified according to embodiments of the disclosure. Examples include that found in US Published Patent Application No. 2023/0240924 to Kea et al., published Aug. 3, 2023, which was incorporated herein by reference above. Others will be obvious to those of ordinary skill in the art having the benefit of this disclosure.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A patient positioner, comprising:

an upper patient positioner surface coupled to a lower patient positioner surface along a perimeter;

one or more baffles coupling the upper patient positioner surface to the lower patient positioner surface interior of the perimeter with the one or more baffles defining a plurality of air chambers within the patient positioner; and one or more selectively engaging surface gripping zones attached to the lower patient positioner surface and positioned centrally along the one or more baffles such that grippy feet of the one or more selectively engaging surface gripping zones extend distally beyond surfaces of the plurality of air chambers when in a deflated state and retract within concave lacuna situated beneath apices of the plurality of air chambers when in an inflated state;

wherein some of the grippy feet of each selectively engaging surface gripping zone of the one or more selectively engaging surface gripping zones situate on a first side of the concave lacuna when the plurality of air chambers are in the inflated state and some other of the grippy feet of the each selectively engaging surface gripping zone of the one or more selectively engaging surface gripping zones situate on a second side of the concave lacuna when the plurality of air chambers are in the inflated state.

2. The patient positioner of claim 1, wherein:

the one or more selectively engaging surface gripping zones are positioned centrally along the one or more baffles on a one-to-one basis; and the grippy feet of the one or more selectively engaging surface gripping zones are configured to engage a procedure table upon which the patient positioner is placed when the plurality of air chambers is in the deflated state and disengage the procedure table when the plurality of air chambers is in the inflated state.

3. The patient positioner of claim 1, wherein the grippy feet are made of silicone.

4. The patient positioner of claim 3, wherein the grippy feet are arranged in alternating, offset rows along a length of each selectively engaging surface gripping zone of the one or more selectively engaging surface gripping zones.

5. The patient positioner of claim 4, wherein the alternating, offset rows each comprise three grippy feet.

6. The patient positioner of claim 1, wherein the lower patient positioner surface also defines a plurality of air exit holes.

7. The patient positioner of claim 6, wherein the plurality of air exit holes is centrally situated along the apices of the plurality of air chambers when in the inflated state.

8. The patient positioner of claim 1, wherein the patient positioner defines one or more slots situated within the one or more selectively engaging surface gripping zones.

9. The patient positioner of claim 8, wherein the one or more slots are centrally situated within the one or more selectively engaging surface gripping zones.

10. The patient positioner of claim 1, wherein the grippy feet have a diameter less than one tenth of an inch.

11. The patient positioner of claim 1, wherein the some of the grippy feet comprise half of the grippy feet of the each selectively engaging surface gripping zone of the one or more selectively engaging surface gripping zones and the some other of the grippy feet comprise another half of the grippy feet of the each selectively engaging surface gripping zone of the one or more selectively engaging surface gripping zones.

12. A method of constructing a patient positioner, the method comprising:

attaching an upper patient positioner surface to a lower patient positioner surface;

coupling baffles between the upper patient positioner surface and the lower patient positioner surface to define one or more air chambers between the upper patient positioner surface and the lower patient positioner surface; and attaching selectively engaging surface gripping zones of grippy feet to the lower patient positioner surface such that the selectively engaging surface gripping zones are centrally positioned atop the baffles with one or more first sets of the grippy feet situated in one or more regions that extend one or more first distances from a first side of one or more coupling baffles and one or more second sets of the grippy feet situated in one or more other regions that extend one or more second distances from a second side of the one or more coupling baffles.

13. The method of claim 12, wherein the attaching the selectively engaging surface gripping zones occurs on a one-to-one basis relative to the baffles and comprises applying the grippy feet in alternating, offset rows along the baffles.

14. The method of claim 13, further comprising configuring air exit holes in the lower patient positioner surface along the one or more air chambers between the selectively engaging surface gripping zones.

15. A patient positioner, comprising:

an upper patient positioner surface;

a lower patient positioner surface coupled to the upper patient positioner surface, the lower patient positioner surface configured to rest against a procedure table during a procedure;

a plurality of stitched baffles defining a plurality of air chambers within the patient positioner; and a plurality of grippy feet attached to the lower patient positioner surface, wherein:

the plurality of grippy feet engage the procedure table when the patient positioner is in a deflated state and disengage the procedure table when the patient positioner is in an inflated state;

wherein plurality of grippy feet comprises a first set of grippy feet on one side of a stitched baffle and a second set of grippy feet on another side of the stitched baffle.

16. The patient positioner of claim 15, wherein:

the plurality of grippy feet is arranged in selectively engaging surface gripping zones; and the lower patient positioner surface defines a plurality of air exit holes situated between the selectively engaging surface gripping zones.

17. The patient positioner of claim 16, wherein the plurality of air exit holes is configured to create an air bearing between the procedure table and the patient positioner when the patient positioner is in the inflated state and the grippy feet are disengaged from the procedure table.

18. The patient positioner of claim 16, wherein the plurality of stitched baffles couples the upper patient positioner surface to the lower patient positioner surface.

19. The patient positioner of claim 18, wherein each selectively engaging surface gripping zone of the selectively engaging surface gripping zones are centrally positioned along the stitched baffle.

20. The patient positioner of claim 19, wherein the first set comprises three columns of the grippy feet and the second set comprises three other columns of the grippy feet.

* * * * *